(12) United States Patent
Lind et al.

(10) Patent No.: US 8,407,723 B2
(45) Date of Patent: Mar. 26, 2013

(54) JAVA VIRTUAL MACHINE HAVING INTEGRATED TRANSACTION MANAGEMENT SYSTEM AND FACILITY TO QUERY MANAGED OBJECTS

(75) Inventors: Otto Lind, Lindstrom, MI (US); Jonathon C. Pile, Foster City, CA (US); Ramiro Sarmiento, San Ramon, CA (US); Daniel J. Sifter, San Francisco, CA (US); David Stone, Berkeley, CA (US); Xiguang Zang, El Sobrante, CA (US); Mark Phillips, San Jose, CA (US)

(73) Assignee: Tibco Software, Inc., Palo Alto, CA (US)

( * ) Notice: Subject to any disclaimer, the term of this patent is extended or adjusted under 35 U.S.C. 154(b) by 657 days.

(21) Appl. No.: 12/576,186

(22) Filed: Oct. 8, 2009

(65) Prior Publication Data

US 2011/0088043 A1 Apr. 14, 2011

(51) Int. Cl.
*G06F 13/00* (2006.01)
(52) U.S. Cl. .............................. 719/316; 719/312; 718/1
(58) Field of Classification Search .................. 719/312, 719/316; 718/1
See application file for complete search history.

(56) References Cited

U.S. PATENT DOCUMENTS

| | | | |
|---|---|---|---|
| 6,256,637 B1 * | 7/2001 | Venkatesh et al. ..... | 707/999.103 |
| 6,842,756 B2 | 1/2005 | Park et al. | |
| 7,197,489 B1 * | 3/2007 | Gauvin et al. ......... | 707/999.102 |
| 7,716,377 B2 * | 5/2010 | Harris et al. .................. | 709/248 |
| 2002/0107957 A1 | 8/2002 | Zargham et al. | |
| 2003/0046114 A1 | 3/2003 | Davies et al. | |
| 2004/0068560 A1 | 4/2004 | Oulu et al. | |
| 2005/0102297 A1 * | 5/2005 | Lloyd et al. .................... | 707/100 |
| 2005/0144226 A1 | 6/2005 | Purewal | |
| 2005/0187891 A1 | 8/2005 | Johnson et al. | |
| 2006/0184569 A1 | 8/2006 | Aakolk et al. | |
| 2006/0229888 A1 | 10/2006 | Colle et al. | |
| 2006/0230402 A1 | 10/2006 | Newport et al. | |
| 2007/0022180 A1 | 1/2007 | Cocotis et al. | |
| 2007/0136390 A1 | 6/2007 | Blum et al. | |
| 2007/0280102 A1 | 12/2007 | Vasseur et al. | |
| 2007/0300238 A1 * | 12/2007 | Kontothanassis et al. .... | 719/320 |
| 2009/0158242 A1 | 6/2009 | Sifter et al. | |
| 2009/0158246 A1 | 6/2009 | Sifter et al. | |
| 2009/0276431 A1 | 11/2009 | Lind et al. | |
| 2009/0276483 A1 | 11/2009 | Lind et al. | |
| 2009/0276658 A1 | 11/2009 | Lind et al. | |
| 2009/0276754 A1 | 11/2009 | Lind et al. | |

OTHER PUBLICATIONS

International Search Report in PCT application PCT/US2008/085874, mailed Aug. 7, 2009.

(Continued)

*Primary Examiner* — Andy Ho
(74) *Attorney, Agent, or Firm* — Beyer Law Group LLP

(57) ABSTRACT

A computing system and method is a specification of user-defined business logic is provided as JAVA program instructions (or another programming language) which does not natively provide for specification of full transactionality, to accomplish a fully transactional application, including executed managed objects. The managed objects are persisted in a shared memory of the computing system, such that a scope of the objects is global to the fully transactional application. Furthermore, a catalog of the managed object is maintained. A query interface is provided for querying the managed objects, in order to receive a query from an application, to process the catalog, and to provide a result indication of at least one of the managed objects back to the querying application. Thus, for example, the application may process the managed objects that are indicated in the query result.

23 Claims, 19 Drawing Sheets

OTHER PUBLICATIONS

Written Opinion in PCT application PCT/US2008/085874, mailed Aug. 7, 2009.
International Search Report from PCT/US2009/042389, mailed Nov. 12, 2009.
Written Opinion from PCT/US2009/042389, mailed Nov. 12, 2009.
Zhang, S. et al. "Type-Safe Dynamic Update Transaction," In: 31st Annual International Computer Software and Applications Conference 2007, COMPSAC 2007 Jul. 2007, vol. 2 pp. 335-340.
Office Action in U.S. Appl. No. 12/433,742, mailed Nov. 23, 2010.

* cited by examiner

Name: One
Group: A
Minimum Number: 0
Maximum Number: 10

Name: Two
Group: A
Minimum Number: 11
Maximum Number: 20

Name: Three
Group: A
Minimum Number: 21
Maximum Number: 30

Name: Four
Group: B
Minimum Number: 0
Maximum Number: 10

Name: Five
Group: B
Minimum Number: 11
Maximum Number: 20

Name: Six
Group: B
Minimum Number: 21
Maximum Number: 30

FIG. 3

JAVA VIRTUAL MACHINE HAVING INTEGRATED TRANSACTION MANAGEMENT SYSTEM AND FACILITY TO QUERY MANAGED OBJECTS

BACKGROUND

The desire for high-volume, real-time transaction processing environments is well-known, for organizations such, as, stock brokerages, credit card processing facilities and online reservation systems. For example, from an operational point of view, "transactions" may include sales orders, credit card transactions or accounting journal entries. From a software point of view, transactions may include, for example, database transactions of the sort that keep information in a consistent form.

High-performance transaction processing used to be a rare phenomenon, utilized only in extreme environments by the largest companies. But in recent years, the Internet has opened the door to the arrival of global customers in quantity through e-commerce sites, call centers, and other forms of direct interaction. Business-to-business relationships are intermediated by direct computer-to-computer interaction, frequently based on Web services. Content delivery and mediation for services must take place in real-time. This bulge in transaction traffic follows the same pattern that has transformed the telecommunications industry from a few providers of old-style, fixed local and long distance calling services into a competitive field of real-time enterprises offering wireless mobile plans for delivery of complex, combined data, voice and video content.

The requirements of global and real-time transaction processing are becoming the norm, driving enterprises to seek out IT systems whose architectures can handle skyrocketing transaction volumes at the lowest possible cost per transaction, in a manner that allows for flexibility and agility in service offerings. Flexibility, high performance and low cost constitute a new transaction-processing triangle that confounds solutions and architectures designed on proprietary systems as recently as a decade ago.

One approach (which, while described here in the "Background," is not admitted to be prior art to the subject matter claimed herein) is a transaction processing development methodology employs a flexible transaction processing development framework to facilitate development of a desired transaction processing application. See, for example, U.S. patent application Ser. No. 11/959,333, filed on Dec. 18, 2007 and U.S. patent application Ser. No. 11/959,345, filed on Dec. 18, 2007. Both application Ser. No. 11/959,333 and application Ser. No. 11/959,345 are incorporated herein by reference in their entirety for all purposes.

In these patent applications, an example of a transaction processing development framework is described. In the described example, a plurality of service adaptors are provided. An infrastructure is provided via which a user-defined business logic of the desired transaction processing application may be provided to the transaction processing development framework. The business logic definition is processed to instantiate the transaction processing application, including, instantiating a subset of the service adaptors to implement services of the transaction processing application, and further including arranging the instantiated service adaptors to accomplish the business logic in conjunction with generic transaction processing logic. The arrangement of service adaptors is guaranteed, when executed, to accomplish the transaction processing application in a manner that is fully transactional.

Furthermore, other prior patent applications (U.S. patent application Ser. No. 12/433,087, filed on Apr. 30, 2009 as; U.S. patent application Ser. No. 12/433,094, filed on Apr. 30, 2009 as; U.S. patent application Ser. No. 12/433,617, filed on Apr. 30, 2009 as; and U.S. patent application Ser. No. 12/433, 742, filed on Apr. 30, 2009 as, all of which are incorporated herein by reference in their entirety for all purposes) describe a computing system in which the specification of a user-defined business logic may be provided as JAVA program instructions (or another programming language) which does not natively provide for specification of full transactionality, and the computing system ensures that a resulting configured system is fully transactional. Furthermore, the resulting configured system may include fully transactional managed objects that may, for example, be persisted in a global shared memory.

SUMMARY

In accordance with an aspect, a computing system and method is a specification of user-defined business logic is provided as JAVA program instructions (or another programming language) which does not natively provide for specification of full transactionality, to accomplish a fully transactional application, including executed managed objects. The managed objects are persisted in a shared memory of the computing system, such that a scope of the objects is global to the fully transactional application.

Furthermore, a catalog of the managed object is maintained. A query interface is provided for querying the managed objects, in order to receive a query from an application, to process the catalog, and to provide a result indication of at least one of the managed objects back to the querying application. Thus, for example, the application may process the managed objects that are indicated in the query result.

BRIEF DESCRIPTION OF THE DRAWINGS

Referring to FIG. 1, the "external world" 102 interacts with a JAVA-enabled transaction platform service 104.

FIG. 3 illustrates an example in which each of six defined partitions belong to one of two partition groups, and each partition group supports a range of partition numbers.

DETAILED DESCRIPTION

Figure 1:
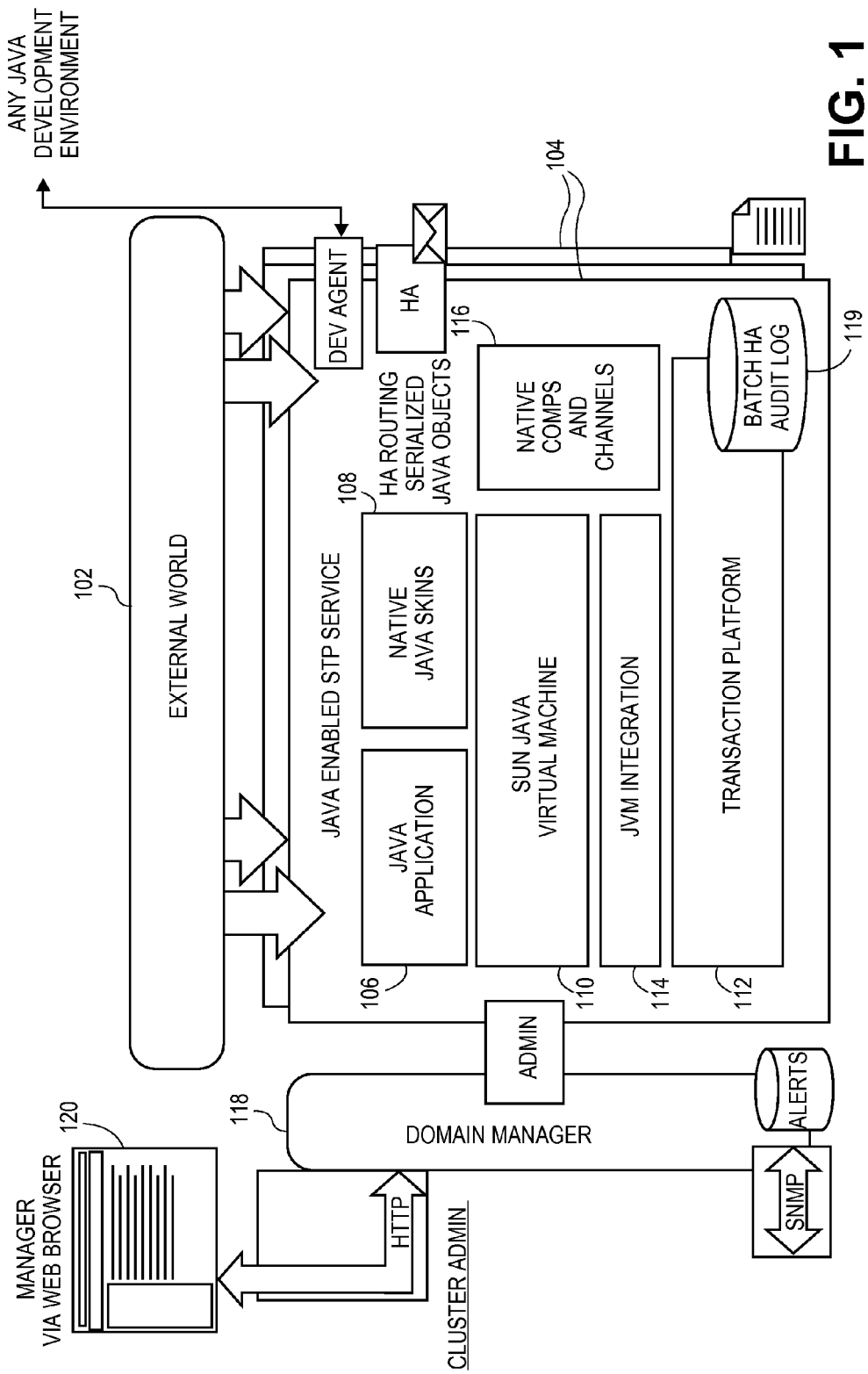
FIG. 1 illustrates a basic environment architecture in one example.

The inventors have realized the desirability of allowing a user to specify the user-defined business logic of a desired transaction processing application using a platform-independent language such as JAVA, even though JAVA (and other platform-independent languages) typically does not support fully-transactional applications. In accordance with an aspect, a JAVA Virtual Machine is interfaced to a transaction processing platform. Thus, for example, a transaction processing platform may be configured to execute instantiated service adaptors arranged to accomplish the business logic, provided in JAVA, in conjunction with generic transaction processing logic. The transaction processing platform may utilize a type system, and the type system utilized by the transaction processing platform may be exposed to the JAVA code using JAVA bindings, such as using a simple programming model to specify a JAVA class as a managed object. As a result, when executed, the user-defined business logic specified in JAVA and executed by a JAVA Virtual Machine (which may be, for example, a fully-certified JAVA Virtual Machine), enjoys all of the transaction processing features of the underlying transaction processing platform.

Before proceeding, we first provide a dictionary of acronyms and abbreviations used in this patent application. The "Kabira object modeling language" refers to a proprietary object modeling language (as opposed to JAVA, which is an open-source platform-independent language) usable to define business logic of a transaction processing application.

DICTIONARY OF ACRONYMS AND ABBREVIATIONS

| Term | Meaning |
| --- | --- |
| BPMN | Business Process Modeling Notation |
| CORBA | Common Object Request Broker Architecture |
| EJB | Enterprise JAVA Bean |
| IDL | Interface Definition Language |
| IDLos | Kabira object modeling language |
| J2EE | JAVA 2 Enterprise Edition |
| JAVA Object | An object that is implemented using JAVA. |
| JAR | JAVA Archive |
| JNI | JAVA Native Interface |
| JTA | JAVA Transaction API |
| JTS | JAVA Transactional Service |
| JVMTI | JAVA Virtual Machine Tool Interface |
| KCS | Kabira Configuration Service |
| KPM | Kabira Process Modeling |
| KSSL | Kabira Security Service Layer |
| KTP | Kabira Transaction Platform |
| KTP Object | An object that is implemented using IDLos. |
| KTVM | Kabira Transactional Virtual Machine |
| PHP | Web scripting language |
| RMI | Remote Method Invocation |
| TPP | Transaction Processing Platform |
| VM | Virtual Machine |

Furthermore, reference is made to the following documents:

The JAVA Virtual Machine Specification, Sun Micro Systems, Second Edition, Tim Lindholm and Frank Yellin, 1999.

JVM Tool Interface, Sun Microsystems, Inc., Version 1.0, 2004.

JAVA Native Interface Specification, Sun Microsystems, Inc., Version 6.0, 2003.

In one example, a virtual machine is provided that is an enhancement to a standard transaction processing runtime environment (for example, a transaction processing runtime environment as described in the U.S. patent application Ser. Nos. 11/959,333 and 11/959,345 referred to above and incorporated herein by reference above), to support native execution of JAVA code in a fully transactional manner. In one example, the virtual machine is implemented by a transactional processing platform (TPP) runtime being "embedded" into (or joined with) a standard (i.e., standards-compliant) JAVA VM. As a result, the enterprise-class robustness of the TPP is brought to JAVA applications. Basically, in the example, programmers may use a standard JAVA programming model to realize sophisticated transactional features, without the added complexity of having to code, embed frameworks, or integrate complex disparate technologies to realize the transactional features.

In other words, a solution is provided in which main-frame class services are tightly integrated into a JVM, which allows transactional, low-latency, highly available applications to be written with JAVA and resulting in what functions as a transactional JVM. This is accomplished, in one example, using a simple programming model to specify a JAVA class as a transactional system managed object. Such managed objects provide, for example, transactions, distribution, shared memory persistence, high availability and/or replication. These features are described in detail throughout this patent application, but briefly touched upon here.

With respect to transactions, all transactional system managed objects are fully transactional, supporting such features as, for example, transactional locking, deadlock detection, and isolation. More particularly, "fully transactional" means that the normal ACID properties of a transaction are preserved (Atomicity, Consistency, Isolation and Durability). With regard to atomicity, it is guaranteed that all data and events are either committed or not. It is assured that an event is delivered once and only once, as well as atomic data modifications. With regard to consistency, data consistency within a transaction is guaranteed. For example, any constraint violation (e.g. deadlock) causes all data modifications to be rolled back and all events to be replayed. With regard to isolation, transaction isolation is provided for multiple concurrent transactions. Multiple serializable and "dirty read" isolation semantics may be supported. With regard to durability, once a transaction commits, the results are committed to memory.

In a high-availability configuration, the data may be committed to memory on two machines transactionally. In some examples, single writer, multi-reader locking is also supported, with transparent lock promotion. Deadlock detection and retry may be transparently handled by the transactional JVM. Transactional isolation ensures that object state modifications are not visible outside of a transaction, until a transaction commits. Transactions may optionally span multiple JVM's, typically on different nodes of cooperating computing devices. Distributed locking and deadlock detection may be provided. The transactional JVM, in one example, provides all transactional features natively, such that no external transaction manager or database is required.

Managed objects may be distributed, and a distributed managed object may support transparent remote method invocation and field access. A distributed managed object may employ a single master node on which all behavior is executed, and that also holds the master data for the object. Generally, the managed objects may be held persistently in a shared memory. In this way, the object can live (e.g., be accessible, executed, etc.) beyond the lifetime of the JVM. In addition, shared memory objects may support extents.

A managed object may be mirrored, such that a mirrored managed object may have its object state transactionally copied from a primary node to another node, such as a backup node, when the object is modified. The backup node may, for example, take up processing of the object when then primary node is offline. Support may be provided to restore the object's state from the backup node to the primary node during application execution, without any service interruption. As a result, the managed object may have high availability properties.

Mirrored managed objects may be contained in a partition, and one or more partitions may exist on a single node. Each partition may be associated with a primary node and a backup node. Partitions may be migrated to different primary and backup nodes, during application execution, without service interruption. This may include repartitioning the managed objects to distribute the application load across different nodes, without service interruption.

A timer service may be provided to support the objects transparently across failover and restore operations. Object modifications may be optionally written to a local file system on the primary or backup nodes, such as in a change log, to support both multi-node memory and file system redundancy.

A replicated managed object may have its object state transactionally copied to all configured nodes when the object is modified. A replicated managed object also has a primary and backup node, which ensures that there is a backup node available for replicated object modifications in the case of failure of the primary node.

The transactional JVM may be, in general, compliant with industry-accepted JAVA specifications, such as being certified to be JAVA SE 6 compliant.

Having provided an overall introduction, we now provide a conceptual introduction to technical concepts provided by examples of a transactional JVM. Later, we specify in greater detail how these technical concepts may be realized in an embodiment.

As mentioned above, native JVM transactions may be provided for JAVA objects by a transactional JVM, without requiring any databases or transaction monitors. An atomic transaction may guarantee that a series of modifications to one or more objects either all occur (commit), or all do not occur (rollback). The state of the objects modified in the transactions is guaranteed to be consistent once the transaction completes. Multiple transactions occurring on the same objects are isolated from each other through transactional locking. However, once a transaction completes, the changes are made durable to ensure that the transactions can survive a system failure. These transactions are characterized by the well-known ACID principle (Atomic, Consistency, Isolation, Durability).

As also noted above, managed objects may have functionality appropriate to supporting fully transactional applications (and which functionality, in general, is not provided by conventional JVM's). In some examples, such functionality may be specified through the use of annotations, inheritance and configuration. In some examples, no special API's are needed to convert a "Plain Old JAVA Object" (POJO) into a transactionally managed object. As such, developer productivity may be improved, since developers may pay more attention to business logic and less attention to how that business logic may be implemented in a fully transactional manner. For example, existing JAVA code may even be supported, greatly easing migration of such code to a fully transactional environment.

Regarding distributed computing, it is noted that, during development, such objects may be restricted to being on one computing node and then, during deployment, the objects may be allowed to be distributed among multiple computing nodes. Mirrored objects may be associated with a Partition ID when created, where the Partition ID uniquely identifies a Partition that defines primary and backup nodes for the mirrored object.

In some examples, mirrored objects can only be created, updated and deleted on the currently active node for the partition, and can be read on either the primary or backup node. The active node for a partition is the configured primary node if the primary node is active, or is the backup node if the primary node is not active.

A replicated managed object supports all of the behavior of a mirrored managed object, plus all the object state is copied to all nodes in a cluster, so the replicated object state can be read on any node in the cluster. Mirrored objects are copied to only the backup node in a cluster, whereas replicated objects are copied to more than one node (typically, all nodes) in a cluster FIG. 1 illustrates a basic environment architecture in one example. Referring to FIG. 1, the "external world" 102 interacts with a JAVA-enabled transaction platform service 104. The service 104 is may be implemented by one or more servers operating in concert, specific examples of which are discussed in greater detail later. The JAVA-enabled transaction platform service 104 includes a JAVA application 106, native JAVA skins 108 and a JAVA virtual machine 110. A transaction processing platform 112 is interfaced to the JAVA virtual machine 110 via a TP/JVM integration layer 114. Native services and channels 116 of the transaction platform 112 are exposed to the JAVA virtual machine as well.

With regard to the FIG. 1, the transaction platform 112 operates to provide transactional processing, while the JAVA virtual machine 110 is bound to the transaction processing platform (and may be certified as meeting an applicable JAVA standard). Thus, for example, high-availability and other transactional functionality may be provided for applications written in the JAVA language, even existing JAVA code that has not been particularly written with transactional functionality in mind. For example, in-memory low latency transactional functionality may be automatically provided, as well as a high-availability (HA) audit log option 119 to batch HA updates to databases such as provided by MySQL or Oracle. Failover and rapid fail-back functionality may also be provided. Domain administration may be provided via a domain manager interface 118 which may be accessible, for example, via HTTP using a standard web browser 120.

In the FIG. 1 environment, JAVA code automatically becomes inherently transactional and thus, for example, all aspects of local and distributed HA transactions may be managed for what would otherwise be standard JAVA objects In one example, the following "extends" construct results in JAVA code being automatically transactional:

```
public classTransaction extends
    com.kabira.platform..Transaction {
    public Transaction.Result run(
    ** code here is automatically transactional)
```

In accordance with an aspect, annotations may characterize a class's transactional semantics. For example, in the following code sample, the class "Pojo" (which stands for plain old JAVA object) inherently has transactional properties. Isolation levels are granular to a per-field basis, and transactionality is automatically bypassed for static fields.

```
import com.kabira.platform.annotation.*;
@Transactional
public class Pojo
{
    @Isolation (level = Isolation.Level.SERIALIZABLE)
    public long serializableField=0;
    @Isolation (level = Isolation.Level.TRANSIENT)
    public long transientField =0;
    public static long staticField = 0;
}
```

We now describe a particular deployment model. In so describing the particular deployment model, we treat a "machine" as a particular localized computing device, and a "node" as a particular transaction application administration or application server. A "cluster" is a logical grouping of nodes that communicate to support a distributed transactional application. A "domain" is an administrative grouping of nodes for management and development, and a "domain group" is a sub-set of nodes in a domain for management and development. One or more nodes can run on a single machine. A node can belong to one cluster, a node can belong to one or more domains, and a domain group can belong to one domain. A cluster can be managed by more than one domain, and a cluster can also span one or more domain groups.

Now, as described above, managed objects are backed by shared memory. The managed objects can also be mirrored and replicated to other nodes in the cluster. In one example, the managed objects are not garbage collected; they are only deleted when explicitly deleted by the application. Managed objects thus may exist even following a normal JVM or machine shutdown, as well as surviving node and machine failures if they are mirrored or replicated to another machine.

An extent is a collection of all instances of a managed object. Extents are maintained for all managed objects. An extent can be used to find all instances of a managed object type at any time without having to maintain the collection, such as by actively keeping track of all the managed objects.

We now describe transaction functionality in more detail. For example, transactions can be local or distributed. Local transactions are used on a single node, even if the transactions span multiple JVM's on the single node. Distributed transactions are used between nodes. When a transaction spans nodes, a global transaction is started on the node that initiates the distributed work. The initiating node may act as the transaction coordinator; there need not be a separate dedicated transaction coordinator. That is, each node may act as a transaction coordinator for distributed work that the node initiates.

In some examples, there is no programmatic difference between local and distributed transactions. An appropriate transaction type is initiated transparently depending on whether local or remote objects are in the transaction. There may be a difference in how deadlocks are detected with local and distributed transactions, details of which are discussed later.

Transaction locks are used to maintain data consistency. In some examples, transaction locks are only taken on objects. A transaction lock is taken on an object when a transactional field is accessed or modified. The transaction lock is released when the transaction commits or rolls back. Executing a method on an object does not take a transaction lock (unless a transactional field is accessed in the method). This implies that multiple threads can be executing the same method on the same object at the same time.

No transaction locks are taken on extents when objects are created or deleted. This allows better parallelism for object creation and deletion, but it does have implications to transactional isolation. Locking and isolation are described in greater detail later.

The transaction system may support multiple reader, single writer locks. For example, multiple concurrent transactions can read the same object fields, but only a single transaction can modify an object field.

A read lock can be promoted to a write lock if an object field is read, and then the field is set. A read lock would be taken on the initial field read and then promoted to a write lock when the field is written. If multiple transactions attempt to promote a read lock on the same object, all transactions but one will generate a "promotion deadlock." A promotion deadlock causes the transaction to rollback, dropping its read locks. The transaction is then replayed causing the transaction to reacquire the object locks.

Distributed objects support the same locking paradigm as objects on the local node. However, data caching can affect the locking policy by accessing the object data locally instead of from the remote node. Cached object data does not cause a distributed lock to occur. This can cause "state conflicts" if the object data is modified.

We now discuss deadlock detection. Since transactions are running simultaneously, it is possible to have deadlocks in applications. Deadlocks may be automatically detected and handled, such as in the following manner. One transaction is chosen as the "winner" and allowed to complete, and the other deadlocked transactions are chosen as "victims," which are rolled back to where they started and replayed.

Deadlock detection and resolution is transparent to the application programmer, but deadlocks are expensive in both responsiveness and machine resources, so it is desirable to avoid deadlocks. Local transactions detect deadlocks immediately in the execution path. There is no timeout value associated with local transactions.

Distributed transactions use a configurable time-out value to detect deadlocks. If a lock cannot be obtained on a remote node within the configured time-out period, the distributed transaction is rolled back, releasing all locks. The transaction is then restarted. Because distributed deadlock detection is based on a time-out, applications with distributed deadlocks may perform poorly because the configured time-out would generally be large enough to ensure that no false deadlocks are reported during normal application processing.

Regarding isolation, transactions may support various isolation levels for object fields. One level is "none," for which modifications are visible outside of the current transaction before the transaction commits. The serializable level is such that modifications are only visible outside of the current transaction when it commits. The isolation level of distributed objects can be affected by the configured cache policy for the objects. With respect to extents, generally, one isolation level is supported. For example, a read-committed extent isolation level is such that extent iterations and cardinality will return inconsistent results in the same transaction if other transactions create or delete objects in an extent.

We now discuss transaction logging. To support rollback of a transaction, object modifications are logged. The logging mechanism takes place in memory by keeping a copy of the "before image" of any changes. Any object references that are no longer referenced in a transaction are protected from garbage collection so these references are still available if the current transaction rolls back.

If the current transaction commits, all logged data may be discarded and any reference locks to deleted objects may be released. If the current transaction rolls back, the original state of all objects is restored. Any objects created in the transaction are released to allow these objects to be garbage collected.

Regarding distributed computing, any managed object can be a distributed object. A distributed object transparently provides remote method invocation and access to object fields across nodes. The full transactional guarantees for non-distributed objects are also true for distributed objects.

Access to a distributed object is through a normal JAVA object reference. In an example, all managed object references include data to identify the node where the object was created. The same instance of an object generally cannot exist on multiple nodes. Copies of an object's state may be located on multiple nodes to improve performance or robustness, but the master copy is located on a single node—such as the node where the object was created.

An object's behavior executes on the node where the object was created. Any methods invoked on an object reference are sent to the master node and executed there. Objects of the same type can be created on multiple nodes. This is accomplished by installing the application class files, or implementation, on multiple nodes. This application architecture supports data partitioning and caching or service availability mechanisms.

Figure 2:
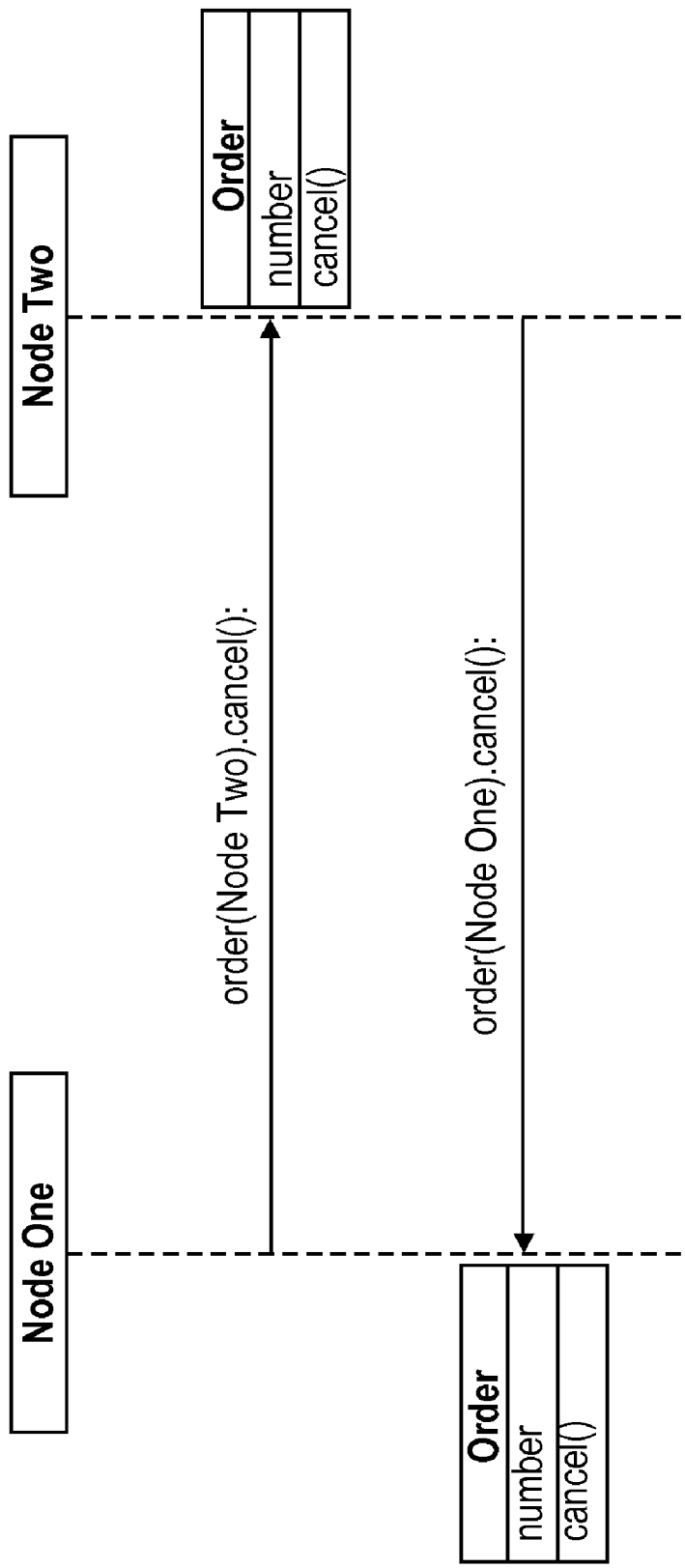
FIG. 2 shows an Order class that has its implementation installed on two nodes.

FIG. 2 shows an Order class that has its implementation installed on two nodes—Node One and Node Two. Two instances of the Order class have been created, one on Node One and one on Node Two. When the Order.cancel( ) method is executed on Node One, using the order (Node Two) instance, the method is executed on Node Two. The opposite is true for the order (Node One) instance.

We now discuss location transparency. Location transparency is provided for objects. This means that when an application accesses an object, the location of the object is transparent—it may be local or on a remote node. Location transparency is accomplished through the use of distributed references. All created managed objects have a distributed reference that contains the location where the object was created. Operations invoked on an object are routed back to the location where the object was created and the operations executed on that node.

Fields are accessed on a local copy of the field data in memory. Every node has both a location code and a node name. Location codes and node names are unique across all nodes in a cluster. The default location information may be, for the location code, a hash of the node name. For the node name, the default value may be the local host name. Both of these defaults can be changed to allow multiple nodes to run on the same host or to support a multi-homed host.

A location code may be a numeric identifier that is encoded in every object reference associated with managed objects. The location code can be used to determine the actual network location of the object. The location code of the node where the object was created is stored in the object reference. A node name is a human-readable string associated with every node. The node name is used to configure directed creates and High-Availability partitions.

Location discovery services provide support for runtime discovery of location information. This discovery may be utilized to allow nodes to discover all other nodes along with their location information. The location discovery service provides runtime mapping between a location code or node name and an actual network address. This mapping may be done at runtime so network specific addresses do not need to be encoded in object references. The location discovery service may perform location discovery in two ways: static discovery using configuration information; and dynamic discovery using a UDP broadcast protocol.

The system administrator can optionally configure the mapping between a node name and a location code/network address. This may be typically used if UDP broadcast cannot be used for location discovery. An example of when this may be used is when the remote node is across sub-net boundaries where broadcasts are not allowed.

If configuration information is not provided for a location name, UDP broadcast may be used to perform dynamic location information discovery. This has an advantage that no configuration for remote nodes has to be done on the local node—it is all discovered at runtime.

Location discovery is performed in at least the following cases: A directed create to a remote node; and a method or field is set on a remote object. When an object type is defined to use directed create, the location on which the create should occur is specified using a node name. When a create of this type is done, a location discovery request is done by node name, to locate the network information associated with the node name if the network information is not already known on the local node.

When an operation is dispatched on a remote object, a location discovery request may be done by location code, to locate the network information associated with a location code, if the network information is not already known on the local node.

We now discuss examples of types and type conflicts. Type information for every class installed on the local node may be broadcast to all other nodes when the local node starts up. As new types are added to the local node, their type information is broadcast to all other nodes in the cluster.

When a node receives type information for a type that is not present on the node, the node adds that type. When a node receives type information that is already present on the node, the node determines if the received type information differs from the type information that is currently installed on the node. If the two types are the same, the node ignores the received type information. If the two types differ, information about the differences is stored in a type-mismatch table. Type mismatches can happen when different versions of the same type are installed on separate nodes.

Whenever data is marshaled for this type, either from the local node or when it is received from a remote node, the type mismatch table is checked to see if the type matches using a type identifier and the location code of the remote node. If the type identifier/location code combination is found in the type mismatch table, a type conflict exception will be raised and returned to the originator of the request.

We now discuss "directed creates." As has been discussed earlier, the transaction platform supports creating distributed objects on specific nodes. This allows an object creation to be done on any node in a cluster and the create actually happens on a specific node that may not be in the cluster on which the create was done.

The remote node does not need to have an implementation of the object installed for directed create to operate properly. However, any attempt to execute behavior on the remote object may require the object implementation to be installed on the remote node.

In some examples, a Directed Create type cannot also be a Cache Group type. Cache groups provide support for pushing object state to a set of network nodes. This maintains a distributed extent for the type, providing a very simple mechanism to access distributed references on a remote node. More details of locating a remote object are discussed later.

Nodes may be added to one or more cache groups by examining all types on the local node and determining the cache groups for all of the installed types. This is the list of cache groups for which this node participates.

Cache groups may be automatically maintained. When a node is started, it finds any other nodes that are part of any of its cache groups and pulls all references for those types to the local node. Once the node is initialized the references are maintained by pushing updates to all nodes in the cache group as objects are created and deleted.

A node should have an implementation of the object installed to receive updates from other nodes. If a node does not have the implementation installed, the cache group update will not be performed and no references will be pushed to the node. A log message will be generated indicating that a cache group is defined for the node, but no implementation installed.

In some examples, a Cache Group type cannot also be a Directed Create type.

Two distinct types of object data caching may be provided; passive, or "pull" caching, and active, or "push" caching. Passive caching copies field data to a remote node only when an object instance is accessed on the remote node. Active caching automatically propagates all object creates, updates, and deletes to all remote nodes configured in a "cache group."

Once data is cached on a remote node, the data is refreshed based on the cache policies described below. All field access is done using the local cached copy of data. This can avoid network I/O that may required by other distribution technologies to access object field data.

Modifications to an object's fields on a remote node are written back to the node on which the object was originally created. The update happens in the same or a different transaction based on whether asynchronous or synchronous transactionality is configured. Details of "asynchronous" vs. "synchronous" transactionality are discussed later.

Distributed types have a cache policy. The cache policy controls when cached data is considered stale and should be read from the node on which the object was created. In some examples, the following cache polices can be defined for a type. These cache policies affect the behavior of an object that is being accessed on a remote node. They do not affect the push caching done by a Cache Group. The master node for an object is the one on which it was originally created.

A "Never" cache policy means that the cached copy is always considered stale. Every access to this object will cause the cached data to be refreshed. An "Always" cache policy means that the cached copy is always considered valid. It is never refreshed. A "Once" cache policy means that the first time a reference is accessed, the cache is considered stale. After that the cached copy is always considered valid. It is never refreshed again. A "Timed" cache policy means that the cached copy is considered valid for a configured amount of time. The amount of time after which it is considered stale is controlled by a cache time. If the object is accessed after cache time has expired since it was originally read onto the node, it will be refreshed.

Types that are defined as part of a cache group should have a cache policy of Always. This is because any updates made to instances of this type will be pushed out to all nodes in the cache group keeping the data in sync automatically. If the cache policy is not Always, remote node caches may cause unnecessary updates when an object is accessed.

Regarding asynchronous vs. synchronous, creates, writes, and deletes can be configured to occur either asynchronously or synchronously with respect to the transaction in which the create, write or delete occurred. If these operations are configured to occur asynchronously, they will occur in a separate transaction on the remote node than they did on the local node. This implies that there may be data inconsistency between the two nodes for a period of time. There are no distributed locks taken on remote nodes.

If these operations are defined to occur synchronously, they will occur in the same transaction on the remote node as they did on the local node. This implies that there is always data consistency between two remote nodes. Distributed locks are taken on the remote node to ensure the data consistency.

Regarding distributed computing, asynchronous operations may improve the overall performance of a distributed system because no remote locks are held. They also avoid the overhead associated with a distributed transaction. A downside is that there can be data inconsistency in a distributed system at a given point in time. This inconsistency lasts until the asynchronous work is executed on the target node.

Asynchronous creates cause an object to be created in a separate transaction on a remote node. Because the create is done in a separate transaction on the remote node, the transaction system does not report a duplicate key error back to the node on which the object was created. If a duplicate key is detected on the remote node, the create is not performed and a warning message is logged.

Regarding reading and writing data, object field data is transparently read from and written to a remote node when field data is accessed on a local node based on the caching policy.

Read operations are dispatched to a remote node to read field data depending on whether the cached data on the local node is stale. If the local cache is stale, a read will be done when a field is accessed. The read operation will complete before the get of the field data returns to the caller. All reads are done on the remote node in the same transaction in which the field access occurs—in other words, the reads execute synchronously.

When a field associated with a remote object is modified on a local node, a write is dispatched to the remote node to update the field data on that node. This write can occur in the same, or a different transaction depending on whether writes are defined to execute asynchronously or synchronously for the type. If writes are defined to be performed asynchronously for a type, it is possible that the target object of the write on the remote node has been deleted. This error is detected and the write is discarded. A warning message is logged.

A state conflict is reported when a write operation from a remote node detects that the data on the local node has changed underneath it. This is possible in a distributed system because the object may be modified from multiple nodes in the system.

State conflicts may be handled differently depending on whether writes are configured to be executed asynchronously or synchronously. When writes are configured to execute asynchronously, the state conflict is not detected until the write is executed on the remote node. This is in a different transaction than the one that modified the object data. If a state conflict is detected, the data is discarded. A warning message is logged.

When writes are configured to execute synchronously, state conflicts are handled transparently. If a state conflict is detected on the remote node, an error is returned to the local node, where the cache is flushed. The transaction will be rolled back and replayed. The application is never aware that a state conflict occurred.

Extents have a cache policy of Always. When an extent is accessed, only object references on the local node are returned. References are in the local extent either because the object was created on the local node, or it was pushed to the local node because the node is part of a cache group and references are being pushed to the node.

We now discuss an overview of failure conditions (abandoned transaction handling). Transactions can only be committed or rolled back by the initiator of the transaction. This means that any global transaction executing on a remote node cannot commit or roll back until the node initiating the transaction explicitly indicates that this should happen.

In normal operation, this generally works well. However, in the case where a node that initiated a global transaction fails, the transaction will remain pending on all remote nodes until the initiating node is restarted. If the initiating node never restarts, then the transaction is abandoned. Abandoned transactions generally require operator interaction to determine the outcome and complete the transaction.

We now discuss high-availability (HA). An HA node is a node that is configured for the HA service. An HA node may be in one of four HA states. An "unknown" HA state means that the node is started but the HA configuration has not been loaded. An "inactive" HA state means that the HA configuration is loaded, but HA has not been enabled. An "active" HA state means that the HA state is enabled and active. Finally, a "down" HA state means that connectivity has been lost to the node. The down state will generally only be seen for remote nodes. A local node will not see itself in the down state. A node in an Active state can receive requests from a router (details of which are discussed later), create, modify and delete Mirrored and Replicated Managed Objects.

A node in an Unknown state functions as a non-HA node. An Unknown state implies that the node has not been configured for HA. The HA router will only route to the local node. Mirrored and Replicated Managed Objects can be created, modified or deleted, but the changes are not propagated to other nodes A node in an Inactive state does not receive requests from an HA router but it can route to other nodes. This is normal operation when a node is recovering from a failure. An Inactive node does not create, modify, or delete Mirrored or Replicated Managed. The Mirrored and Replicated Managed Objects are hosted on a backup node if the backup node is Active.

When a node is restarted, it is in an Inactive state. A restore node command is used to restore the node to Active.

Regarding mirrored and replicated managed objects, mirrored managed objects have a copy of the object state transparently maintained on a backup node. Mirrored managed objects can be updated on the current active node—either the primary or the backup if the primary node is unavailable. Replicated managed objects have a copy of the object state transparently maintained on a backup node. They also have the object state copied to all nodes in the cluster. Replicated Managed Objects are only updated on the current active node—either the primary or the backup node if the primary node is unavailable.

Regarding partitions, to balance an application workload across multiple machines, application data may be organized into partitions. Each mirrored and replicated managed object is in a single partition. When an object is created, an application assigned partition identifier for an object defines what partition contains the object. A partition identifier includes a group name and a number.

A partition is identified by a name. Partition names are globally unique on all nodes in the cluster. A partition group is a set of partitions that all have the same group name. The range of partition numbers supported by a partition group is from zero to the maximum partition number defined for all partitions in the group.

Partition numbers should not overlap for partitions in the same partition group, and the range of partition numbers should cover the entire range of possible partition number values, from zero to the maximum partition number. A partition identifier uniquely identifies its associated partition by a partition group name and a partition number falling within the range of partition numbers for a specific partition.

In the example shown in FIG. 3, six defined partitions are named One through Six. There are two partition groups defined—A and B. Each partition group supports a range of partition numbers from zero to 30. A partition identifier that has a group of A and a number of 22 maps to partition Three. Partitions are defined using configuration tools. The same partition configuration is loaded on all nodes for correct operation.

A node can support one or more partitions. All partitions generally have a primary and a backup node defined. If the primary node fails, the backup node takes over maintaining the object state for the primary node. When the primary node is brought back online, it is restored from the backup node. Backup nodes can also be taken offline and restored from a primary node.

Partition States (Partitions can have a state as shown in the table below):

| | |
|---|---|
| HostedOnPrimary | The partition is active on the primary node |
| HostedOnBackup | Partition is active on backup node. |
| Migrating | Partition is migrating to another node |

| | |
|---|---|
| RestoringPrimary | Partition is being restored on primary. State only seen on backup node |
| RestoringBackup | Partition is being restored on backup. State only seen on primary node |
| PrimaryBeingRestored | Partition is being restored on primary. State only seen on primary node |
| BackupBeingRestored | Partition is being restored on backup. State only seen on backup node. |
| Abandoned | Partition not active on any node. Both primary and backup nodes for partition are unavailable. |

Figure 4:
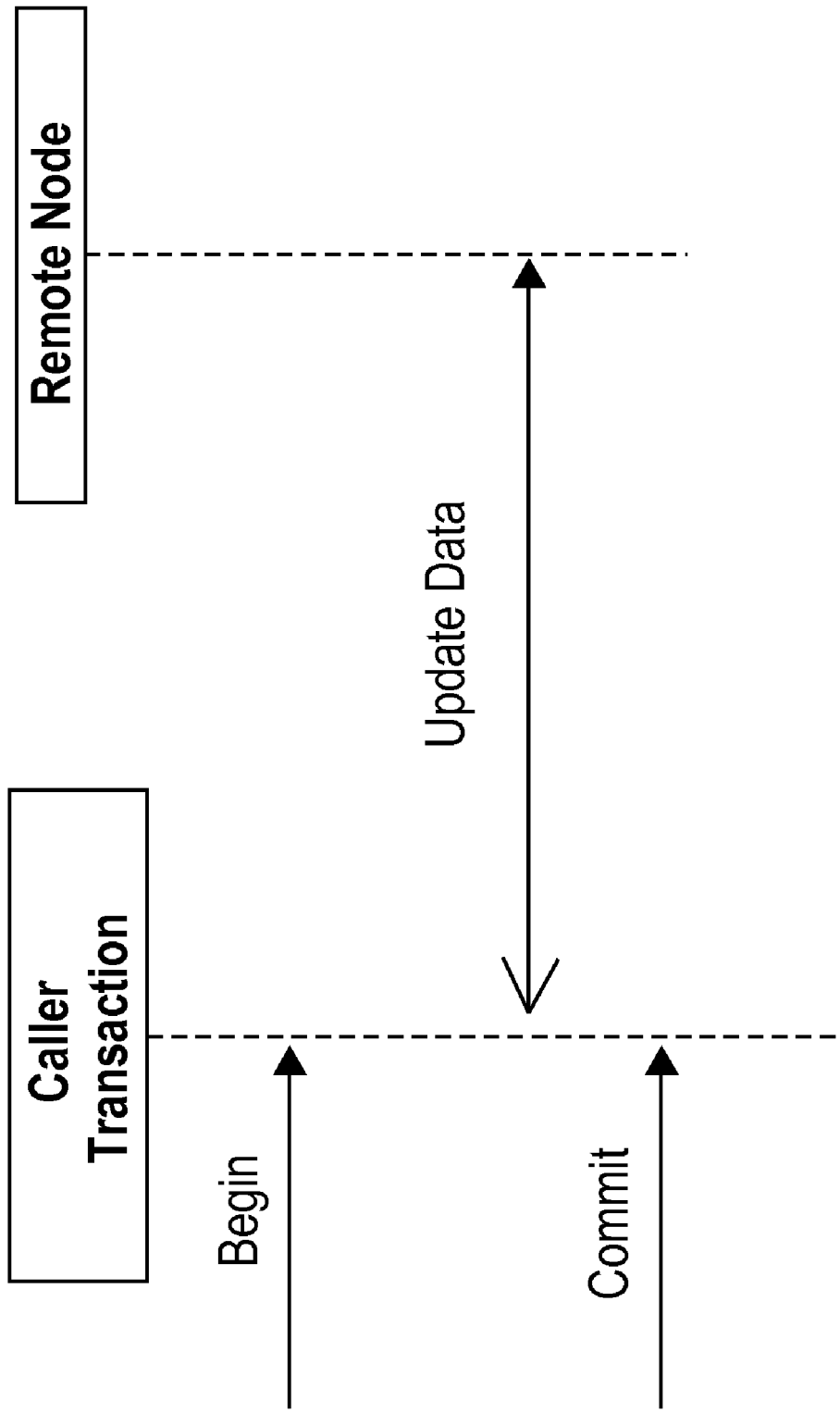
FIG. 4 illustrates an example in which synchronous updates cause object data to be copied to a backup, and any replicate, nodes in the same transaction in which it is modified.

Mirrored and Replicated Managed Objects can be copied to remote nodes either synchronously or deferred. As shown in FIG. 4, synchronous updates cause the object data to be copied to a backup, and any replicate, nodes in the same transaction in which it is modified. The object data is copied to the backup node when the current transaction commits. Multiple updates to the same object in the same transaction will result in only a single update to the remote nodes. Synchronous copies ensure that no data is lost during failures at the cost of network latency in the application transaction path.

Figure 5:
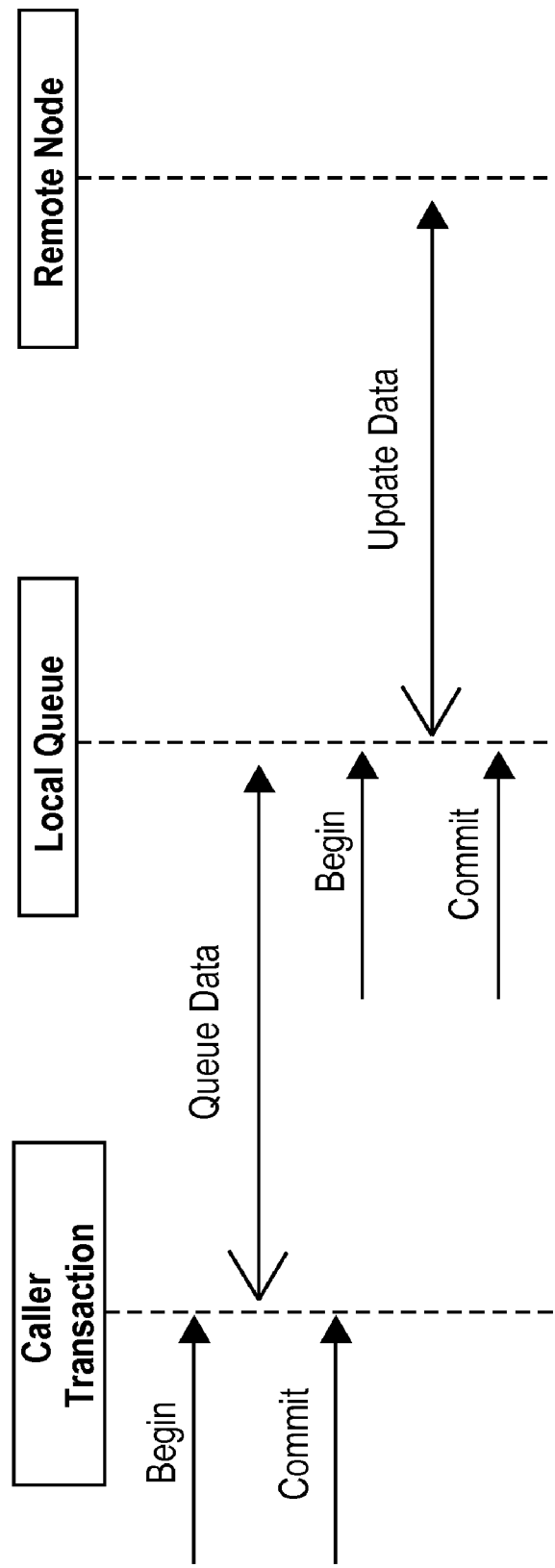
FIG. 5 illustrates an example in which deferred updates cause object data to be copied to a backup, and replicate, nodes based on a configurable time interval.

As shown in FIG. 5, deferred updates cause the object data to be copied to a backup node and to any replicate nodes, based on a configurable time interval. Objects are copied to remote nodes in a different transaction than the one in which they were modified. Deferred updates expose the application to data loss during failures, but it removes the network latency in the application transaction path.

When a node in an HA cluster is to be brought back online following a failure or system maintenance, the node is restored. A node restore performs the actions of copying mirrored object data to the node for all partitions hosted on the node, and copying all replicated object data to the node. When all of the object data copies complete, all partitions that have this node as a primary are changed to active on this node. The node state is than changed to Active and normal HA processing starts.

Regarding migration of a partition, partitions support migration to different primary and backup nodes without requiring system downtime. Partition migration is initiated by updating the configuration on the current primary node for the partition.

When the updated configuration is loaded and activated on the primary, all object data in the partition is copied to the new primary and/or backup node. When the copy completes, the partition state is changed to indicate that the partition is now active on the new node(s). The object data is deleted on the node from which the partition moved.

The partition state changes from HostedOnPrimary to Migrating when the configuration is activated on the primary node. When the migration is complete, the partition state is HostedOnPrimary again. Once the partition migration completes, the updated HA configuration file should be loaded on all other nodes in the HA cluster.

Regarding routing, transparent routing of data across nodes is provided. Routing to a specific partition or node is supported. When routing to a partition, the data is sent to the currently active node for the partition. This may be the primary node, or the backup node if the primary node is offline. Routing may be used for a number of reasons, including ensuring that all Mirrored and Replicated Managed Object updates occur on the active node for the object. Routing may also be used to send data to a specific node that has connectivity to an external client or system. Routing may also be used for other application specific reasons. Any JAVA object that is serializable can be routed.

Regarding configuration, online versioning of configuration data is supported. This allows the configuration to change without impacting a running application.

In some examples, configuration files contain the following items:
Name—user define name.
Version—version number of configuration file
Type—type of configuration data
For example:

```
//
// This file defines version 1.0 of a distribution configuration named myconfiguration
//
configuration "myconfiguration" version "1.0" type "distribution"
{
    ...
};
```

Figure 6:
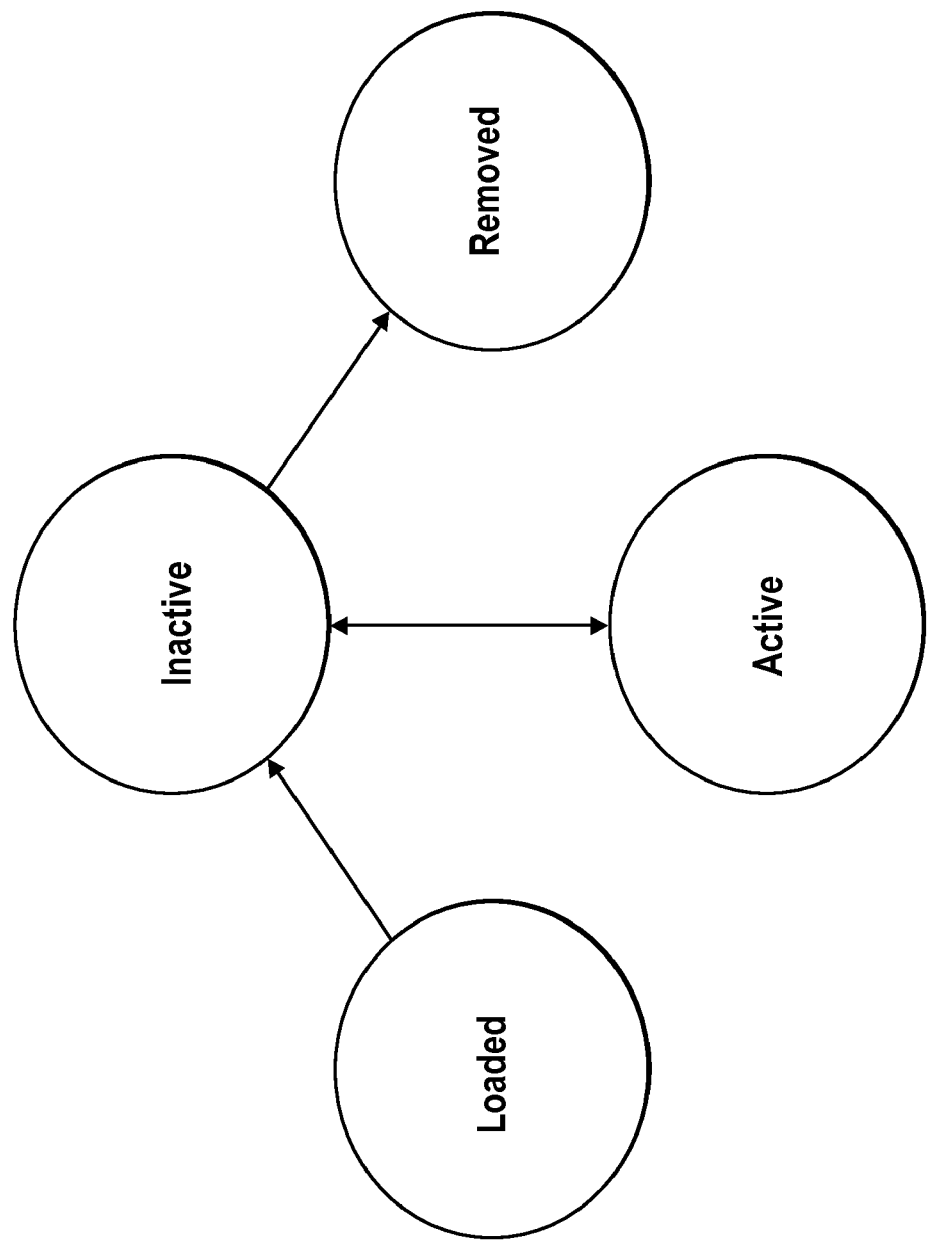
FIG. 6 illustrates an example of a configuration life cycle through which configuration files can go.

Configuration files can go through a configuration life cycle as shown in FIG. 6. For example, possible states are:
Loaded—configuration data has been loaded into a node. This is a transient state. The configuration data automatically transitions to the Inactive state once it has been successfully loaded.
Inactive—configuration data is loaded into a node, but it is not the active version.
Active—the configuration version is active.
Removed—configuration data has been removed from the node. This is a transient state.

Only one active version is generally allowed for each configuration Name within a type. For example if there are two versions, version 1.0 and version 2.0, of a configuration file with a Name value of "myconfiguration" and a type of distribution, only one version is active at a time in a node.

An audit step occurs before any configuration data changes states to ensure that the configuration data does not cause runtime failures. If the audit fails, the configuration state change does not occur and the system is left in the previous known good state.

When one version of a Name is active, and a new version is activated, the old version is replaced. That is, the old version is deactivated and the new version is activated as a single transaction. For example, loading and activating version 2.0 to replace version 1.0 may take place as follows:
1. Configuration "myconfiguration" version 1.0 is active.
2. Configuration "myconfiguration" version 2.0 is loaded, passes audit, and is activated.
3. Configuration "myconfiguration" version 1.0 is now inactive, and configuration "myconfiguration" version 2.0 is active.

Because the configuration replacement is done in a single transaction, there is no disruption to a running application.

Deactivating a configuration version does not restore any previously active version. Another version is activated, or loaded and activated, as a separate step. (Until this is done, there is no active version.) Nor does deactivating a version unload it; it must be explicitly removed to achieve this. Until removed, a deactivated version remains available to be reactivated again without having to reload the configuration data.

Having described some basics of distributed JAVA transactional applications, we now describe a methodology to developing such distributed applications using the transaction platform. Distributed applications may be developed using standard JAVA development tools, and the deployment and execution of the thus-developed applications are transparently managed on multiple nodes.

For example, features provided to support distributed application development are:
deploying applications to one or more nodes in an application domain.

partitioning applications using domain groups within an application domain.

dynamically adding a node to an application domain.

automatically restoring an application to a node that is restarted in an application domain.

application output available in the development tool for all application nodes.

Distributed development of applications, in one example, utilizes a Domain Manager node to coordinate the deployment and execution of applications to multiple nodes. To support distributed development, a deployment tool may be configured to connect to a Domain Manager node. The Domain Manager node coordinates all communication to the application nodes.

When an application is executed, the main entry point for the application is loaded and executed on all target nodes for the application. The same application is loaded on all application nodes. If the application requires different behavior on different nodes, application logic should provide this alternative behavior. Once "main" is started on each application node, each node requests class files as needed based on application execution. This implies that different class files are executed on each node. The standard class resolution rules are used to locate class files, as described in detail later.

Figure 7:
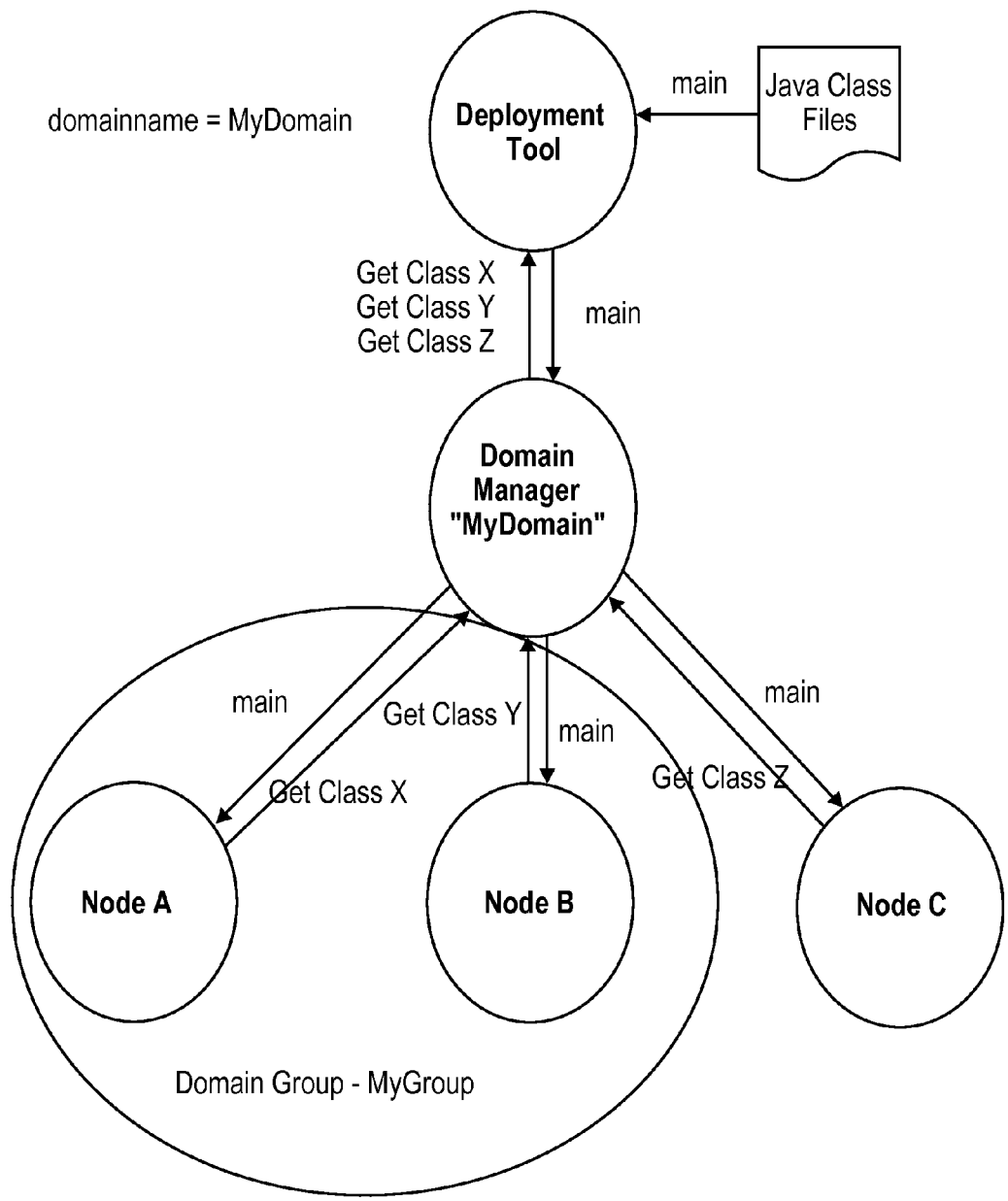
FIG. 7 illustrates an example in which different class files are executed on each of a plurality of nodes.

For example, in FIG. 7, Node A requests class X from the client, node B requests class Y, and node C requests class Z. The Domain Manager monitors the execution of the application on all nodes. The deployment tool runs until all application nodes exit. Individual nodes can exit, and new ones can join the distributed application while the program is being executed.

The application execution scope may be controlled using these Deployment Tool parameters:

domainname—execute the application main on all nodes in the domain.

domaingroup—execute the application main on all nodes in a domain group.

domainnode—execute the application main on a single node.

For example using FIG. 7, the parameters may be:

domainname=MyDomain—executes main on Node A, Node B, and Node C.

domaingroup=MyGroup—executes main on Node A and Node B.

domainnode=Node C—execute mains on node C only.

As an illustration, the example below is run twice—once with domainname=Fluency Development and once with domainnode=primary, and the results are shown.

Distributed Development

```
//        DESCRIPTION
// snippet to show execution on multiple nodes
//
// TARGET NODES
//
```

```
//        domainname = Fluency Development
//        domainnode = primary
package programming.fluency.development;
public class A
{
        public static void main (String [ ] args)
        {
            System.out.println("Welcome to Fluency");
        }
}
```

Here is the output using domainname=Fluency Development.

```
[replica] Listening for transport dt_socket at address: 33959
[backup] Listening for transport dt_socket at address: 42952
[primary] Listening for transport dt_socket at address: 62361
[replica] Welcome to Fluency
[backup] Welcome to Fluency
[primary] Welcome to Fluency
INFO:   Application [programming.fluency.development.A1] running on
        node [replica] exited with status [0]
INFO:   Application [programming.fluency.development.A1] running on
        node [backup] exited with status [0]
INFO:   Application [programming.fluency.development.A1] running on
        node [primary] exited with status [0]
INFO:   Run of distributed application
        [programming.fluency.development.A1] complete.
```

Here is the output using domainnode=primary.

```
[primary] Welcome to Fluency
INFO: Application [programming.fluency.development.A2] running on node [primary]
   exited
with status [0]
INFO: Run of distributed application [programming.fluency.development.A2] complete.
```

When a new node joins a domain that is currently executing an application, the application is deployed to the new node transparently. Any application data required for that node should be either replicated or mirrored managed objects, so that the data is available on the new node.

A node can remove itself from the distributed application by leaving the domain. A node can leave a domain because it is shutdown, it is in an error condition, or it is explicitly removed from a domain. The deployment tool is notified that a node left the distributed application; however, execution continues. A node that removed itself from a distributed application can rejoin the distributed application by joining the domain again. When the node is active in the domain again, it is treated the same as a new node being added to the domain.

Regarding debugging, a JAVA debugger can be remotely attached to any of the application nodes participating in a distributed application. The following Deployment Tool parameters are examples of parameters that can be used to control debugging of distributed applications:

remotedebug—enable remote debug port on all target application nodes.

suspend—suspend all target application nodes before executing main.

When using suspend to control execution of main on target application nodes, the debugger should be connected to each application node to continue application execution. In an example, if the debugger is not connected to an application node, the application will never continue executing on that node.

The output below shows what may be displayed when an application is deployed to a node (annotation added):

```
INFO: fluency.jar version: [core_linux080924]
INFO: Kabira Domain Manager version: [core_linux080924]
INFO: node [replica] version: [core_linux080924]

# This is the requested debugger port on the replica node

INFO: node [replica] JVM remote debugger agent listening on port [48072] ...
INFO: node [backup] version: [core_linux080924]

# This is the requested debugger port on the backup node

INFO: node [backup] JVM remote debugger agent listening on port [2471] ...
INFO: node [primary] version: [core_linux080924]

# This is the requested debugger port on the primary node

INFO: node [primary] JVM remote debugger agent listening on port [9738] ...

# These are the messages from the JVM confirming the debugger port
# on all nodes

[replica] Listening for transport dt_socket at address: 48072
[backup] Listening for transport dt_socket at address: 2471
[primary] Listening for transport dt_socket at address: 9738
```

We now describe details of a transaction processing JAVA Virtual Machine and its life cycle. Regarding starting and stopping, when a transaction processing JVM is first started, it executes the application's main entry point, passing in any specified application parameters. When the main method returns, the JVM exits. The following is a simplistic example of the entry and exit point in JVM source code.

```
package programming.fluency.jvmlifecycle;
public class A
{
    public static void main(String[ ] args)
    {
        //
        // Returning from main - causes the JVM to exit
        //
        System.out.println("returning from main");
    }
}
```

In the example, when main exits, the JVM is shut down. The node waits for a configurable amount of time before forcing down the JVM. If the node has to force down the JVM, the node must be restarted to be used again. The usual reason that a JVM will not exit is that the application started threads that do not exit when the JVM is asked to shutdown.

A transactional JVM can also be shutdown by an operator command external to the application. The application can detect the operator command and exit from main when the command is detected. An example of such shutdown is provided in the following example.

```
package programming.fluency.vmlifecycle;
import com.kabira.platform.swbuiltin.*;
import com.kabira.platform.Transaction;
public class E extends Transaction
{
    private boolean m_exit = false;
    public static void main (String [ ] args) throws InterruptedException
    {
        E    e = new E( );
        while (e.m_exit == false)
        {
            e.execute( );
            System.out.println("waiting for operator to shutdown JVM...");
            Thread.sleep(4000);
        }
        System.out.println("Operator shutdown JVM exiting");
        //
        // Return from main shutting down the JVM
        //
    }
    @Override
    protected void run( ) throws Rollback
    {
        m_exit = EngineServices.isStopping( );
    }
}
```

When the preceding example is run, it outputs the following (annotation added):

```

# Waiting for node to shutdown

waiting for operator to shutdown JVM...
waiting for operator to shutdown JVM...
waiting for operator to shutdown JVM...
waiting for operator to shutdown JVM...
waiting for operator to shutdown JVM...
waiting for operator to shutdown JVM...
waiting for operator to shutdown JVM...
waiting for operator to shutdown JVM...

# Node is shutdown. An error is seen since communication was
# lost to the node from the client when the node shuts down.
# This is the expected behavior.

# NOTE: The "Operator shutdown JVM exiting" message is not printed
# because the node shutdowns before the message is seen by the
# deployment tool.

Error: [39] : Node cannot perform administration commands. Reason: switch not started (switchadmin notifier not available).
FATAL: Command failed: null
```

We now describe managing threads. In particular, in order to cleanly shutdown the JVM, all user created threads should exit when main returns. The following approaches may be used to manage user threads to ensure a clean JVM shutdown:
1. Do not return from main until all user threads exit.
2. Use a JVM shutdown hook to determine when to exit user threads.
3. Mark all user threads as daemon threads.

The example below shows the use of Thread.join( ) to block in main until the user thread exits.

```
package programming.fluency.vmlifecycle;
class T extends Thread
{
    @Override
    public void run( )
    {
        System.out.println("hello from the thread");
    }
}
```

```
public class B
{
    public static void main(String[ ] args)
    {
        //
        // Create and start a new thread
        //
        T   t = new T( );
        t.run( );
        //
        // Wait for the thread to return before exiting main
        //
        try
        {
            t.join( );
        }
        catch (InterruptedException ex)
        {
            // handle interrupted exception
        }
        //
        // Returning from main - causes the JVM to exit
        //
        System.out.println("returning from main");
    }
}
```

The example below shows the use of a JVM shutdown hook to coordinate shutdown of user threads.

```
package programming.fluency.vmlifecycle;
//
// This is the user thread
//
class T extends Thread
{
    volatile boolean done = false;
    @Override
    public void run( )
    {
        while (done == false)
        {
            try
            {
                System.out.println("thread sleeping...");
                Thread.sleep(4000);
            }
            catch (InterruptedException ex)
            {
                // Handle exception
            }
        }
    }
}
//
// This is the shutdown hook thread
//
Class S extends Thread
{
    S(T t)
    {
        m_t = t;
    }
    private T m_t;
    @Override
    public void run( )
    {
        System.out.println("VM shutting down");
        m_t.done = true;
    }
}
public class D
{
    public static void main(String[ ] args)
    {
        //
        // Create a thread
        //
        T   t = new T( );
        //
        // Set up a shutdown hook
        //
        S   s = new S(t);
        Runtime.getRuntime( ).addShutdownHook(s);
        //
        // Start the user thread
        //
        t.start( );
        //
        // Return from main - causes the JVM to call the
        // installed shutdown hook and to exit the JVM
        //
        System.out.println("returning from main");
    }
}
```

The example below shows how a thread can be marked as a daemon thread. Daemon threads allow the JVM to exit even if they are running.

```
package programming.fluency.vmlifecycle;
class T extends Thread
{
    @Override
    public void run( )
    {
        try
        {
            System.out.println("thread sleeping...");
            Thread.sleep(5000);
        }
        catch (InterruptedException ex)
        {
            // Handle exception
        }
    }
}
public class C
{
    public static void main(String[ ] args)
    {
        //
        // Create a new thread
        //
        T t = new T( );
        //
        // Mark the thread as a daemon thread
        //
        t.setDaemon(true);
        //
        // Start the thread
        //
        t.run( );
        //
        // Returning from main - causes the JVM to exit
        //
        System.out.println("returning from main");
    }
}
```

Regarding unhandled exceptions, unhandled exceptions cause the current thread to exit. If the current thread is the thread in which main was executed, the JVM will exit with a non-zero exit code. The example below shows an unhandled exception in the main thread.

```
package programming.fluency.vmlifecycle;
class UnhandledException extends JAVA.lang.Error
```

```
{
}
public class A
{
    public static void main (String [ ] args)
    {
        //
        // Throw an unhandled exception - non-zero exit code returned
        from main
        //
        throw new UnhandledException( );
    }
}
```

When the above example is run, the following output may be generated:

```
[primary] Listening for transport dt_socket at address: 50647
[primary] JAVA main class programming.fluency.vmlifecycle.A.main exited with an exception.
[primary] JAVA exception occurred: programming.fluency.vmlifecycle.UnhandledException
[primary] at programming.fluency.vmlifecycle.A.main(A.JAVA:30)
INFO: Application [programming.fruency.vmlifecycle.A2] running on node [primary] exited
with status [-1]
INFO: Run of distributed application [programming.fluency.vmlifecycle.A2] complete.
```

Transactional behavior is optionally provided for any JAVA class. Transaction boundaries may be defined using, in an example implementation, the com.kabira.platform.Transaction class. Annotation is used to specify which classes are transactional.

An example of a transaction class is show below:

```
package com.kabira.platform;
public abstract class Transaction
{
    /**
     * Possible returns from the execute( ) method.
     */
    public enum Result
    {
        /** Commit the transaction */
        COMMIT,
        /** Rollback the transaction */
        ROLLBACK
    }
    /**
     * Exception thrown if execute( ) is called with a transaction
     * already active, or the transaction services are not
     * available.
     */
    public static class InvalidTransactionState extends JAVA.lang.Error
    {
        InvalidTransactionState(String message)
        {
            super(message);
        }
    }
    /**
     * Exception thrown in the run method to rollback the transaction
     */
    public static class Rollback extends JAVA.lang.Exception
    {
        public Rollback( )
        {
            super("no message");
        }
        public Rollback(String message)
        {
            super(message);
        }
    }
```

```
    public Transaction( ) { }
    /**
     * User defined method that is run in the context of a transaction.
     *
     * @exception com.kabira.platform.Transaction.Rollback
     * Thrown if the transaction should be rolled back
     * and all changes discarded.
     */
    protected abstract void run( ) throws Transaction.Rollback;
    /**
     * Executes the user defined run( ) method within a transaction. Any
     * deadlocks will be transparently retried.
     *
     * @throws InvalidTransactionState
     * If a transaction already active, or the transaction services
     * are not available.
```

```
     */
    public final Result execute( ) throws InvalidTransactionState
    {
        ...
    }
}
```

An application may implement the abstract run method to execute application code in a transaction. A transaction is implicitly started when the execute method is called. The execute method calls the application-provided run method and executes the application code in a transaction. A transaction may be terminated in the following ways:

application code returns from the run method
application throws a Transaction.Rollback exception from the run method
a deadlock is detected (the transaction is transparently replayed)
an unhandled exception An application can explicitly control the outcome of a transaction by throwing the Transaction.Rollback exception in the run method. The Transaction.Rollback exception causes the current transaction to rollback. Returning normally from the run method causes the transaction to commit.

The following example is a simple counting program that demonstrates a field value being rolled back.

```
package programming.fluency.transactions;
import com.kabira.platform.Transaction;
public class T extends Transaction
{
    private boolean m_commit;
    private int m_count = 0;
    public static void main (String [ ] args)
    {
        T       t = new T( );
        t.m_commit = true;
        t.execute( );
        System.out.println(t.m_count);
```

```
            t.m__commit = true;
            t.execute( );
            System.out.println(t.m__count);
            t.m__commit = false;
            t.execute( );
            System.out.println(t.m__count);
        }
        @Override
        public void run( ) throws Transaction.Rollback
        {
            m__count += 1;
            if (m__commit == true)
            {
                return;
            }
            throw new Transaction.Rollback( );
        }
    }
}
```

When the above example is executed, the output may be (annotation added):

```

# Initial call to execute that commits

1

# Second call to execute that commits

2

# Third call to execute that rolls back - field restored to value before call

2
```

In some examples, a JAVA class may be made transactional in the following ways:
  it has an @Transactional annotation
  it extends a transactional class
  it is contained by a transactional class All fields in a transactional class are transactional unless explicitly changed using the @Isolation annotation (described below). This explicitly includes:
  primitive types
  object references
  array references Field modifications using a reference in a transactional field are transactional, while modifications using a reference in a non-transactional field are non-transactional.

We now describe the "@Transactional" annotation in accordance with some examples of a transactional JAVA VM. The @Transactional annotation marks a JAVA class as transactional. When an instance of a JAVA class with the @Transactional annotation is created, read, modified, or deleted in a transaction, it has transactional behavior. The @Transactional annotation may be defined as shown below:

```
package com.kabira.platform.annotation;
import JAVA.lang.annotation.*;
/**
 * Mark a class transactional
 */
@Documented
@Inherited
@Retention(RetentionPolicy.RUNTIME)
@Target(ElementType.TYPE)
public @interface Transactional
{
    /**
     * Define the transaction context for a class
     */
    public static enum Context
    {
        /** a transaction is required to use type */
        REQUIRED,
        /** type can be used with or without a transaction */
        OPTIONAL,
    }
    Context context( ) default Context.OPTIONAL;
    /**
     * Define whether inherited fields are excluded from
     */
    public static enum InheritedFields
    {
        /**
         * Inherited fields are not transactional
         */
        EXCLUDE,
        /**
         * Inherited fields are transactional
         */
        INCLUDE,
    }
    InheritedFields inheritedFields( ) default InheritedFields.INCLUDE;
}
```

The following table summarizes some @Transactional Annotation Properties

| Property | Values | Comments |
| --- | --- | --- |
| Context | REQUIRED-class instances can only be created, read, modified, or deleted in a transaction. OPTIONAL-class instances can optionally be in a transaction when instances are created, read, modified, or deleted. | The Context property defines whether a transaction is required for instances of a class. All managed objects have a REQUIRED transaction context. |
| Inherited Fields | EXCLUDE-all inherited fields are not included in transactional behavior. INCLUDE-all inherited fields are included in transactional behavior. | The InheritedFields property controls whether inherited fields are included or excluded from transactional behavior |

Attempting to create, read, modify, or delete an instance of a Context.REQUIRED class outside of a transaction will cause a com.kabira.platform.NoTransactionError to be thrown by the JVM.

All object and array references are implicitly annotated with @ Transactional(Context.OPTIONAL).

Transactionality is propagated to contained references in a transactional class. This applies to both object and array references.

The @Isolation annotation controls the transaction isolation of fields. When a field with the @Isolation annotation in an instance of a JAVA class is read or modified in a transaction, it uses the isolation level defined by the @Isolation annotation. The @Isolation annotation may be defined as shown in the following example:

```
package com.kabira.platform.annotation;
import JAVA.lang.annotation.*;
/**
 * Define the transaction isolation of a field
```

```
*/
@Documented
@Retention(RetentionPolicy.RUNTIME)
@Target(ElementType.FIELD)
public @interface Isolation
{
    /**
     * Define isolation level
     */
    public static enum Level
    {
        /** the field uses a serializable isolation level */
        SERIALIZABLE,
        /** field is non-transactional */
        TRANSIENT
    }
    Level level( ) default Level.SERIALIZABLE;
}
```

An @Isolation Annotation property includes the "level" field taking the value "SERIALIZABLE," which indicates a single write, multi-reader locking is used for the field; or taking the value "TRANSIENT," which indicates no transactional locking or logging is used for the field.

We now discuss annotation audits. When a class is loaded into the transactional JVM, the Class Loader performs the following annotation audits:

- The @Transactional Context property cannot be OPTIONAL if a class extends a superclass with an @Tranasactional Context of REQUIRED. It is illegal to relax transactional requirements in an inheritance hierarchy.
- The @Transactional InheritedFields property cannot be EXCLUDE if the class extends a super-class with an @Transactional annotation.
- The @Isolation annotation cannot be specified on a static field.
- The @Isolation Level property cannot be specified as TRANSIENT on a field in a Managed Object class (described later).

When an audit failure occurs, as illustrated in the following example, the class is not loaded and an audit failure message is reported.

```
package programming.fluency.transactions;
import com.kabira.platform.annotation.*;
import com.kabira.platform.Transaction;
import com.kabira.platform.ManagedObject;
//
//      Cannot relax transactional requirements
//
@Transactional(context=Transactional.Context.OPTIONAL)
class C1 extends ManagedObject { };
public class C extends Transaction
{
    public static void main (String [ ] args)
    {
        new C( ).execute( );
    }
    @Override
    protected void run( ) throws Rollback
    {
        //
        // This class will fail annotation audit and fail to load
        //
        new C1( );
    }
}
```

When this above example is executed, the following may be output:

```
[primary] Listening for transport dt_socket at address: 45314
[primary] Class programming.fluency.transactions.C1 failed audit; [Cannot define
Transactional context to be Optional if the superclass defines it Required.]
[primary] JAVA main class programming.fluency.transactions.C.main exited with an exception.
[primary] JAVA exception occurred: JAVA.lang.NoClassDefFoundError:
programming/fluency/transactions/C1
[primary] at programming.fluency.transactions.C.run(C.JAVA:42)
[primary] at com.kabira.platform.Transaction.execute(Transaction.JAVA:132)
[primary] at programming.fluency.transactions.C.main(C.JAVA:33)
INFO: Application [programming.fluency.transactions.C0] running on node [primary] exited
with status [−1]
INFO: Run of distributed application [programming.fluency.transactions.C0] complete.
```

The example below illustrates:
use of the @Transactional annotation
use of the @Isolation annotation
behavior of the Transactional.InheritedFields.EXCLUDE property value
inheriting transactional behavior through extends

```
package programming.fluency.transactions;
import com.kabira.platform.annotation.*;
import com.kabira.platform.Transaction;
class A1
{
    String s;
}
//
// This class must execute in a transaction
//
@Transactional(
        context=Transactional.Context.REQUIRED,
        inheritedFields=Transactional.InheritedFields.EXCLUDE)
class A2 extends A1
{
    String t;
    @Isolation(level=Isolation.Level.TRANSIENT)
    String u;
}
//
// This class is transactional because it extends A2
//
class A3 extends A2
{
    String v;
}
public class A extends Transaction
{
```

```
public static void main (String [ ] args)
{
    new A( ).execute( );
}
@Override
protected void run( ) throws Rollback
{
    A3 a3 = new A3( );
    //
    // This is not transactional since inheritedFields
    // property is EXCLUDE
    //
    a3.s = "s value";
    //
    // This is transactional
    //
    a3.t = "t value";
    //
    // This is not transactional because of @Isolation annotation
    //
    a3.u = "u value";
    //
    // This is transactional
    //
    a3.v = "v value";
}
}
```

Regarding static fields, static fields are always non-transactional. The example below illustrates the T.m_count field in the "Transaction Boundaries" example, above, being a static field. The changed sample output (annotation added) is also illustrated:

```
public class T extends Transaction
{
    private boolean   m_commit;
    //
    // m_count field is now static
    //
    private static int m_count = 0;
    ...
}
```

The corresponding output (annotated) is:

```

# Initial call to execute that commits

1

# Second call to execute that commits

2

# Third call to execute that rolls back - field is not restored since
# it is non-transactional

3
```

We now discuss some transactional class examples. The example below shows:
Behavior of object references in fields
Behavior of array references in fields
Behavior of accessing references using a local variable

```
package programming.fluency.transactions;
import com.kabira.platform.annotation.*;
```

```
import com.kabira.platform.Transaction;
//
// Class that can be executed inside or outside of a transaction
//
class V1
{
    Long m_long;
    public void setField(long value)
    {
        m_long = value;
    }
};
//
// This class must have an active transaction context
//
@Transactional(context=Transactional.Context.REQUIRED)
class V2
{
    private V1 m_v1;
    private long m_longs[ ][ ];
    @Isolation(level=Isolation.Level.TRANSIENT)
    private V1 m_transientV1;
    private static long m_longstatic;
    V2( )
    {
        super( );
        m_v1 = new V1( );
        m_longs = new long[10][30];
    }
    public void update( )
    {
        //
        // This is transactional - modifying
        // contents of reference using a local variable
        //
        V1 v1 = m_v1;
        v1.m_long = 5;
        //
        // This is transactional - reference replaced
        // with a new reference
        //
        m_v1 = new V1( );
        //
        // This is transactional - assignment through
        // a transactional field.
        //
        m_v1.m_long = 5;
        //
        // This is transactional - update using method
        // in transaction scope
        //
        m_v1.setField(4);
        //
        // This is transactional - array update through
        // a transactional field
        //
        m_longs[5][20] = 27;
        //
        // This is non-transactional - reference replaced
        // with a new reference in a non-transactional field
        //
        m_transientV1 = new V1( );
        //
        // This is non-transactional - assignment to
        // a non-transactional field.
        //
        m_transientV1.m_long = 8;
        //
        // This is non-transactional - assignment to
        // a static field
        //
        m_longstatic = 10;
    }
}
public class V extends Transaction
{
    public static void main (String [ ] args)
    {
        new V( ).execute( );
    }
```

-continued

```
        @Override
        protected void run( ) throws Rollback
        {
            new V2( ).update( );
        }
    }
```

We now discuss transaction thread of control. Once a transaction is started, all methods called from the run method are in the transaction. An example is shown below:

```
package programming.fluency.transactions;
import com.kabira.platform.Transaction;
public class TC extends Transaction
{
    public static void main (String [ ] args)
    {
        new TC( ).execute( );
    }
    @Override
    public void run( )
    {
        methodOne( );
    }
    private void methodOne( )
    {
        //
        // This is executing in a transaction
        //
        methodTwo( );
    }
    private void methodTwo( )
    {
        //
        // This is also executing in a transaction
        //
        // ...
    }
}
```

The "thread of control" of this transaction can span JVMs and nodes if the methods being executed are on distributed objects. Transactions do not span threads in a non-distributed transaction. If a new thread is created in a transaction, the new thread is not executing in a transaction when it starts. The creation of a thread is also not transactional. Specifically if a thread is started in a transaction and the transaction rolls back, the thread is still running.

The example below shows thread creation.

```
package programming.fluency.transactions;
import com.kabira.platform.Transaction;
class U1 extends Thread
{
    @Override
    public void run( )
    {
        System.out.println("new thread not in a transaction");
    }
}
public class U extends Transaction
{
    public static void main (String [ ] args)
    {
        new U( ).execute( );
    }
    @Override
    public void run( )
    {
        //
```

-continued

```
        // Create a new daemon thread
        //
        U1    u1 = newU1( );
        u1.setDaemon(true);
        //
        // The thread is started even if the transaction rollsback.
        // The thread run method is not in a transaction
        //
        u1.start( );
    }
}
```

We now describe locking and deadlocks. In particular, transaction locks are taken in the following cases on a transactional class:

Managed Object creation—extent write-locked
Managed object deletion—extent write-locked
Fields accessed—write lock taken on set, read lock taken on get Generally, non-managed objects do not take write locks on creation because there is no extent being maintained.

Read locks are promoted to write locks if object fields are first read and then modified. Transaction locks are held until the current transaction commits or aborts.

We now provide an example of object locking.

```
package programming.fluency.transactions;
import com.kabira.platform.Transaction;
import com.kabira.platform.ManagedObject;
/*
 * L1 Managed Object
 */
class L1 extends ManagedObject
{
    private L1 ( ) { };
    public L1 (String name)
    {
        this.name = name;
    }
    public String name;
    public boolean lock;
}
/*
 * Transaction to create an instance of L1
 */
class L2 extends Transaction
{
    L1    m__a;
    @Override
    protected void run( )
    {
        m__a = new L1("existing");
    }
}
/*
 * Transaction to delete an instance of L1
 */
class L3 extends Transaction
{
    L1 m__a;
    @Override
    protected void run( )
    {
        if (Transaction.hasWriteLock(m__a) == false)
        {
            System.out.println(m__a.name + ": does not have a write lock");
        }
        //
        // Deleting an object takes a write lock
        //
        m__a.delete( );
        if (Transaction.hasWriteLock(m__a) == true)
```

```
                {
                    System.out.println(m_a.name + ": now has a write lock");
                }
            }
        }
    }
    /*
     * Main transaction
     */
    public class L extends Transaction
    {
        private L1 m_a;
        public static void main (String [ ] args)
        {
            L   l  = new L( );
            L2  l2 = new L2( );
            L3  l3 = new L3( );
            l2.execute( );
            l.m_a = l2.m_a;
            l.execute( );
            l3.m_a = l2.m_a;
            l3.execute( );
        }
        @Override
        protected void run( )
        {
            L1  a = new L1("created");
            if (Transaction.hasWriteLock(a) == true)
            {
                System.out.println(a.name + ": has a write lock");
            }
            //
            // This object does not have a write lock because it was created
            // outside of this transaction. Reading the name field will
            // take a read lock.
            //
            if (Transaction.hasWriteLock(m_a) == false)
            {
                System.out.println(m_a.name + ": does not have a write
                lock");
            }
            if (Transaction.hasReadLock(m_a) == true)
            {
                System.out.println(m_a.name + ": now has a read lock");
            }
            //
            // Take a write lock by setting the lock attribute. This
            // promotes the read lock taken above when name was read.
            //
            m_a.lock = true;
            if (Transaction.hasWriteLock(m_a) == true)
            {
                System.out.println(m_a.name + ": now has a write lock");
            }
        }
    }
```

When the above example executes, it generates the following output:

```
created: has a write lock
existing: does not have a write lock
existing: now has a read lock
existing: now has a write lock
existing: does not have a write lock
existing: now has a write lock
```

Deadlocks are handled transparently such that deadlocks do not have to be explicitly handled by the application. When a deadlock occurs, the Transaction class detects the deadlock, rolls back the current transaction and restarts a new transaction by calling the run method again.

We now discuss explicit locking. That is, it is possible to explicitly transaction lock objects. Explicit transaction locking is useful to avoid lock promotions. A lock promotion happens when an object has a read lock and then the object is modified. This is usually caused by first reading a field value and then modifying the object.

These mechanisms are available to explicitly lock objects:

Transaction.readLockObject—explicitly read lock an object

Transaction.writeLockObject—explicitly write lock an object

Base.selectUsing . . . —explicitly lock an object when selecting it.

The Base.selectUsing . . . method is discussed in detail later. The example below show how to avoid a lock promotion.

```
package programming.fluency.transactions;
import com.kabira.platform.annotation.*;
import com.kabira.platform.Transaction;
@Transactional
class B1
{
    String input;
    String output;
}
public class B extends Transaction
{
    enum Action
    {
        PROMOTE,
        WRITELOCK
    }
    private B1      m_b1;
    private Action m_action;
    public static void main (String [ ] args)
    {
        B   b = new B( );
        b.m_b1 = new B1( );
        b.m_action = Action.PROMOTE;
        b.execute( );
        b.m_action = Action.WRITELOCK;
        b.execute( );
    }
    void reportLock(String msg)
    {
        System.out.println(msg + " B1: read lock = "
            + Transaction.hasReadLock(m_b1) +
            ", write lock = "
            + Transaction.hasWriteLock(m_b1));
    }
    @Override
    protected void run( ) throws Rollback
    {
        if (m_action == Action.PROMOTE)
        {
            reportLock("promote: enter");
            //
            // Accessing input takes a read lock
            //
            String i = m_b1.input;
            reportLock("promote: read");
            //
            // Read lock is promoted to write lock. Note this
            // also happens when the following is executed:
            //
            // m_b1.output = m_b1.input;
            //
            m_b1.output = i;
            reportLock("promote: write");
        }
        else
        {
            assert ( m_action == Action.WRITELOCK );
            reportLock("writelock: enter");
            //
            // Explicitly take write lock to avoid promotion
            //
            Transaction.writeLockObject(m_b1);
            //
            // Accessing input will already have write lock
            //
```

```
            String i = m_b1.input;
            reportLock("writelock: read");
            //
            // No promotion of locks happen
            //
            m_b1.output = i;
            reportLock("writelock: write");
            }
    }
}
```

The output of the preceding example (annotated) is as follows:

```
[primary] promote: enter B1: read lock = false, write lock = false

# Read lock is taken when field on B1 is read

[primary] promote: read B1: read lock = true, write lock = false

# Write lock is taken when field on B1 is set

[primary] promote: write B1: read lock = true, write lock = true
[primary] writelock: enter B1: read lock = false, write lock = false

# Explicitly write lock B1 causes both the read and write lock
# to be taken on B1

[primary] writelock: read B1: read lock = true, write lock = true
[primary] writelock: write B1: read lock = true, write lock = true
```

Figure 8:
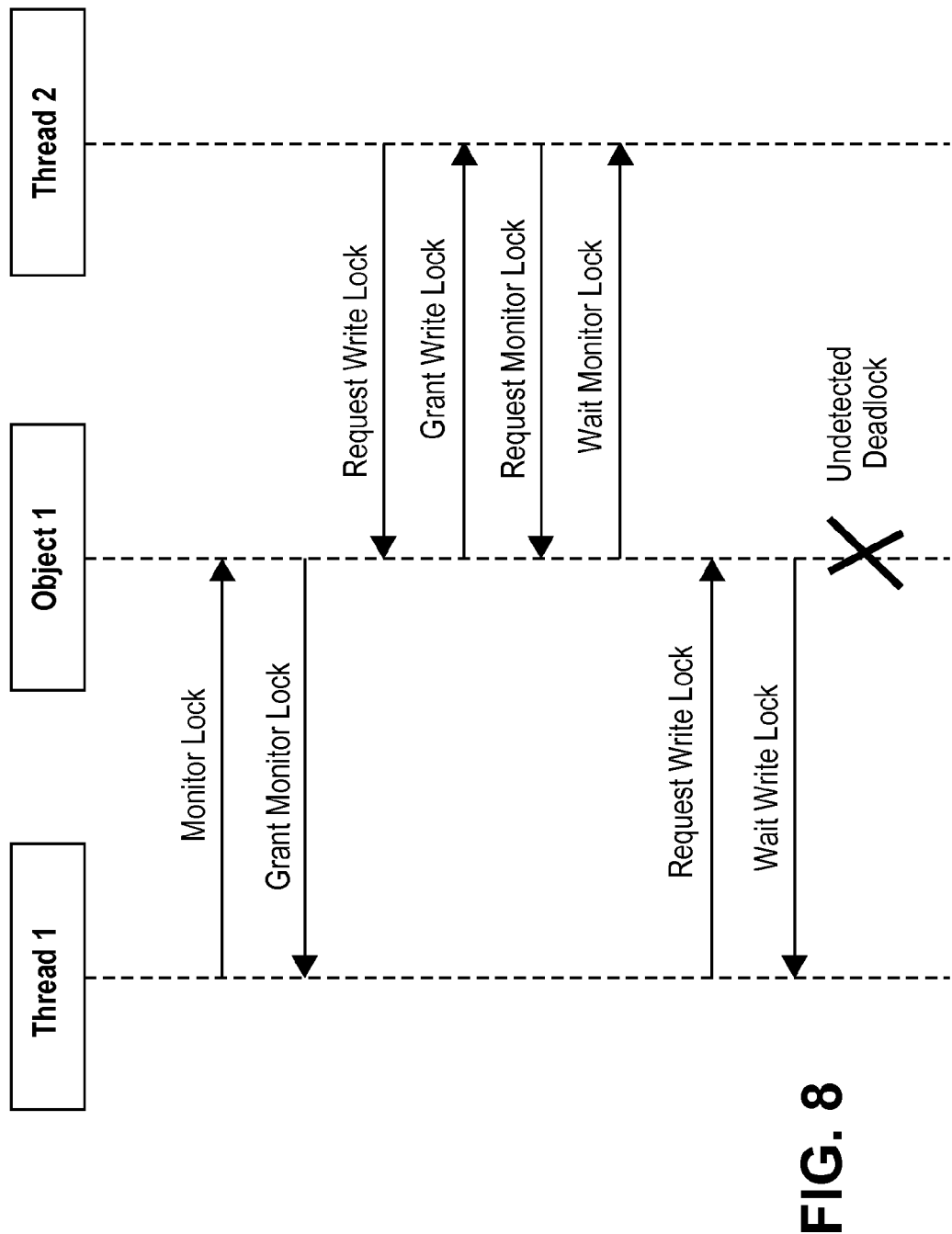
FIG. 8 illustrates an example of an undetected deadlock between a JAVA monitor and a transaction lock.

We now discuss integration of transactions with JAVA monitors. JAVA monitors are integrated with transactions to ensure that the JAVA monitor transactions do not deadlock with transaction locks. FIG. 8 shows an undetected deadlock between a JAVA monitor and a transaction lock. These undetected deadlocks may be avoided using the mechanisms described in this section.

Figure 9:
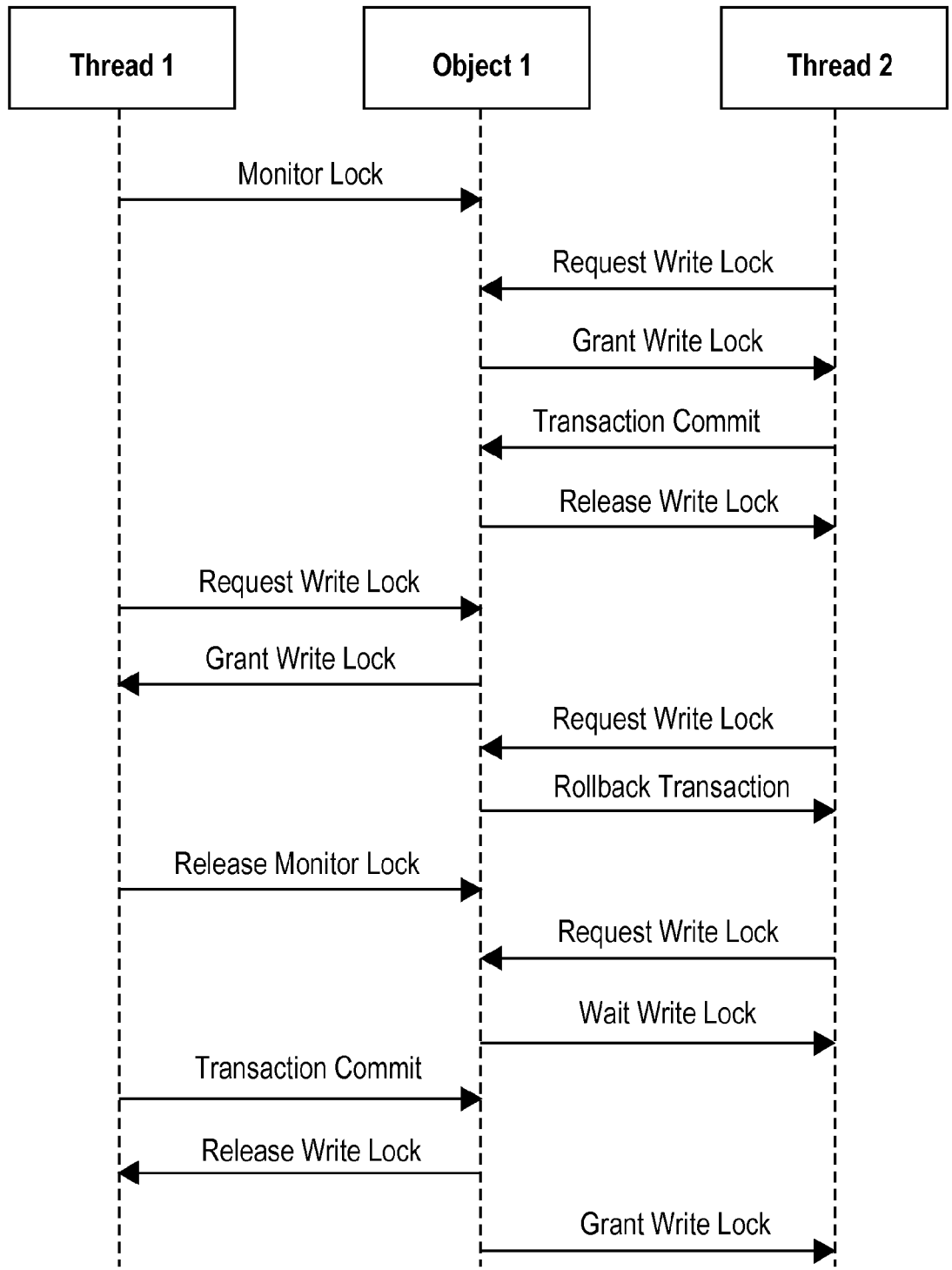
FIG. 9 is a sequence diagram illustrating rules to avoid transaction and monitor deadlocks.

Monitors can still deadlock with themselves inside or outside of a transaction. Standard monitor deadlock avoidance techniques may be used. To avoid transaction and monitor deadlocks, the following steps may be performed when acquiring transaction locks on any object:
 1. Object monitor not held on the object, perform normal transaction locking.
 2. Object monitor held on the object, attempt to get transaction lock.
 3. If transaction lock uncontested (can acquire without waiting), take transaction lock.
 4. If transaction lock contested (a wait would be required to acquire the lock), rollback the current transaction These rules are illustrated by the sequence diagram in FIG. 9.

An implication of this monitor and transaction deadlock avoidance approach is that there may be false transaction rollbacks when monitors are used in transactions with contested transaction locks. In general, monitors may not be needed in a transactional system because transaction isolation provides the same data integrity guarantees with much better concurrency and ease of use.

When a failure occurs, compensation may be done to ensure that any work that was completed before the failure is restored to its initial state. Transactional resources are automatically restored to their initial state by rolling back any changes when a transaction aborts. Explicit control over the resolution of a transaction is supported with the Transaction.Rollback exception. This mechanism can be used to recover from failures when a transaction is running.

When non-transactional resources (e.g. a file or network connection) are modified during a transaction and an error is detected, or the transaction rolls back, application code may be provided to restore the non-transactional resource to their initial state.

Notification of transaction resolution may be supported using the kabira.platform.swbuiltin.transactionNotifier class. This class provides on Rollback and onCommit methods that can be implemented as required to manage non-transactional resources. Multiple transaction notifiers can be created during the same transaction. The appropriate method is called for each notifier instance created when the transaction completes. The order in which multiple notifiers are called is typically undefined so there should be no order assumptions in the notifiers. A notifier that is created in a transaction can be deleted before the transaction completes. In this case, the notifier is not called when the transaction completes.

The following provides an example use of transaction notifiers:

```
package programming.fluency.transactions;
import com.kabira.platform.swbuiltin.*;
import com.kabira.platform.Transaction;
class Compensation extends TransactionNotifier
{
    String name;
    @Override
    public void onRollback( )
    {
        //
        // Perform application specific rollback processing
        //
        System.out.println(name + ": onRollback called");
        //
        // Do not need to call delete. The notifier instance
        // deletes itself.
        //
    }
    @Override
    public void onCommit( )
    {
        //
        // Perform application specific commit processing
        //
        System.out.println(name + ": onCommit called");
        //
        // Do not need to call delete. The notifier instance
        // deletes itself.
        //
    }
}
public class N extends Transaction
{
    Transaction.Result result;
    public static void main (String [ ] args)
    {
        N       n = new N( );
        n.result = Result.COMMIT;
        n.execute( );
        n.result = Result.ROLLBACK;
        n.execute( );
    }
    @Override
    protected void run( ) throws Transaction.Rollback
    {
        op1( );
        op2( );
        op3( );
        if (result == Result.ROLLBACK)
        {
            throw new Transaction.Rollback( );
        }
```

```
}
    void op1( )
    {
        Compensation compensation = new Compensation( );
        compensation.name = "op1";
    }
    void op2( )
    {
        Compensation compensation = new Compensation( );
        compensation.name = "op2";
    }
    void op3( )
    {
        //
        // Create and delete a notifier in the same transaction.
        // This notifier is not called when the transaction completes.
        //
        Compensation compensation = new Compensation( );
        compensation.name = "op3";
        compensation.delete( );
    }
}
```

The immediately preceding example may, when executed, result in the following output:

```

# commit compensation executed for op1

op1: onCommit called

# commit compensation executed for op2

op2: onCommit called

Compensation
# rollback compensation executed for op1

op1: onRollback called

# rollback compensation executed for op2

op2: onRollback called
```

We now discuss transaction notifier restrictions. The onCommit and on Rollback methods in a transaction notifier cannot take any new transaction locks. All transaction locks should be taken before the onCommit or on Rollback methods are called. This restriction also precludes any objects with extents from being created or deleted in these methods because an object create takes an implicit write lock.

We now discuss unhandled exception handling. Unhandled exceptions in a transaction may cause the current transaction to rollback and the current thread to exit. If the current thread is the thread in which main was executed, the JVM will exit. Any installed transaction notifiers are called before the thread exits (including the main thread). The example below illustrates an unhandled exception in the main thread.

```
package programming.fluency.transactions;
import com.kabira.platform.Transaction;
import com.kabira.platform.swbuiltin.*;
class UnhandledException extends JAVA.lang.Error
{
}
class F extends TransactionNotifier
{
    @Override
    public void onRollback( )
    {
        //
        // Perform application specific rollback processing
        //
        System.out.println("onRollback called");
    }
}
public class E extends Transaction
{
    public static void main (String [ ] args)
    {
        new E( ).execute( );
    }
    @Override
    protected void run( )
    {
        //
        // Create a transaction notifier
        //
        new F( );
        //
        // Throw an unhandled exception - transaction rolled back
        //
        throw new UnhandledException( );
    }
}
```

When the preceding example runs, it outputs (annotation added):

```

# Application onRollback method called before JVM exits

onRollback called
JAVA main class programming.fluency.transactions.E.main exited with an exception.
JAVA exception occurred:
programming.fluency.transactions.UnhandledException
    at programming.fluency.transactions.E.run(E.JAVA:55)
    at com.kabira.platform.Transaction.execute(Transaction.JAVA:117)
    at programming.fluency.transactions.E.main(E.JAVA:41)
```

We now discuss a transaction required exception. In particular, attempting to use a class that has a @Transactional (context=Transactional.Context.REQUIRED) annotation outside of a transaction may cause the following exception to be thrown: JAVA.lang.IllegalAccessError. This exception is illustrated in the following example:

```
package programming.fluency.transactions;
import com.kabira.platform.annotation.*;
import com.kabira.platform.ManagedObject;
@Transactional(context=Transactional.Context.REQUIRED)
class X1 extends ManagedObject
{
};
public class X
{
    public static void main (String [ ] args)
    {
        //
        // Attempting to use a transactional required class
        // outside of a transaction
        //
        new X1( );
    }
}
```

If the preceding example is executed, it results in the following output (annotated):

```

# JAVA.lang.IllegalAccessError thrown because X1 requires a transaction

JAVA main class programming.fluency.transactions.X.main exited with an exception.
JAVA exception occurred: JAVA.lang.IllegalAccessError: no active transaction
    at com.kabira.platform.ManagedObject._createSMObject(Native Method)
    at com.kabira.platform.ManagedObject.<init>(ManagedObject.JAVA:118)
    at programming.fluency.transactions.X1.<init>(X.JAVA:7)
    at programming.fluency.transactions.X.main(X.JAVA:19)
```

We now discuss JAVA Native Interface (JNI) transactional programming. In particular, the JAVA Native Interface becomes transactional. This means that all memory allocated, read, modified, or deleted using JNI APIs is transactional—it is logged and locked. In addition, transactional isolation is provided for field data.

All JNI code that accesses transactional resources should check for deadlock exceptions after each call and return to the caller. This is done the same way as all other exception handling in JNI.

Following is an example of Transactional JNI Programming.

```
static void JNICALL
JAVA_com_kabira_platform_someClass_someNative(JNIEnv *env,
jclass)
{
    doSomeWork(env);
    //
    // Check for an exception - this could be a deadlock
    //
    if (env->ExceptionCheck( ))
    {
        // propagate exception to caller
        return;
    }
    doMoreWork(env);
    if (env->ExceptionCheck( ))
    ...
}
```

In some examples, native resources such as file descriptors, sockets, or heap memory are not transactional.

Transaction modifiers may be used to support transaction safe management of non-transactional resources. The onCommit or on Rollback methods can be implemented as native methods to perform this management.

We now summarize some high-level guidelines for using transactional classes. These are not hard and fast rules, but guidelines that should be evaluated in a specific application context. First, the use of JAVA monitors in transactions should be avoided or at least minimized. Deadlocks should also be avoided. When locking multiple objects, the objects should be locked in the same order. Concurrently locking objects in different orders can result in deadlocks. The deadlocks will be detected and handled transparently, but it is less expensive to avoid them. Promotion deadlocks should be avoided. When an object is going to be modified (written) within a transaction, the write lock should be taken first, instead of the read lock. This avoids the possibility of promotion deadlock between multiple transactions. Again, these deadlocks are detected and handled transparently, but it is less expensive to avoid them. Resource contention should be avoided. Adding single points of contention to an application should be avoided. If the application executes multiple threads concurrently, it should be ensured that each thread uses separate resources. It should be attempted to minimize the duration of transaction locks to avoid lock contention. For example, blocking with transaction locks held waiting for data from an external source, or sleeping with transaction locks held is generally bad.

We now describe managed objects. In one example environment, there are three types of managed objects:

| Parent Class | Behavior |
| --- | --- |
| com.kabira.platform.ManagedObject | Shared Memory Persistence, Distribution |
| com.kabira.platform.ha.MirroredObject | Shared Memory Persistence, High Availability Mirroring |
| com.kabira.platform.ha.ReplicatedObject | Shared Memory Persistence, High Availability Mirroring, Replication |

Managed Objects have an @Transactional (Context=REQUIRED) transaction annotation—they can only be manipulated in a transaction. Below is an example of a Managed Object that is persisted in shared memory, such as is illustrated in FIG. 10.

```
package programming.fluency.managedobjects;
import com.kabira.platform.ManagedObject;
@managed
public class A
{
    //
    // Name is stored in shared memory
    //
    String name;
}
```

Figure 10:
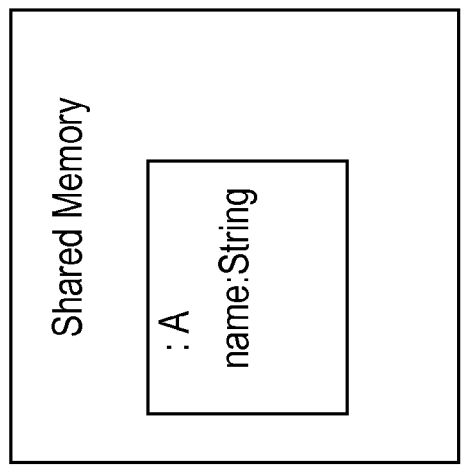
FIG. 10 illustrates an example of a Managed Object that is persisted in shared memory.

As shown in FIG. 10, the shared memory 1002 includes the class A, including the string "name." Distribution may be added to the above object using annotation.

An example of a Mirrored Managed Object that is persisted in shared memory is now provided.

```
package programming.fluency.managedobjects;
import com.kabira.platform.ha.*;
public class B extends MirroredObject
{
    public B( )
    {
        //
        // Create mirrored object in fluency partition group using
        // partition number 0. A default identifier is used.
        //
        super ("fluency", 0, null);
    }
    //
    // Name is transactionally mirrored on backups and persisted
```

```
        // in shared memory
        //
        String name;
    }
```

An example is now provided of a Replicated Managed Object that is replicated to all nodes and persisted in shared memory.

```
package programming.fluency.managedobjects;
import com.kabira.platform.ha.*;
public class C extends ReplicatedObject
{
    public C( )
    {
        //
        // Create replicated object in fluency partition group using
        // partition number 0. A default identifier is used.
        //
        super ("fluency", 0, null);
    }
    //
    // Name is replicated to all configured nodes, mirrored to
    // a backup node and persisted in shared memory
    //
    String name;
}
```

Figure 11:
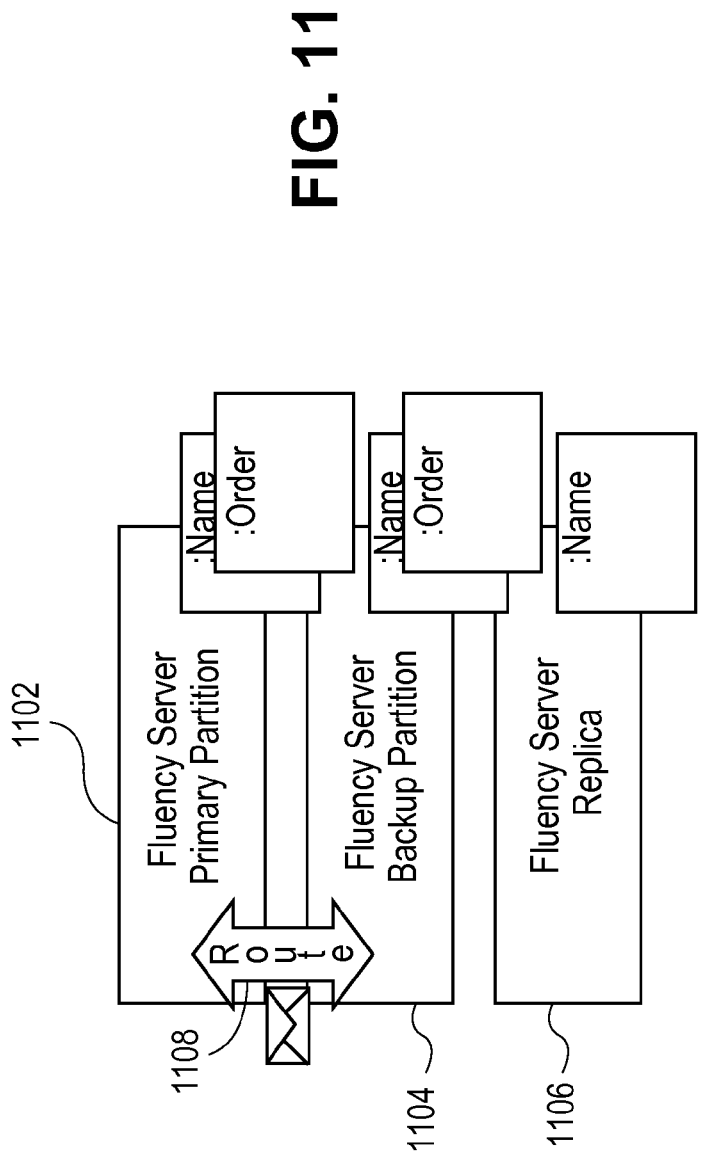
FIG. 11 illustrates an example of a string "name" being maintained on a primary partition, a backup partition and a replica.

As shown in FIG. 11, the string "name" is maintained on a primary partition 1102, a backup partition 1104 and a replica 1106. Thus, the environment provides application-transparent mirrored and replica JAVA objects (synchronous and asynchronous), and HA timers, including transparent HA JAVA object/message routing 1108. In addition, data partitioning and partition migration capabilities are provided.

Figure 12:
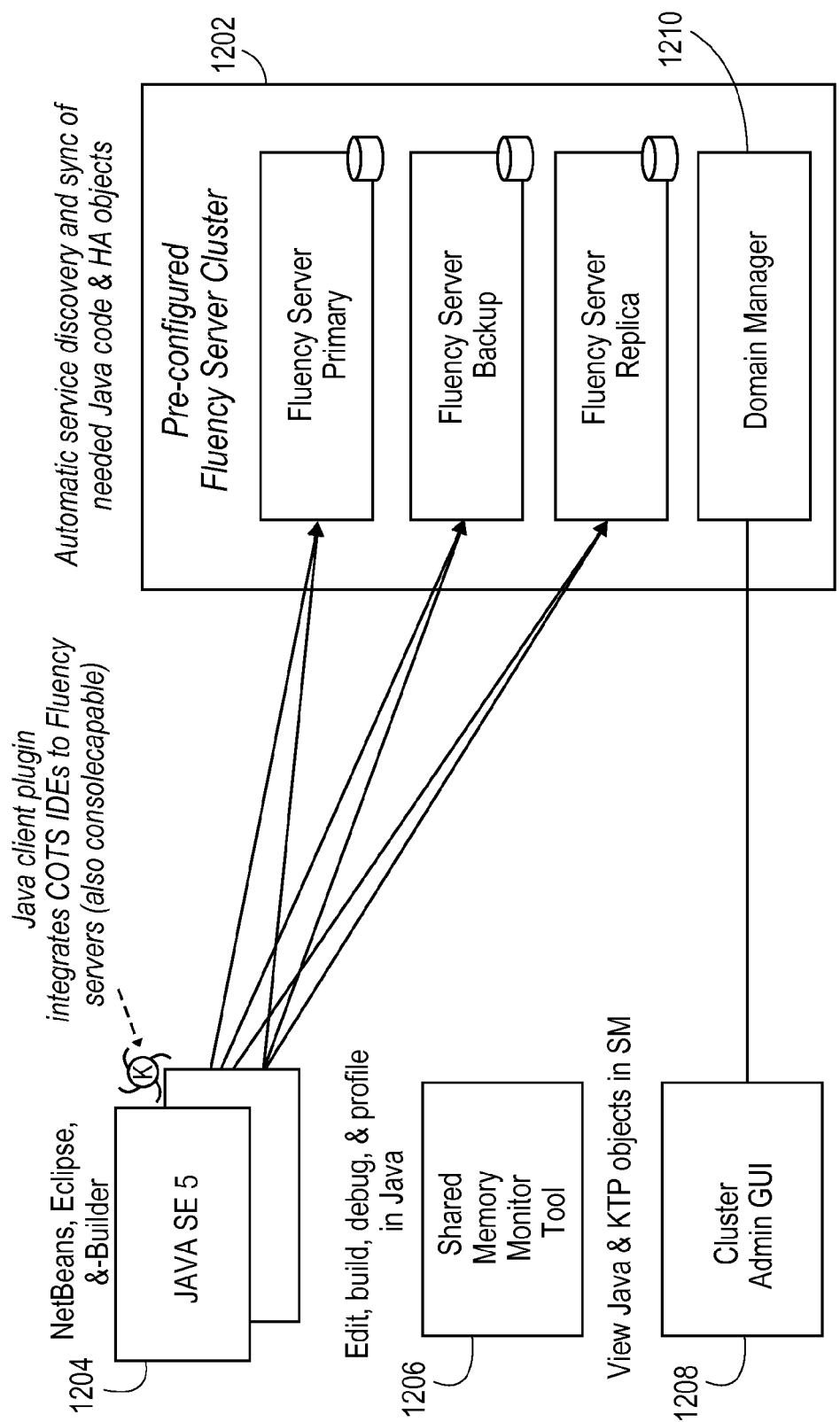
FIG. 12 illustrates an example of a development environment to develop fully transactional applications using standard JAVA language constructs.

Prior to discussing how objects may be managed, we discuss some details of a development environment to develop fully transactional applications using standard JAVA language constructs. Referring to FIG. 12, a server cluster 1202 may be pre-configured and accessed using a standard JAVA development environment 1204 such as NetBeans, Eclipse and J-Builder. Objects may be edited, built, debugged and profiled using JAVA tools. A "Shared Memory" monitor tool 1206 may be used to load JAVA type descriptors into the transaction platform runtime environment. A cluster administration GUI 1208 may be used to administer the domains; the nodes being automatically registered to the domain manager 1210.

Figure 13:
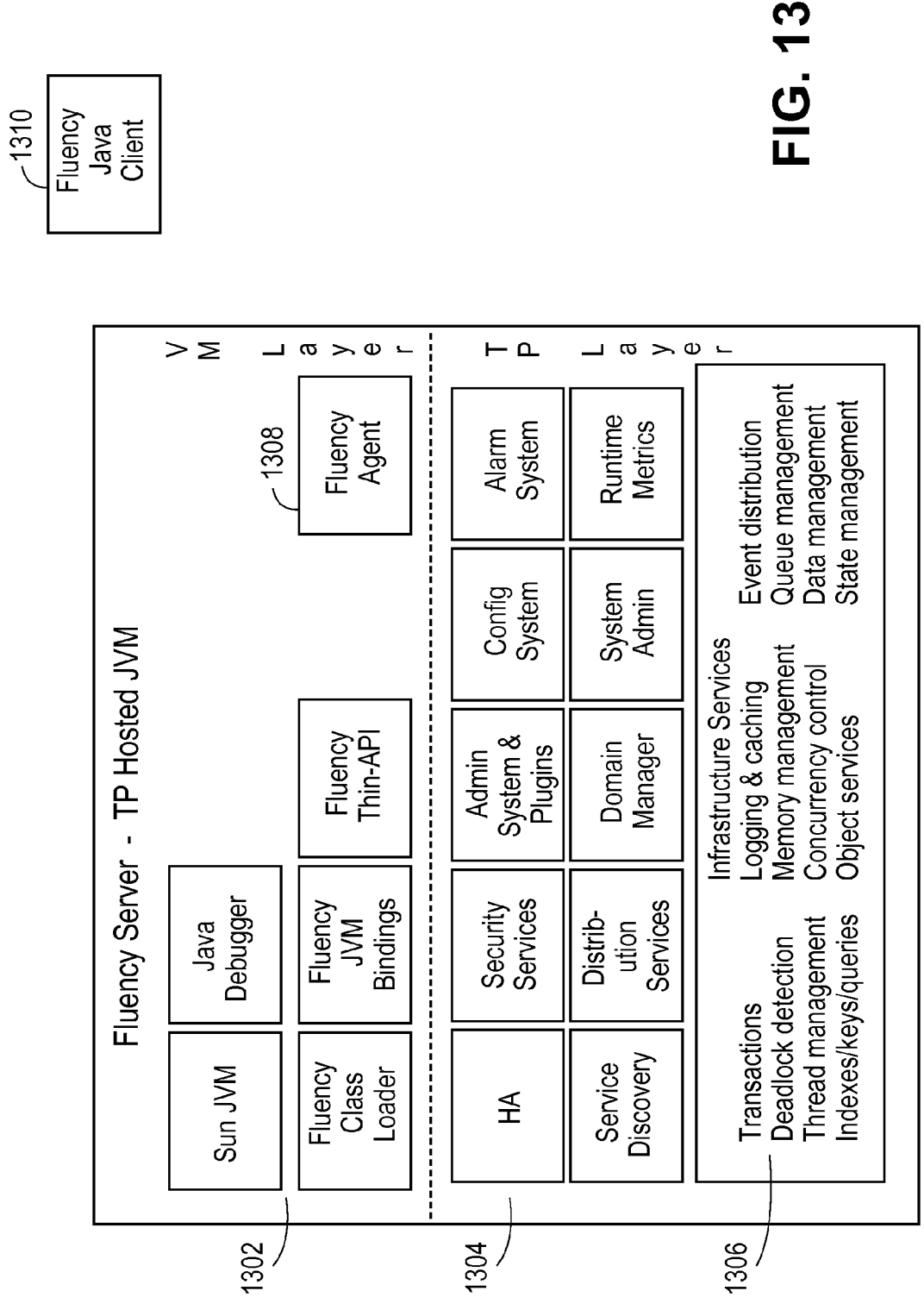
FIG. 13 illustrates an example of a service that includes a VM layer and a transaction processing layer.

FIG. 13 illustrates, in greater detail, a service (such as the service 104 of the FIG. 1 environment), in accordance with an example. As shown in FIG. 13, the service 1300 may include a VM layer 1302 and a transaction processing layer 1304. The transaction processing layer 1304 may include various services, including infrastructure services 1306. Thus, for example, the service in FIG. 13 may appear as a standard JVM—shipped, integrated and certified as a JAVA Virtual Machine, such as certified by Sun Microsystems. JAVA code transparently executes with transaction processing semantics; all transaction processing facilities are available in JAVA. A class loader may make the standard JAVA syntax work transparently for transaction processing objects and dynamically fetches classes as needed during runtime.

In some examples, minimal opcode routines may be required to be rewritten to bind JVM to the transaction processing so that the JAVA will execute transparently with transaction processing semantics (e.g., transactions, POJO locks, etc.). JIT compatibility may be maintained and standard JNI tables used for linkage.

An agent 1308 and JAVA client 1310 may interoperate to transparently integrate development environments to the transaction processing (e.g., with respect to class negotiation, execution, etc.) In addition, in some examples, users are able to use JAVA SE development tools (such as debuggers) without modification.

Figure 14:
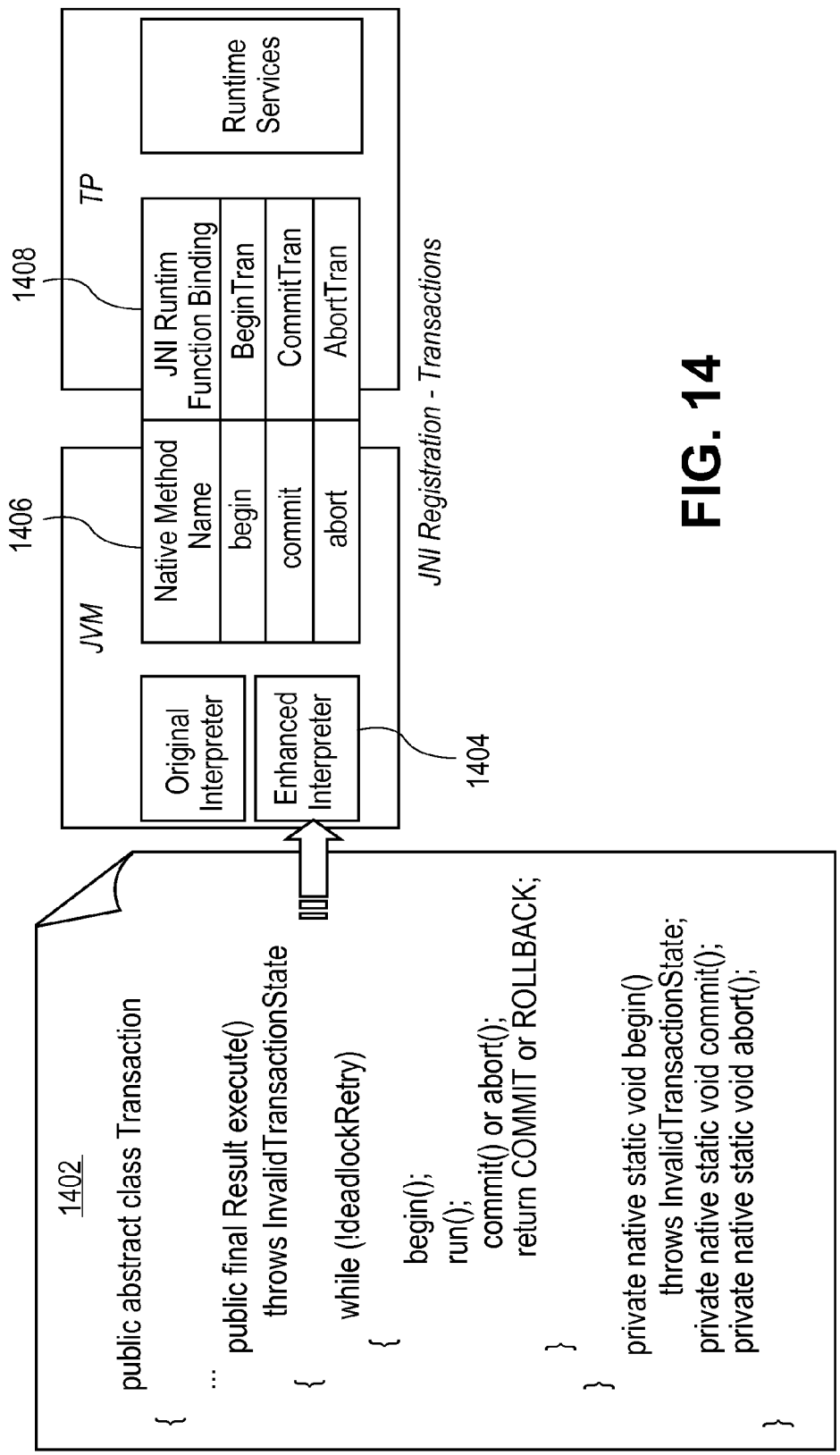
FIG. 14 illustrates an example in which a development environment is integrated to transaction processing, in which users are able to use JAVA development tools without modification, and the transparent integration is a result, in part, of transaction bindings and enhancement of the JVM interpreter.

The transparent integration is a result, in part, of transaction bindings and enhancement of the JVM interpreter. An example of this concept is shown in FIG. 14. In FIG. 14, a JAVA class 1402 is shown as being provided to an enhanced JVM interpreter 1404. JAVA Native Interface (JNI) methods 1406 are registered to the JNI so that a JNI runtime function binding 1408 binds the JAVA execution control to transaction processing platform runtime services in FIG. 14. Thus, for example, JAVA transaction context lifecycle may be managed via begin, commit and abort bindings.

Figure 15:
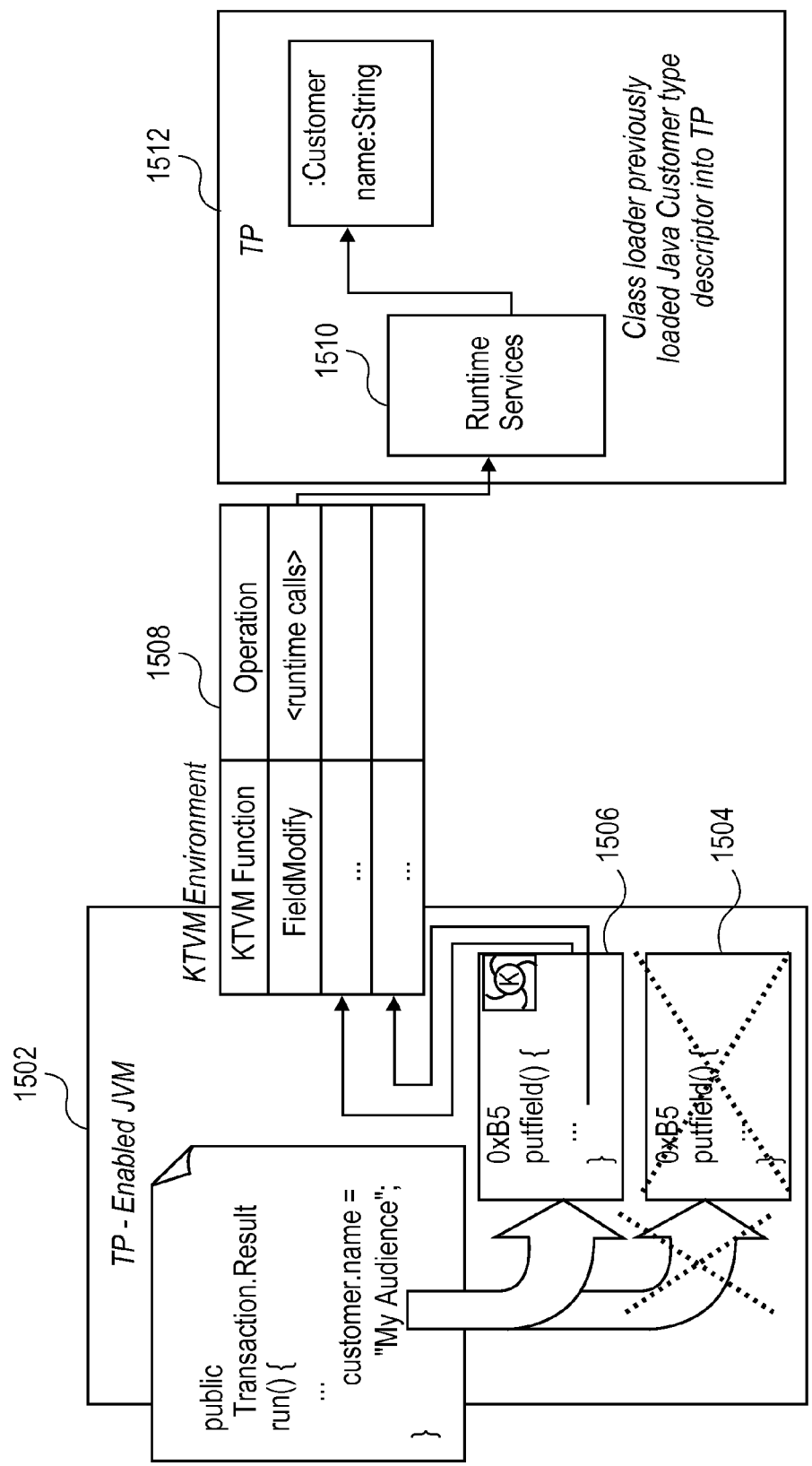
FIG. 15 illustrates an example of a slightly modified version of a JVM interpreter that may be active during transaction execution for subsequent transparent locking, deadlock detection, etc.

A slightly modified version of the JVM interpreter may be active during transaction execution for subsequent transparent locking, deadlock detection, etc. FIG. 15 illustrates an example of such a slightly modified transaction processing enabled JVM 1502. In particular, when the JVM 1502 executes in a transactional context, certain transactional JVM functions (such as the putfield(-) function 1504 in FIG. 15) are replaced by a variant (i.e., in FIG. 15, the putfield( ) function 1506), and the JAVA code executes transparently, with transactional processing semantics. If not in a transactional mode, the modified JVM may run without any transaction processing overhead, with a separate byte code interpreter being utilized while in the transactional mode. The opcode rewrites may be specified in assembler language to optimize performance. The transactional processing environment maintains a table 1508 that maps the VM function to runtime services of the transaction processing service 1512. Using the FIG. 15 example, the class loader has previously loaded the JAVA "Customer" type descriptor in the transaction processing service, so that the "Customer" type as specified using JAVA maps to the "Customer" type in the transaction processing service 1512.

Figure 16:
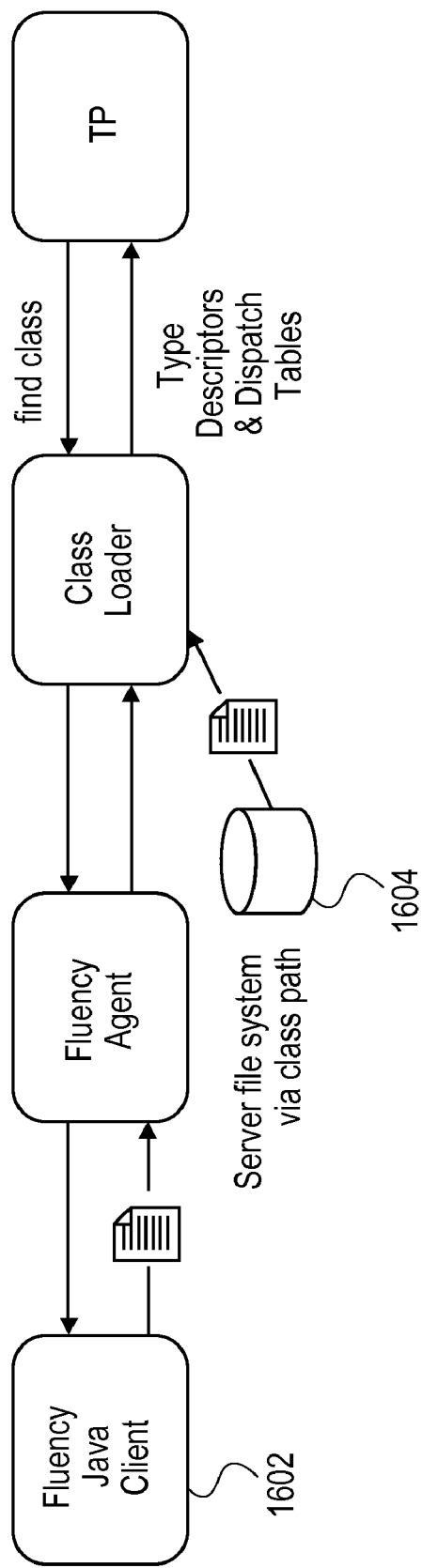
FIG. 16 illustrates functionality of an example of a transaction processing platform class loader.

FIG. 16 illustrates functionality of an example of the transaction processing platform class loader. Basically, as just discussed with reference to FIG. 15, the class loader operates to extend the JVM version to populate JAVA class information into the transaction processing runtime system. Thus, for example, the JAVA code when executed can result in transparently creating persistent transaction processing objects via the standard JAVA "new" operator. As another example, the JAVA code can result in execution of operations on transaction processing objects via a standard JAVA method invocation. Transaction processing objects can be read and modified via standard JAVA member access (e.g., not special getters & setters). Virtual transaction processing methods may be transparently overridden, with events being transparently dispatched from the transaction processing service to the JVM. A JAVA class may be derived from a transaction processing interface.

Referring now to FIG. 16, when the JAVA client 1602 is handling an application that requires a class, the client 1602 first tries to locate the class in the server class path of the server file system 1604. FIG. 16 shows classes being loaded from the client and mapping to type descriptors in the transaction processing service.

The JAVA client permits for remote development on any JAVA-equipped platform, interfacing with the transaction processing servers to deploy, execute and debug transaction processing enabled JAVA applications. Thus, for example, the application may be executed from the command line or Commercial off-the-shelf integrated development environment. Upon execution, the client opens a connection the agent running on the target node and sends command, options and application data (e.g., JAVA class and JAR files) to the transaction processing server. The agent monitors execution of the application, including displaying console output of the application for that client. In addition, the agent can respond to request for additional JAVA classes needed by the node during runtime. In addition, a JAVA debugger can be attached at any time, and debugging and profiling can be carried out remotely via a JAVA IDE. Also, service names registered to MDNS (multicast domain name service) can be displayed and reference via the transaction processing node service.

Examples of client usage include:

JAVA -jar ktp.jar [options] <target> [application arguments]

JAVA -jar ktp.jar [options] help

JAVA -jar ktp.jar [options] display services

The following table illustrates examples of command options for the JAVA client:

| Option | Description |
| --- | --- |
| adminport | The administration port of the Fluency node that should be used to run the application. |
| autoconfigure | This option, when given a value of true, requests that the Fluency node load and activate node configuration files before the application starts, and deactivate/remove those configurations when the application terminates (default: false). |
| Debug | A boolean flag indicating whether diagnostic output is required (default: false) |
| detailed | A boolean flag indicating whether the 'display services' command output should contain detailed results (default: false) |
| displayversion | A boolean flag indicating whether the Fluency version information should be displayed (default: true). |
| domainname | The name of the domain that the application is to run on. When this option is used, the deployment tool must connect to a Kabira Domain Manager node which is managing the given domain. The application will execute on all nodes in the domain. |
| domaingroup | The name of the domain group that the application is to run on. When this option is used, the deployment tool must connect to a Kabira Domain Manager node which is managing the given domain group. The application will execute on all nodes in the domain group. |
| domainnode | The name of the domain node that the application is to run on. When this option is used, the deployment tool must connect to a Kabira Domain Manager node which is managing the given domain node. The application will execute on the specified node. |
| Hostname | The host name hosting the Fluency node that should be used to run the application (default: localhost). |
| password | The password to use when authenticating username during the connection to the Fluency node. |
| remotedebug | If true, require the JVM hosting the application to enable remote debugging (default: false for PRODUCTION nodes, true for DEVELOPMENT nodes). |
| remotedebugport | The debugger agent port, to be used by the JVM to listen for remote debugger clients (default: randomly chosen by the JVM). |

-continued

| Option | Description |
| --- | --- |
| reset | This option, when given a value of true, requests that all Java objects and type definitions on the node be deleted before the application begins execution (default: true). |
| Servicename | The service name of the Fluency node that is to be used to run the application. This option may be used instead of adminport and hostname. This option only works if MDNS service discovery is configured on the local machine. |
| suspend | If true, require the JVM to suspend execution before main( ) is called during remote debugging. This option only applies if remotedebug=true is specified (default: false). |
| timeout | The number of seconds to wait while resolving servicename with MDNS (default: 10). |
| username | The user name to use when connecting to a Fluency node. The specified value must identify a principal with administrative privileges on the node. |
| x509credential | The X509 certificate keystore file to use for authentication. If given, the password parameter is required, and should be the keystore password |
| x509credentialalias | The alias of the user's X509 certificate in the keystore specified by the x509credential option (default: mykey). |

Particular examples of use of such options include:

JAVA -jar ktp.jar display services

JAVA -jar ktp.jar servicename=primary pojotransaction-demo.jar

JAVA -jar ktp.jar servicename=primary remotedebug=true pojotransactiondemo.jar

Figure 17:
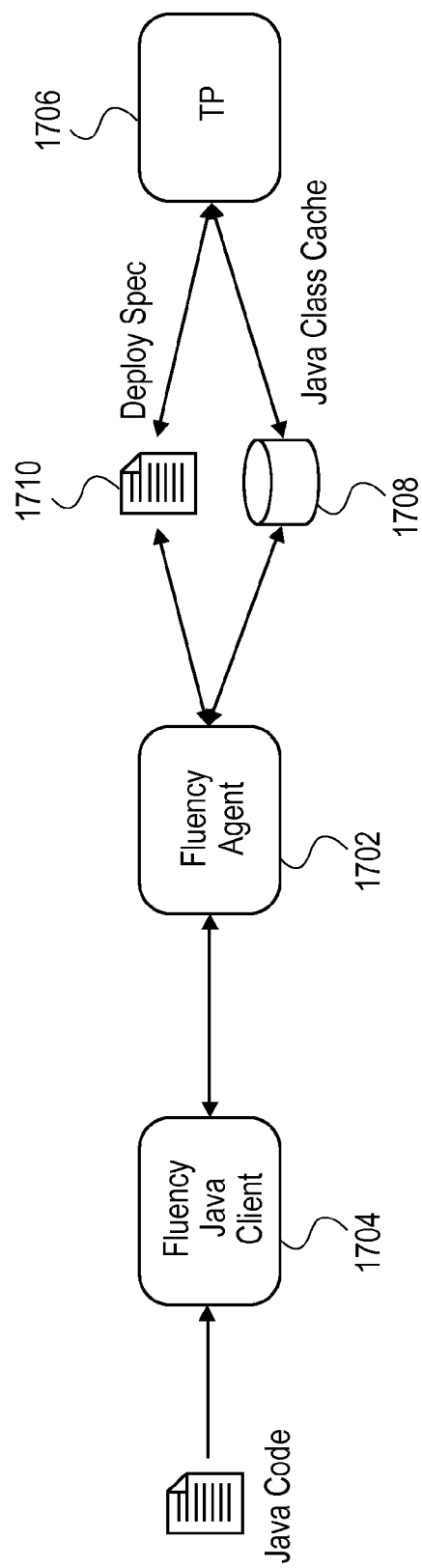
FIG. 17 illustrates how an agent 1702 may manage server-side responsibilities of a remote development interface.
Figure 18:
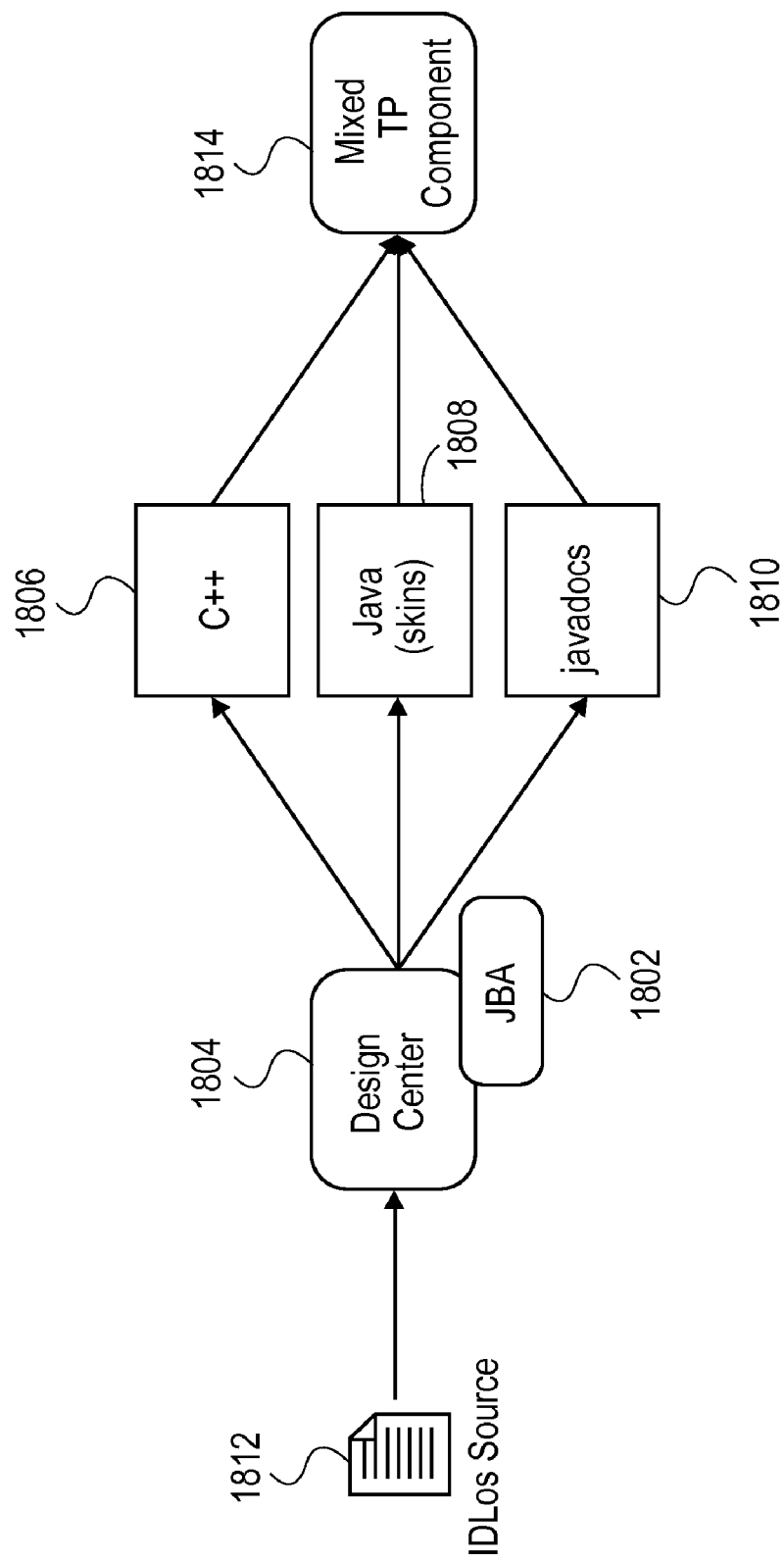
FIG. 18 illustrates a JAVA Bindings Adaptor (JBA) plugin to a design center, which enables transaction processing platform native components to be automatically accessible from JAVA programs.

FIG. 17 illustrates how an agent 1702 may manage server-side responsibilities of a remote development interface. More particularly, when a request is received from a JAVA client 1704, the agent 1702 authenticates the request using SSL-based authentication via the transaction processing service 1706 administrative framework. The agent 1702 requests and receives JAVA application classes from the client 1704 as needed during runtime, requesting and receiving additional classes from the client 1704 as needed during runtime. The agent 1702 places the classes in a node-specific location (JAVA class cache 1708) to be available for class loading and execution. The agent generates a deployment specification 1710 defining a JVM with the user's classes, virtual machine options and parameters.

An application's lifecycle includes, for example, a client 1704 commanding load, into the engine, of the deployment specification 1710 generated by the agent 1702. The client 1704 polls for stdout/stderr output from the engine and causes the output to be displayed on a console. When the engine exits, the engine exit code is returned as the command return code. If the client exits before the JAVA client 1704 request completes, the engine is stopped, the deployment specification 1710 is unloaded, and the state of the application is removed by the agent 1702.

We now describe an example of the life cycle of a managed object. All creates, reads, updates, and deletes of managed objects should be done in a transaction. Creating an object in a transaction that rolls back removes the object from shared memory. Deleting an object in a transaction that rolls back leaves the object in shared memory.

As mentioned above in the introduction to basic concepts, managed objects are not garbage collected by the JVM. Only the proxy JAVA object that references the managed object is garbage collected—the shared memory state of the object itself remains. Managed objects should be explicitly deleted by calling the delete method, an example of which follows:

```
package programming.fluency.managedobjects;
import com.kabira.platform.ManagedObject;
import com.kabira.platform.Transaction;
class E extends ManagedObject { };
public class D extends Transaction
{
    public static void main (String [ ] args)
    {
        new D( ).execute( );
    }
    @Override
    protected void run( )
    {
        E       e = new E( );
        //
        // Delete instance in shared memory
        //
        e.delete( );
    }
}
```

After the delete method is called on a managed object, using the JAVA reference to invoke methods or access a field will cause the JAVA.lang.NullPointerException exception to be thrown. The ManagedObject.is Empty( ) method can be used to test whether the shared memory backing a JAVA reference has been deleted.

Managed objects may automatically maintain an extent. The extent makes it possible to find all instances of a managed object at any time. Applications should not rely on any ordering of objects in an extent. The following is an example of managed object extents:

```
package programming.fluency.managedobjects;
import com.kabira.platform.ManagedObject;
import com.kabira.platform.Transaction;
import com.kabira.platform.ManagedObjectSet;
class I extends ManagedObject
{
    I (int number)
    {
        super( );
        this.number = number;
    }
    int number;
}
public class H extends Transaction
{
    public static void main (String [ ] args)
    {
        new H( ).execute( );
    }
    @Override
    protected void run( )
    {
        int j;
        //
        // Create objects in shared memory
        //
        for(j = 0; j < 10; j++)
        {
            new I(j);
        }
        //
        // Iterate the extent deleting all of the created objects
        //
        ManagedObjectSet<I> iExtent = ManagedObject.extent(I.class);
        for (I i : iExtent)
        {
            System.out.println(i.number);
```

```
            i.delete( );
        }
    }
}
```

We now describe locking and isolation. Extents support a transaction isolation of READ COMMITTED. This means that a write lock is not taken on an extent when an object is created or destroyed. This does imply that two extent iterations of the same extent in a transaction may return different results if other transactions have committed between the two iterations.

A specific extent isolation that may be supported is:
creates are always visible in the transaction in which they occur;
deletes are visible in the transaction in which they occur on objects that were created in the same transaction; and
deletes are visible after the transaction commits on objects that were created in a separate transaction The example immediately following demonstrates there rules:

```
package programming.fluency.managedobjects;
import com.kabira.platform.*;
class J1 extends ManagedObject { }
public class J extends Transaction
{
    enum Action
    {
        CREATE,
        BOTH,
        DELETE
    }
    private Action m_action;
    private String m_message;
    public static void main (String [ ] args)
    {
        J       j = new J( );
        j.m_action = Action.BOTH;
        j.m_message = "Same Transaction";
        j.execute( );
        j.m_action = Action.CREATE;
        j.m_message = "Separate Transactions";
        j.execute( );
        j.m_action = Action.DELETE;
        j.m_message = "Separate Transactions";
        j.execute( );
    }
    @Override
    protected void run( ) throws Rollback
    {
        int i;
        if ((m_action == Action.BOTH) || (m_action == Action.CREATE))
        {
            for (i = 0; i < 10; i++)
            {
                new J1( );
            }
        }
        ManagedObjectSet<J1> extent = ManagedObject.extent(J1.class);
        if ((m_action == Action.BOTH) || (m_action == Action.CREATE))
        {
            System.out.println(m_message);
            System.out.println(extent.size( ) + " objects in extent after create");
        }
        if (m_action == Action.BOTH || m_action == Action.DELETE)
        {
```

```
        for (J1 j1 : extent)
        {
            j1.delete( );
        }
        System.out.println(extent.size( ) + " objects in extent after
        delete");
      }
   }
}
```

When the preceding example is executed, the following output results (annotation added):

```

# Both creates and deletes are reflected because both are done
# in the same transaction

Same Transaction
10 objects in extent after create
0 objects in extent after delete

# Deletes are not reflected until the transaction commits because
# creates occurred in a separate transaction

Separate Transactions
10 objects in extent after create
10 objects in extent after delete
```

Objects accessed through extent iteration do not have a transaction lock when they are returned. A transaction lock is not taken on the object until a field is accessed or the object is explicitly locked. As discussed above, there is no lock taken on an extent when objects are created or deleted. The combination of no extent locking, and a lock not being taken on objects returned from extent iteration, may cause deleted object references being returned from an extent. The following is an example of extent object locking:

```
package programming.fluency.managedobjects;
import com.kabira.platform.Transaction;
import com.kabira.platform.ManagedObject;
import com.kabira.platform.ManagedObjectSet;
import JAVA.util.logging.Level;
import JAVA.util.logging.Logger;
class K1 extends ManagedObject { };
//
// This thread creates and deletes Managed Objects in shared memory.
// Sleep to introduce some variability
//
class K2 extends Thread
{
    private static final int NUMBERITERATIONS = 10;
    @Override
    public void run( )
    {
        int i;
        for (i = 0; i < NUMBERITERATIONS; i++)
        {
            try
            {
                new K3(K3.Action.CREATE).execute( );
                Thread.sleep(1000);
                new K3(K3.Action.DELETE).execute( );
            }
            catch (InterruptedException ex)
            {
                Logger.getLogger(K2.class.getName( )).log(Level.SEVERE, null,
                ex);
            }
        }
    }
}
//
// Transaction to create and delete Managed Objects
//
class K3 extends Transaction
{
    private static final int COUNT = 100;
    enum Action
    {
        CREATE,
        DELETE
    }
    K3 (Action action)
    {
        m_action = action;
    }
    private Action m_action;
    @Override
    protected void run( ) throws Rollback
    {
        //
        // Create managed Managed Objects
        //
        if (m_action == Action.CREATE)
        {
            int i;
            for (i = 0; i < COUNT; i++)
            {
                new K1( );
            }
        }
        else
        {
            assert ( m_action == Action.DELETE );
            ManagedObjectSet<K1>extent = ManagedObject.extent(K1.class);
            //
            // Iterate extent - test for deleted objects, delete
            // ones that are not already deleted by another thread
            //
            for (K1 k : extent)
            {
                if (k.isEmpty( ) == false)
                {
                    k.delete( );
                }
            }
        }
    }
}
public class K
{
    private static final int NUMBERTHREADS = 15;
    public static void main (String [ ] args) throws InterruptedException
    {
        int i;
        K2 threads[ ] = new K2[NUMBERTHREADS];
        for (i =0; i < NUMBERTHREADS; i++)
        {
            threads[i] = new K2( );
            threads[i].start( );
        }
        //
        // Wait for all of the threads to exit
        //
        for (i = 0; i < NUMBERTHREADS; i++)
        {
            threads[i].join( );
        }
    }
}
```

In accordance with some examples, the managed objects may be queried using a query interface. For example, the executing system may maintain a catalog of the persisted managed Java objects (in shared memory), wherein applications can submit a query using various criteria and receive a result, based on processing the maintained catalog, that is an indication of the managed objects that satisfy the submitted query.

More generally, the catalog is a parametric mapping of the managed objects. For example, the maintained catalog may be an index of keys that have been defined on the managed Java objects, such as by using a Java construct in defining the managed objects. In one embodiment, the Java construct to define a key is an annotation. An index associated with a mirrored or replicated Managed Object is maintained on all nodes in the cluster. As another example, the maintained catalog may be a catalog of more inherent properties or features of the managed objects, and not properties or features that are created specifically for the purpose of facilitating queries of the managed objects. As yet another example, the maintained catalog may be a catalog that includes both an index of keys and a catalog of more inherent properties or features of the managed objects. In any case, the parametric mapping is such that queries can be processed in view of the parametric mapping, in order for the application to select particular ones of the managed objects.

Figure 19:
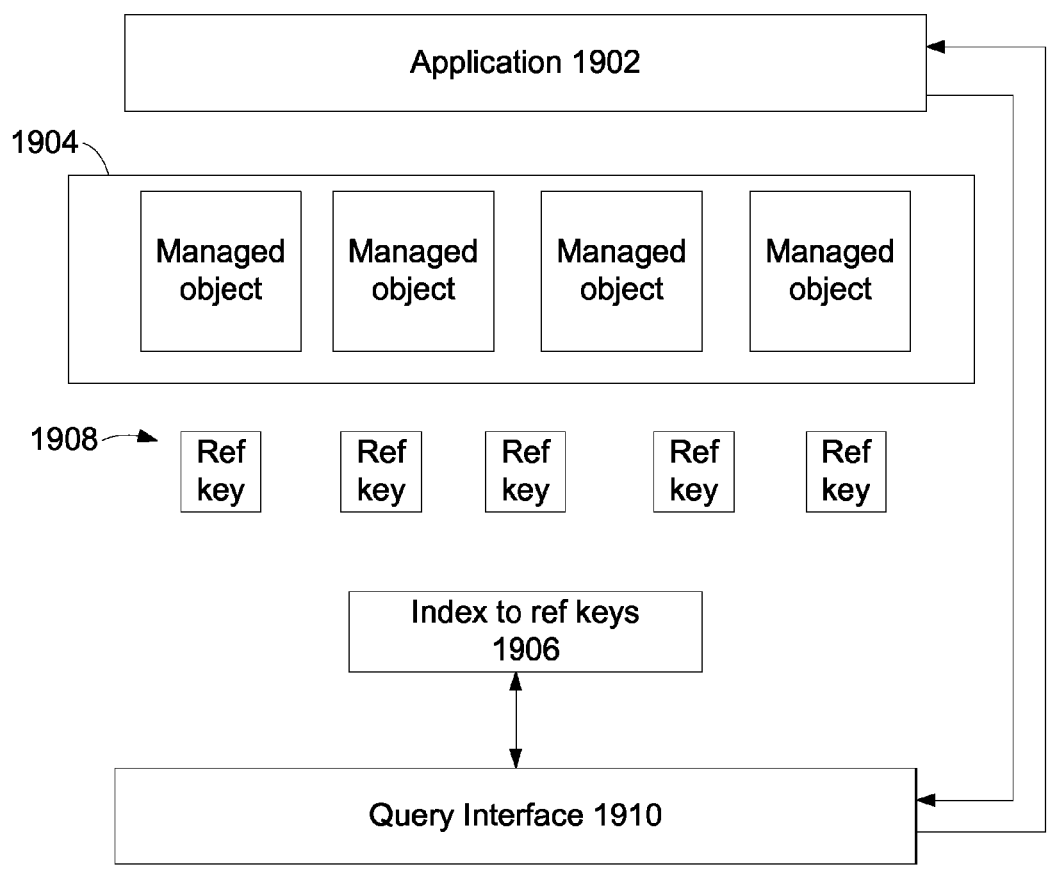
FIG. 19 is a block diagram illustrating how managed objects may have one or more keys defined, with an index maintained in shared memory for each key such that high-performance queries may be performed against the managed objects using a shared memory index.

FIG. 19 is a block diagram illustrating how managed objects may have one or more keys defined, with an index maintained in shared memory for the keys such that high-performance queries may be performed against the managed objects using the shared memory index. Referring now to FIG. 19, the application 1902 is a fully transactional application having properties such as is discussed throughout this patent application. In the course of executing, the application 1902 processes managed objects (referred to in FIG. 19 collectively by reference numeral 1904). A key 1908 may be defined for each object, such as when the object is instantiated. The executing system maintains an index 1906 of the keys (collectively, 1908). They index 1906 may be queried by the application 1902, and query results returned to the application 1902, via a query interface 1910.

Having discussed the indexes of keys and queries broadly, as well as a query interface via which an application may interface to the index, we now describe some detailed examples of how the keys may be defined and how the queries may be implemented. For example, an annotation to define a key may capture information such as the name of the key, a list of one or more fields making up the key, a property indicating whether the key is unique, and/or a property indicating whether the key is ordered. These fields are discussed in greater detail below.

Support may thus be provided for unique and non-unique keys, and ordered and unordered keys. Such keys are well known in the field of querying, such as database querying. A key that is a unique is a key that uniquely identifies a particular object, whereas a non-unique key is a key that potentially identifies more than one object. Keys that are ordered with respect to each other collectively comprise a sequence of keys, such that the objects to which the keys correspond can be sorted, ranges can be identified, etc. based on the ordering of the keys. Queries are supported that use the indexes defined by the keys on Managed Objects. In addition to unique and non-unique queries, and to ordered and unordered queries, queries may also include range queries. Support is also provided for cardinality, atomic selection of an object that is created if it does not exist, and locking.

We now provide an example in which a unique unordered key is defined on a managed object.

```
package com.kabira.snippets.managedobjects;
import com.kabira.platform.annotation.Key;
import com.kabira.platform.annotation.Managed;
/**
 * Defining a managed object with a single unique key. Key fields
 * must be declared as final.
 *       <p>
 *       <h2> Target Nodes</h2>
 *       <ul>
 *       <li><b>domainnode</b> = primary
 *       </ul>
 */
@Managed
@Key
(
    name = "ByName",
    fields = { "name" },
    unique = true,
    ordered = false
)
public class Keys
{
    Keys(String name)
    {
        this.name = name;
    }
    final String name;
}
```

It is noted that key fields may be inherited from parent classes. In one example, key classes must be defined as non-static final, and any field type supported by managed objects may be a key field. Thus, as will be illustrated in the following examples, the query facility is quite robust and flexible.

For example, once a key is defined on a managed object, an index or other catalog may be may be maintained in shared memory for that key. The index may be processed to respond to queries on the managed objects, where the queries specify key values that should be used in the processing the query.

Example queries are discussed a little bit later in this description. But first, we discuss an example of how the keys may be defined using a Java construct. In the example, the Java construct includes two annotations that may be used to define the keys. The first annotation is @ Key, to define a single key. The second annotation is @KeyList, to define multiple keys at once. It is noted that the @KeyList annotation may be used to define a single key, but the @Key annotation is provided to support more concise single key definitions.

Following is the @Key annotation definition:

```
package com.kabira.platform.annotation;
import java.lang.annotation.*;
/** This annotation defines a single key for a Managed class. */
@Documented
@Inherited
@Retention(RetentionPolicy.RUNTIME)
@Target(ElementType.TYPE)
public @interface Key
{
    /** The name of this key on the given type. Key names must be unique
     *     for a single type (including inherited keys).
     */
    String name( );
    /** An ordered list of the fields that make up this key. The fields
     *      must be defined in this class or in a superclass.
     */
    String[ ] fields( );
    /** If true, the runtime will enforce that only one instance will contain
     *      the key data.
     */
```

```
boolean unique( ) default true;
/** If true, the key data will be managed as an ordered set. */
boolean ordered( ) default false;
}
```

Now, following is the @KeyList annotation definition:

```
package com.kabira.platform.annotation;
import java.lang.annotation.*;
/** This annotation is used to define multiple keys on a single Managed
class.
*/
@Documented
@Inherited
@Retention(RetentionPolicy.RUNTIME)
@Target(ElementType.TYPE)
public @interface KeyList
{
   Key[ ] keys( );
}
```

In one example, keys for managed objects have certain restrictions, such as:
  @Key and @KeyList cannot be used on the same class.
  @KeyList must be of non-zero length (at least one @Key must be defined)
  @Key and @KeyList can only be used on a class marked @Managed or @Distributed, or extending a managed class.
  All fields defined in each @Key annotation must exist in the class, or in a superclass.
  All key fields must be declared final and non-static.
  The key name must be unique within its class and among all inherited keys.
Key restrictions may be audited when the class is loaded. In this case, if any key definitions in the class fail, a java-.lang.ClassNotFoundException may be thrown.

Regarding duplicate keys, it generally is not possible to create multiple instances of a uniquely keyed managed object. In one example, creating a second instance of a uniquely keyed managed object will cause the following exception: com.kabira.platform.ObjectNotUniqueError. In addition, when the exception is thrown, this indicates that the object was not created. Later, we discuss a safe way to create uniquely keyed objects in the multi-threaded transaction processing environment.

The following example illustrates how a duplicate key exception may be handled:

```
package com.kabira.snippets.managedobjects;
import com.kabira.platform.*;
import com.kabira.platform.annotation.*;
/**
 * Duplicate keys
 * <p>
 * <h2> Target Nodes</h2>
 * <ul>
 * <li><b>domainnode</b> = primary
 * </ul>
 */
public class DuplicateKey extends Transaction
{
   /**
    * A managed object with a unique key
    */
   @Managed
```

```
   @Key
   (
      name = "ByNumber",
      fields = { "number" },
      unique = true,
      ordered = false
   )
   public static class MyObject
   {
      public MyObject(int number)
      {
         this.number = number;
      }
      final int   number;
   }
   /**
    * Main entry point
    * @param args Not used
    */
   public static void main(String [ ] args)
   {
      new DuplicateKey( ).execute( );
   }
   @Override
   protected void run( ) throws Rollback
   {
      //
      // Create object with a key value of 1
      //
      MyObject   myObject = new MyObject(1);
      //
      // Create another object with the same key value
      //
      try
      {
         new MyObject(1);
      }
      catch (ObjectNotUniqueError ex)
      {
         System.out.println(ex.getMessage( ));
      }
      ManagedObject.delete(myObject);
   }
}
```

When the above example is run, the output is as follows:

```
[primary] Duplicate found for key
'com.kabira.snippets.managedobjects.-
DuplicateKey$MyObject::ByNumber'
   in com.kabira.snippets.managedobjects.DuplicateKey$MyObject,
instance 1247018:5286456:2001:2.
   Duplicate is com.kabira.snippets.managedobjects.-
DuplicateKey$MyObject, instance 1247018:5286456:2001:1.
   Key data:
[primary] [
[primary]
[primary]   number = 1
[primary] ]
```

Having discussed how keys may be defined, we now discuss how a query interface may be provided. In one example, the following classes provide the query interface for managed objects.
  com.kabira.platform.KeyManager<T>—Factory to create query objects.
  com.kabira.platform.KeyQuery<T>—Query object. Used to define and execute queries.
  com.kabira.platform.KeyFieldValueList—Used to define query name/value pairs.
  com.kabira.platform.KeyFieldValueRangeList—Used to define query name/value pairs that have a range.
The classes are generally used as follows to define and execute a query.

1. Create a KeyManager<T> object.
2. Create a KeyQuery<T> object.
3. Create a KeyFieldValueList object.
4. Add key name/value pairs to the KeyFieldValueList object to define the query values.
5. Define the query using the KeyQuery<T> and the KeyFieldValueList objects.
6. Execute the query using the KeyQuery<T> object.
Once a query is defined, that defined query can be used multiple times.

Having described some details of defining keys and queries for managed objects, we now provide some examples. Before doing so, however, it is noted that, in some examples, indexes of keys support a transaction isolation of SERIALIZABLE. This means that all updates to an index are transactionally isolated from other transactions. That is, any modifications to an index caused by the creation or deletion of a keyed managed object is not visible outside of the current transaction until the transaction commits.

In one example, specific isolation rules for indexes are as follows:
  Creates are always visible in the transaction in which they occur.
  Deletes are always visible in the transaction in which they occur.
  Creates are visible outside of the transaction in which they were created after the transaction commits.
  Deletes are visible outside of the transaction in which they were deleted after the transaction commits The locking of objects returned from queries is explicit. When a query is executed, the specific locking to be applied to the objects in the query can be specified in the query API.

Now, we turn to providing some examples of defining and using keys for performing queries. The first example illustrates defining and using a single unique key to perform a query.

```
package com.kabira.snippets.managedobjects;
import com.kabira.platform.*;
import com.kabira.platform.annotation.*;
/**
 * Unique key query
 * <p>
 * <h2> Target Nodes</h2>
 * <ul>
 * <li><b>domainnode</b> = primary
 * </ul>
 */
public class UniqueKey extends Transaction
{
    /**
     * A managed object with a unique key
     */ @Managed
    @Key
    (
        name = "ByNumber",
        fields = { "number" },
        unique = true,
        ordered = false
    )
    public static class MyObject
    {
        public MyObject(int number, String description)
        {
            this.number = number;
            this.description = description;
        }
        final int      number;
        final String   description; }
    /**
     * Main entry point
     * @param args Not used
     */
    public static void main(String [ ] args)
    {
        new UniqueKey( ).execute ( ) ;
    }
    @Override
    protected void run( ) throws Rollback
    {
        //
        // Create some keyed objects
        //
        new MyObject(1, "one");
        new MyObject(2, "two");
        //
        // Create required query objects
        //
        KeyManager<MyObject>   keyManager = new
            KeyManager<MyObject>( );
        KeyQuery<MyObject>      keyQuery =
            keyManager.createKeyQuery( MyObject.class, "ByNumber");
        KeyFieldValueList   keyFieldValueList =
        new KeyFieldValueList( );
        //
        // Define the query to find object 1
        //
        keyFieldValueList.add("number", 1);
        keyQuery.defineQuery(keyFieldValueList);
        //
        // Perform the query - the returned object has a write lock
        //
        MyObject    myObject =
            keyQuery.getSingleResult(LockMode.WRITELOCK);
        System.out.println(myObject.description);
        ManagedObject.delete(myObject);
        //
        // Redefine the query to find object 2. Clear the previous value
        // before reusing the keyFieldValueList
        // keyFieldValueList.clear( );
        keyFieldValueList.add("number", 2);
        keyQuery.defineQuery(keyFieldValueList);
        //
        // Perform the query - the returned object has a write lock
        //
        myObject = keyQuery.getSingleResult(LockMode.WRITELOCK);
        System.out.println(myObject.description);
        ManagedObject.delete(myObject);
    }
}
```

When the above example is run, the following output is generated:

```
[primary] one
[primary] two
```

The next example illustrates defining and using a single non-unique key to perform a query. Non-unique keys use a for loop to iterate over all possible instances.

```
package com.kabira.snippets.managedobjects;
import com.kabira.platform.*;
import com.kabira.platform.annotation.*;
/**
 * Non-unique key query
 * <p>
 * <h2> Target Nodes</h2>
 * <ul>
 * <li><b>domainnode</b> = primary
 * </ul>
 */
public class NonUniqueKey extends Transaction
```

-continued

```
{
    /**
     * A managed object with a non-unique key
     */
    @Managed
    @Key
    (
        name = "ByNumber",
        fields = { "number" },
        unique = false,
        ordered = false
    )
    public static class MyObject
    {
        /**
         * A non-unique, unordered object * @param group Group key
         * @param description Description
         */
        public MyObject(int group, String description)
        {
            this.group = group;
            this.description = description;
        }
        final int      group;
        final String   description; }
    }
    /**
     * Main entry point
     * @param args Not used
     */
    public static void main(String [ ] args)
    {
        new NonUniqueKey( ).execute( );
    }
    @Override
    protected void run( ) throws Rollback
    {
        //
        // Create some keyed objects. Notice that a duplicate
        // key value is specified.
        //
        new MyObject(1, "first one");
        new MyObject(1, "second one");
        //
        // Create required query objects
        //
        KeyManager<MyObject>   keyManager = new
            KeyManager<MyObject>( );
        KeyQuery<MyObject>      keyQuery =
            keyManager.createKeyQuery( MyObject.class, "ByNumber");
        KeyFieldValueList   keyFieldValueList =
            new KeyFieldValueList( );
        //
        // Define the query to find all objects with a key value of 1
        //
        keyFieldValueList.add("number", 1);
        keyQuery.defineQuery(keyFieldValueList);
        //
        // Perform the query - we need to use a for loop to iterate over
        // the objects
        //
        for (MyObject myObject :
            keyQuery.getResults(LockMode.WRITELOCK))
        {
            System.out.println(myObject.description);
            ManagedObject.delete(myObject);
        }
    }
}
```

The output of running this example is:

```
[primary] second one
[primary] first one
```

The next example illustrates defining a multi-field unique key to perform ordered queries.

```
package com.kabira.snippets.managedobjects;
import com.kabira.platform.*;
import com.kabira.platform.annotation.*;
/**
 * Unique ordered key query
 * <p>
 * <h2> Target Nodes</h2>
 * <ul>
 * <li> <b>domainnode</b> = primary
 * </ul>
 */
public class Ordered extends Transaction
{
    /**
     * A managed object with a unique multi-part key
     */
    @Managed
    @Key
    (
        name = "ByNumberDescription",
        fields = { "number", "description" },
        unique = true,
        ordered = true
    )
    public static class MyObject
    {
    /**
     * A non-unique ordered object
     * @param group Group
     * @param description Description
     */
    public MyObject(int group, String description)
    {
        this.group = group;
        this.description = description;
    }
    final int      group;
    final String   description;
}
    /**
     * Main entry point
     * @param args Not used
     */
    public static void main(String [ ] args)
    {
        new Ordered( ). execute( );
    }
        @Override
        protected void run( ) throws Rollback
        {
            //
            // Create some keyed objects. These objects are unique because
            // both the group and description field are part of the key
            //
            new MyObject(1, "a");
            new MyObject(1, "b");
            new MyObject(1, "c");
            //
            // Create required query objects
            //
            KeyManager<MyObject>   keyManager = new
                KeyManager<MyObject>( );
            KeyQuery<MyObject>      keyQuery =
                keyManager.createKeyQuery( MyObject.class,
                    "ByNumberDescription");
            KeyFieldValueList   keyFieldValueList =
            new KeyFieldValueList( );
            //
            // Define the query to find all objects with a key value of 1
            //
            keyFieldValueList.add("number", 1);
            keyQuery.defineQuery(keyFieldValueList);
            //
            // Perform an ordered descending query. //
            System.out.println("Descending Query:");
```

```
            for (MyObject myObject : keyQuery.getResults(
                KeyOrderedBy.DESCENDING, LockMode.WRITELOCK))
            {
                System.out.println("\t" + myObject.description);
            }
            //
            // Perform an ordered ascending query. //
            System.out.println("Ascending Query:");
            for (MyObject myObject : keyQuery.getResults(
                KeyOrderedBy.ASCENDING, LockMode.WRITELOCK))
            {
                System.out.println("\t" + myObject.description);
                ManagedObject.delete(myObject);
            }
        }
    }
```

When the preceding example is run, the following output results:

```
        [primary] Descending Query:
        [primary]   c
        [primary]   b
        [primary]   a
        [primary] Ascending Query:
        [primary]   a
        [primary]   b
        [primary]   c
```

The following example illustrates performing range queries on an ordered index.

```
package com.kabira.snippets.managedobjects;
import com.kabira.platform.*;
import com.kabira.platform.annotation.*;
/**
 *  Range query
 *  <p>
 *  <h2> Target Nodes</h2>
 *  <ul>
 *  <li><b>domainnode</b> = primary
 *  </ul>
 */
public class Range extends Transaction
{
    /**
     * A managed object with a unique multi-part key
     */
    @Managed
    @Key
    (
        name = "ByNumberDescription",
        fields = { "number", "description" },
        unique = true,
        ordered = true
    )
    public static class MyObject
    {
        public MyObject(int number, String description)
        {
            this.number = number;
            this.description = description;
        }
        final int       number;
        final String    description;
    }
    /**
     * Main entry point
     * @param args Not used
     */
    public static void main(String [ ] args)
    {
        new Range( ).execute( );
    }
    @Override
    protected void run( ) throws Rollback
    {
        //
        // Create some keyed objects. These objects are unique because
        // both the number and description field are part of the key
        //
        new MyObject(1, "a");
        new MyObject(1, "b");
        new MyObject(1, "c");
        new MyObject(2, "a");
        new MyObject(2, "b");
        new MyObject(3, "a");
        new MyObject(4, "a");
        new MyObject(5, "a");
        //
        // Create required query objects
        //
        KeyManager<MyObject>    keyManager = new
            KeyManager<MyObject>( );
        KeyQuery<MyObject>      keyQuery =
            keyManager.createKeyQuery( MyObject.class,
            "ByNumberDescription");
        KeyFieldValueRangeList keyFieldValueRangeList =
            new KeyFieldValueRangeList( );
        //
        // Define the query to find all objects with a number value < 3
        //
        keyFieldValueRangeList.add("number", 3,
        KeyComparisonOperator.LT);
        keyQuery.defineQuery(keyFieldValueRangeList);
        System.out.println("All objects with number < 3:");
        for (MyObject myObject : keyQuery.getResults(LockMode.
        NOLOCK))
        {
            System.out.println(
                "\t" + myObject.number + ":" + myObject.description);
        }
        //
        // Define the query to find all objects with a number between 1 and
        // 5, then sort them in descending order
        //
        keyFieldValueRangeList.clear( );
        keyFieldValueRangeList.add("number", 1,
        KeyComparisonOperator.GT);
        keyFieldValueRangeList.add("number", 5,
        KeyComparisonOperator.LT);
        keyQuery.defineQuery(keyFieldValueRangeList);
        System.out.println("All objects > 1 and < 5 - Descending:");
        for (MyObject myObject : keyQuery.getResults(
            KeyOrderedBy.DESCENDING, LockMode.NOLOCK))
        {
            System.out.println(
                "\t" + myObject.number + ":" + myObject.description);
        }
        for (MyObject myObject : ManagedObject.extent(MyObject.class))
        {
            ManagedObject.delete(myObject);
        }
    }
}
```

The preceding example results in the following output:

```
        [primary] All objects with number < 3:
        [primary]   1:a
        [primary]   1:b
        [primary]   1:c
        [primary]   2:a
        [primary]   2:b
        [primary] All objects > 1 and < 5 - Descending:
        [primary]   4:a
```

```
        [primary]    3:a
        [primary]    2:b
        [primary]    2:a
```

We now provide an example of an atomic create or select operation. In particular, it is sometimes desirable for an application to atomically select a unique object, if that object exists. Otherwise, if the object does not exist, the instance is created. In the example, the query interface provides a mechanism to do this operation even when multiple threads may be attempting to select the same instance simultaneously.

```
package com.kabira.snippets.managedobjects;
import com.kabira.platform.*;
import com.kabira.platform.annotation.*;
/**
 * Atomically creating a uniquely keyed object
 * <p>
 * <h2> Target Nodes</h2>
 * <ul>
 * <li><b>domainnode</b> = primary
 * </ul>
 */
public class AtomicCreate extends Transaction
{
    /**
     * A managed object with a unique key
     */
    @Managed
    @Key
    (
        name = "ByNumber",
        fields =
        {
            "number"
        },
        unique = true,
        ordered = false
    )
    public static class MyObject
    {
        public MyObject(int number, String description)
        {
            this.number = number;
            this.description = description;
        }
        final int number;
        final String description;
    }
    /**
     * Main entry point
     * @param args Not used
     */
    public static void main(String [ ] args)
    {
        new AtomicCreate ( ).execute ( ) ;
    }
    @Override
    protected void run( ) throws Rollback
    {
        //
        // Create object with a key value of 1
        //
        MyObject myObject = new MyObject(1, "start of world");
        //
        // Create required query objects
        //
        KeyManager<MyObject> keyManager =
            new KeyManager<MyObject>( );
        KeyQuery<MyObject> keyQuery =
            keyManager.createKeyQuery( MyObject.class, "ByNumber");
        KeyFieldValueList keyFieldValueList = new KeyFieldValueList( );
        KeyFieldValueList additional Fields = new KeyFieldValueList( );
        //
        // Define the query to find object 1
```

```
        //
        keyFieldValueList.add("number", 1);
        keyQuery.defineQuery(keyFieldValueList);
        //
        // Set up additional Fields
        //
        additional Fields.add("description", "create new object");
        //
        // Atomically select or create a new object. This will return
        // the original object created above since a key value of 1 is
        // being used. This can be seen because the value of the description
        // field is the value that was set when the object was created.
        //
        // This method never throws an ObjectNotUniqueError exception.
        //
        myObject = keyQuery.getOrCreateSingleResult(
            LockMode.WRITELOCK, additional Fields);
        System.out.println("description: " + myObject.description);
    ManagedObject.delete(myObject);
        //
        // Reset the query to use a value of 2
        //
        keyFieldValueList.clear( );
        keyFieldValueList.add("number", 2);
        keyQuery.defineQuery(keyFieldValueList);
        //
        // This will return a new object instance because no object exists
        // with a key value of 2. The description field is set to the value
        // defined in additional Fields parameter.
        //
        // This method never throws an ObjectNotUniqueError exception.
        //
        myObject = keyQuery.getOrCreateSingleResult(
            LockMode.WRITELOCK, additional Fields):
        System.out.println("description: " + myObject.description);
    ManagedObject.delete(myObject);
    }
}
```

We have thus described the features to search and modify in memory persistent Java objects through queries and keys.

We now discuss array copy-in/copy-out. When a field in a managed object is accessed, transactional locking and logging occur. This is true for primitive types, arrays, and objects.

Arrays can also be copied into a local array variable to avoid transactional locking or logging. This copy occurs implicitly if an array is passed into a method for execution. Shared memory backing an array is only modified when elements in the array are modified using the object reference containing the array. These cases are shown in the example below.

Array copies are a useful performance optimization when a large number of elements in an array are being modified in a single transaction.

The following provides an example of array copy-in/copy-out.

```
package programming.fluency.managedobjects;
import com.kabira.platform.ManagedObject;
import com.kabira.platform.Transaction;
class F2 extends ManagedObject
{
    int value;
}
class F1 extends ManagedObject
{
    F1( )
    {
        sharedMemoryArray = new int[10];
        int i;
        for (i = 0; i < 10; i++)
```

```
        {
            sharedMemoryArray[i] = i;
        }
        objectArray = new F2[2];
        for (i = 0; i < 2; i++)
        {
            F2 f2 = new F2( );
            f2.value = i;
            objectArray[i] = f2;
        }
    }
    int [ ] sharedMemoryArray;
    F2 [ ] objectArray;
}
public class F extends Transaction
{
    public static void main (String [ ] args)
    {
        new F( ).execute( );
    }
    @Override
    protected void run( )
    {
        F1 f = new F1( );
        //
        // Read lock f and make of copy of sharedMemoryArray in localArray
        //
        int localArray[ ] = f.sharedMemoryArray;
        //
        // This does not modify shared memory
        //
        localArray[2] = 6;
        System.out.println("localArray: " + localArray[2]
            + " sharedMemoryArray: " + f.sharedMemoryArray[2]);
        //
        // This modifies shared memory and takes a write lock on f
        //
        f.sharedMemoryArray[2] = 7;
        System.out.println("localArray: " + localArray[2]
            + " sharedMemoryArray: " + f.sharedMemoryArray[2]);
        //
        // This does not modify shared memory
        //
        modifyIntArray(localArray);
        System.out.println("localArray: " + localArray[0]
            + " sharedMemoryArray: " + f.sharedMemoryArray[0]);
        //
        // This does not modify shared memory.
        // It takes a read lock on f.
        //
        modifyIntArray(f.sharedMemoryArray);
        System.out.println("localArray: " + localArray[0]
            + " sharedMemoryArray: " + f.sharedMemoryArray[0]);
        //
        // This copies the value of localArray into shared memory
        // and takes a write lock on f.
        //
        f.sharedMemoryArray = localArray;
        System.out.println("localArray: " + localArray[0]
            + " sharedMemoryArray: " + f.sharedMemoryArray[0]);
        //
        // This copies only the object references in objectArray to a local
        // array - i.e. it does not perform a deep copy.
        //
        F2 localF2Array[ ] = f.objectArray;
        //
        // This updates shared memory through the object reference copied
        // into the local array
        //
        localF2Array[0].value = 8;
        System.out.println("f2.value: " + f.objectArray[0].value);
    }
    void modifyIntArray(int [ ] arg)
    {
        arg[0] = 5;
    }
}
```

When the preceding example is run, it results in the following output:

```

# Modify local array with a value of 6

localArray: 6 sharedMemoryArray: 2

# Modify shared memory with a value of 7

localArray: 6 sharedMemoryArray: 7

# Modify local array with a value of 5

localArray: 5 sharedMemoryArray: 0

# Modify shared memory array passed to a method with a value of 5

localArray: 5 sharedMemoryArray: 0

# Copy local array into shared memory array

localArray: 5 sharedMemoryArray: 5

# Modify shared memory using an object reference in a local array

f2.value: 8
```

When the preceding example is executed, it outputs (annotation added):

```

# Original value of 5th element of intArray

intArray[5] == 5

# 5th element still contains a value of 5 even after being
set to 0 by Reflection API

intArray[5] == 5
```

We now discuss the use of distributed computing features in a transactional application. In general, in accordance with an example, any managed object can be a distributed object using configuration data. Supported configuration values are described below.

Distribution configuration may be done using configuration files, an example syntax of which is discussed later. Distribution configuration defines a nested configuration block named Distribution. It also defines the following configuration interfaces:

DistributedObject—distributed object configuration
    DirectedCreateObject—directed create distributed object configuration
    CacheGroupObject—cache group distributed object configuration The example below shows how the distribution configuration block and interfaces may be used.

```
package com.kabira.platform.annotation;
import java.lang.annotation.*;
/** Mark a class as Distributed, and provide initial configuration
 * values for distribution type config.
 */
@Documented
@Inherited
@Retention(RetentionPolicy.RUNTIME)
@Target(ElementType.TYPE)
public @interface Distributed
{
/** Defines the legal cache policies for distributed objects.
```

```
    */
    public static enum CacheType
    {
        /** The cached copy is never considered valid. Every
         * access to this object will cause the cached data
         * to be refreshed.
         */
        NEVER,
        /** The cached copy is always considered valid. It is
         * never refreshed.
         */
        ALWAYS,
        /** The first time an object is accessed, the cache
         * is considered stale. After that the cached copy is
         * always considered valid. It is never refreshed again.
         */
        ONCE,
        /** The cached copy is considered valid for a configured
         * amount of time (the cache timeout). If the object is
         * accessed after the cache timeout has elapsed since the
         * last time it was read onto the node, it will be refreshed.
         */
        TIMED
    };
    /** The cache policy controls when cached data is considered
     * stale and should be read from the node on which the object
     * was created. Default value is CacheType.ALWAYS.
     */
    CacheType cacheType( ) default CacheType.ALWAYS;
    /** Refresh time in seconds; only valid if cacheType is
    CacheType.TIMED.
     */
    long cacheTimeSeconds( ) default 0L;
    /** A value of true enables asynchronous writes. Default false.
     */
    boolean asyncWrite( ) default false;
    /** A value of true enables asynchronous destroys. Default false.
     */
    boolean asyncDestroy( ) default false;
    /** Cache groups provide support for pushing cache data
     * to a configured cache group by mapping the cache group to a
     * set of network nodes. By default, the cache group is disabled.
     */
    CacheGroup cacheGroup( ) default @CacheGroup(
            enabled = false,
            groupName = "",
            asyncCreate = false);
    /** Directed create causes all object creates to be directed
     * to the node indicated by nodeName. By default,
     * directed create is disabled.
     */
    DirectedCreate directedCreate( ) default @DirectedCreate(
            enabled = false,
            nodeName = "");
```

The configuration attributes supported by the distribution configuration interfaces, in an example, are summarized below.

| Name | Type | Description |
| --- | --- | --- |
| typeName | Unbounded String | Class name, including the package prefix of the distributed object |
| cacheType | Enumeration- CacheNever, CacheAlways, CacheOnce, or CacheTimed | Control cache policy of distributed object. |
| cacheTimeSeconds | Unsigned long | Refresh time in seconds. Only valid if cache-Type is Cache Timed. |
| asyncWrite | Boolean | True or false. A value of true enables asynchronous writes. |
| asyncDestroy | Boolean | True or false. A value of true enables asynchronous destroys. |

The cache group configuration may have the following additional configuration values in addition to the DistributedObject configuration values.

| Name | Type | Description |
| --- | --- | --- |
| groupName | Unbounded String | Cache group name in which this object participates. |
| asyncCreate | Boolean | True or false. A value of true enables asynchronous creates. |

The directed create configuration has the following additional configuration values in addition to the DistributedObject configuration values.

| Name | Type | Description |
| --- | --- | --- |
| modeName | Unbounded String | A string value containing the node name used for all object creates. |

We now describe an example of a distributed object life cycle. Distributed objects have the same life cycle as any managed object. However, if an object maintains a reference to a distributed object, that object can be deleted on a remote node and the local object now has a stale reference. This stale reference is generally not detected until a field or a method on the reference is invoked. In this case the following exception is thrown.

```
//
// Invalid distributed reference detected
//
       JAVA.lang.NullPointerException
```

The example below illustrates how to configure and create a Directed Create type. There is no difference between creating a Directed Create type and a non-directed create type—both use new to create a new instance.

```
//
// NAME
// $RCSfile: DirectedCreate.java,v $
//
// COPYRIGHT
// Confidential Property of Kabira Technologies, Inc.
// Copyright 2008, 2009 by Kabira Technologies, Inc.
// All rights reserved.
//
// HISTORY
// $Revision: 1.9 $
//
package com.kabira.snippets.distributedcomputing;
import com.kabira.platform.*;
import com.kabira.platform.annotation.*;
import com.kabira.platform.swbuiltin.EngineServices;
```

```
/**
 * Directed Create distributed objects.
 * <p>
 * <h2> Target Nodes</h2>
 * <ul>
 * <li><b>domainname</b> = Fluency Development
 * </ul>
 */
public class DirectedCreate extends Transaction
{
    private Action m__action;
    private boolean m__done;
    DirectedCreate( )
    {
        m__done = false;
    }
    /**
     * Control program execution
     */
    enum Action
    {
        /**
         * Create objects
         */
        CREATE,
        /**
         * Wait on replica node for all creates to complete
         */
        WAIT
    }
/**
 * Directed create object
 */
@Distributed(
        directedCreate=
        @com.kabira.platform.annotation.DirectedCreate(nodeName=
        "replica"))
public static class DirectedCreateObject
{
    /**
     * Create a new object
     */
    public DirectedCreateObject( )
    {
        super( );
        createdOn = EngineServices.getNodeName( );
    }
    /**
     * Node on which object was created
     */
    public String createdOn;
}
/**
 * Main entry point
 *
 * @param args Not used
 */
public static void main(String [ ] args) throws InterruptedException
{
    DirectedCreate directedCreate = new DirectedCreate( );
    directedCreate.m__action = Action.CREATE;
    directedCreate.execute( );
    while (directedCreate.m__done == false)
    {
        directedCreate.m__action = Action.WAIT;
        directedCreate.execute( );
        Thread.sleep(1000);
    }
}
@Override
protected void run( ) throws Rollback
{
    String nodeName = EngineServices.getNodeName( );
    if (m__action == Action.CREATE)
    {
        System.out.println("Executing on: " + nodeName);
        DirectedCreateObject a = new DirectedCreateObject( );
        System.out.println("Object was created on: " +
        a.createdOn);
    }
    else
    {
        assert ( m__action == Action.WAIT );
        //
        // Only wait on replica node
        //
        if (nodeName.equals("replica") == false)
        {
            m__done = true;
            return;
        }
        //
        // Wait until an object is created from each node:
        //
        int cardinality = 0;
        for (DirectedCreateObject dc :
        ManagedObject.extent(
                DirectedCreateObject.class,
                LockMode.READLOCK))
        {
            cardinality++;
        }
        m__done = (cardinality >= 3);
    }
}
}
```

When the preceding example is run, it creates instances of A on the replica node. The output follows:

```
[replica] Executing on: replica
[replica] Object was created on: replica
[backup] Executing on: backup
[backup] Object was created on: backup
[primary] Executing on: primary
[primary] Object was created on: primary
```

We now discuss an example of using cache groups. The example below illustrates how to configure and create an object in a Cache Group. There is no difference between creating a type in a Cache Group and a type not in a cache group—both use new to create a new instance.

```
//
// Configuration of type in a cache group
//
configuration "cacheGroup" version "1.0" type "distribution"
{
    configure switchadmin
    {
        configure Distribution
        {
            //
            // Add class B to a cache group named fluency
            //
            CacheGroupObject
            {
                typeName = "programming.-
                fluency.distributedcomputing.B";
                groupName = "fluency";
                asyncCreate = false;
                asyncDestroy = false;
                asyncWrite = false;
            };
        };
    };
};
package programming.fluency.distributedcomputing;
import com.kabira.platform.*;
import com.kabira.platform.swbuiltin.EngineServices;
class B extends ManagedObject
```

```
{
    String createdOn;
}
public class CacheGroup extends Transaction
{
    enum Action
    {
        CREATE,
        WAIT,
        DISPLAY
    }
    private Action m__action;
    private boolean m__done = false;
    public static void main (String [ ] args) throws
    InterruptedException
    {
        CacheGroup cacheGroup = new CacheGroup( );
        cacheGroup.m__action = Action.CREATE;
        cacheGroup.execute( );
        cacheGroup.m__action = Action.WAIT;
        System.out.print("Waiting");
        while (cacheGroup.m__done == false)
        {
            cacheGroup.execute( );
            System.out.print(".");
            Thread.sleep(1000);
        }
        System.out.println("done");
        CacheGroup.m__action = Action.DISPLAY;
        cacheGroup.execute( );
    }
    @Override
    protected void run( ) throws Rollback
    {
        String nodeName = EngineServices.getNodeName( );
        //
        // Create object on local node
        //
        if (m__action == Action.CREATE)
        {
            new B( ).createdOn = nodeName;
            System.out.println("Created object on: " +
            nodeName);
        }
        else if (m__action == Action.WAIT)
        {
            if (ManagedObject.extent(B.class).size( ) < 3)
            {
                return;
            }
            m__done = true;
        }
        else
        {
            assert ( m__action == Action.DISPLAY );
            ManagedObjectSet<B> extent =
            ManagedObject.extent(B.class);
            //
            // Display all references in extent. The extent
            contains references
            // from remote objects that were pushed to the
            local node
            //
            for (B b : extent)
            {
                System.out.println(
                    "Found on " + nodeName +
                    ": " + b.createdOn);
            }
        }
    }
}
```

When the example executes, it outputs the following (annotation added and status messages deleted). The actual order of the messages may differ depending on execution timing.

```

# A cache group distributed object was created on replica node

[replica] Created object on: replica
[replica] Waiting..

# A cache group distributed object was created on backup

[backup] Created object on: backup
[backup] Waiting..

# A cache group distributed object was created on primary

[primary] Created object on: primary

# The backup node saw all three distributed objects

[backup] .done
[backup] Found on backup: replica
[backup] Found on backup: primary
[backup] Found on backup: backup

# The primary node saw all three distributed objects

[primary] Waiting.done
[primary] Found on primary: primary
[primary] Found on primary: replica
[primary] Found on primary: backup

# The replica node saw all three distributed objects

[replica] done
[replica] Found on replica: replica
[replica] Found on replica: primary
[replica] Found on replica: backup
```

We now discuss "unavailable node" exceptions. In particular, attempting to access a distributed object from a remote node when the node is down will cause this exception to be thrown:
JAVA.lang.VirtualMachineError A remote node is detected to not be down when the following action is attempted on a distributed reference:
method invocation
object deletion
field modification
field access when the local cache is stale The following example illustrates the behavior using a directed create type that is configured for an invalid node name.

```
//
// Configuration of a directed create type with an invalid node name
//
configuration "nodeDown" version "1.0" type "distribution"
{
    configure switchadmin
    {
        configure Distribution
        {
            //
            // Create all instances of class C on invalid node
            //
            DirectedCreateObject
            {
                typeName = "programming.-
                fluency.distributedcomputing.C";
                nodeName = "invalid";
                asyncDestroy = false;
                asyncWrite = false;
            };
        };
    };
```

-continued

```
}
package programming.fluency.distributedcomputing;
import com.kabira.platform.*;
class C extends ManagedObject { }
public class NodeDown extends Transaction
{
        public static void main (String [ ] args)
        {
                new NodeDown( ).execute( );
        }
        @Override
        protected void run( ) throws Rollback
        {
                //
                // Create an object on a node that is unavailable
                // This will cause a JAVA.lang.VirtualMachineError
                //
                new C( );
        }
}
```

When the preceding example is executed, it outputs the following:
JAVA main class programming.fluency.distributedcomputing.NodeDown.main exited with an exception.
JAVA exception occurred: JAVA.lang.VirtualMachineError: Rethrowing system exception returned from dispatched operation.
   at com.kabira.platform.ManagedObject._createSMObject (Native Method)
   at com.kabira.platform.ManagedObject.<init>(ManagedObject.JAVA:118)
   at programming.fluency.distributedcomputing.C.<init>(NodeDown.JAVA:17)
   at programming.fluency.distributedcomputing.NodeDown.run(NodeDown.JAVA:32)
   at com.kabira.platform.Transaction.execute(Transaction.JAVA:117)
   at programming.fluency.distributedcomputing.NodeDown.main(NodeDown.JAVA:23)

We now discuss locating a remote object. To initiate distributed computing, a reference to a remote object should be obtained. The following mechanisms are provided to access remote object references:

Directed create
Cache Groups
Remote method invocation

An external directory can also be used to store object references but, in some examples, this requires third-party software and additional configuration complexity.

Directed create can be used to create a factory object on a remote node. This factory object can provide a method that returns a distributed object instance from a remote node. This object instance can then be used on the local node as required to access remote services.

Cache groups can also be used to allow each node in a cluster to publish an object that is pushed to all other nodes. These pushed object references can then be found on all nodes. The following examples shows how a cache group can be used to provide remote access to all nodes in a cluster.

```
//
// NAME
// $RCSfile: InitialReferences.java,v $
//
// COPYRIGHT
// Confidential Property of Kabira Technologies, Inc.
```

-continued

```
// Copyright 2008, 2009 by Kabira Technologies, Inc.
// All rights reserved.
//
// HISTORY
// $Revision: 1.11 $
//
package com.kabira.snippets.distributedcomputing;
import com.kabira.platform.*;
import com.kabira.platform.annotation.*;
import com.kabira.platform.swbuiltin.EngineServices;
/**
 * Accessing an initial reference from a remote node.
 * <p>
 * <h2> Target Nodes</h2>
 * <ul>
 * <li> <b>domainname</b> = Fluency Development
 * </ul>
 */
public class InitialReferences extends Transaction
{
        /**
         * Distributed object that accesses node name
         */
        @Managed
        public static class Reference
        {
                /**
                 * Return node name on which object was created.
                 * @return Node name of node
                 */
                public String getNodeName( )
                {
                        return EngineServices.getNodeName( );
                }
        }
        /**
         * Node
         */
        @Distributed(
                cacheGroup=
                @com.kabira.platform.annotation.CacheGroup(groupName=
                "fluency"))
        public static class Node
        {
                /**
                 * Return an object created on the local node
                 * @return Object reference
                 */
                public Reference getReference( )
                {
                        InitialReferences.m_count++;
                        return new Reference( );
                }
        }
        /**
         * Control program execution
         */
        public enum Action
        {
                /**
                 * Create object
                 */
                CREATE,
                /**
                 * Wait for all nodes to create objects
                 */
                WAITCREATE,
                /**
                 * Query node name
                 */
                QUERY,
                /**
                 * Wait for all nodes to complete
                 */
                WAITDONE
        }
        private Action m_action;
        private boolean m_done = false;
        private static int m_count = 0;
        /**
```

-continued

```
* Main entry point
*
* @param args Not used
* @throws InterruptedException Interrupted sleep
*/
public static void main (String [ ] args) throws InterruptedException
{
        InitialReferences ir = new InitialReferences( );
        ir.m__action = Action.CREATE;
        ir.execute( );
        System.out.println("Waiting for creates");
        ir.m__action = Action.WAITCREATE;
        while (ir.m__done == false)
        {
            ir.execute( );
            Thread.sleep(1000);
        }
        System.out.println("Creates done");
        ir.m__done = false;
        ir.m__action = Action.QUERY;
        ir.execute( );
        System.out.println("Waiting for nodes to complete");
        ir.m__action = Action.WAITDONE;
        while (ir.m__done == false)
        {
            ir.execute( );
            Thread.sleep(1000);
        }
        System.out.println("Nodes done");
}
@Override
protected void run( ) throws Rollback
{
    if (m__action == Action.CREATE)
    {
        new Node( );
    }
    else if (m__action == Action.WAITCREATE)
    {
        int cardinality = 0;
        for (Node n : ManagedObject.extent(Node.class,
        LockMode.READLOCK))
        {
            cardinality++;
        }
        m__done = (cardinality >= 3);
    }
    else if (m__action == Action.WAITDONE)
    {
        if (InitialReferences.m__count < 3)
        {
            return;
        }
        m__done = true;
    }
    else
    {
        assert ( m__action == Action.QUERY );
        for (Node node : ManagedObject.extent(Node.class))
        {
            //
            // Get the node name on which the Reference object
            // was created.
            //
            System.out.println("Node: " +
            node.getReference( ).getNodeName( ));
        }
    }
}
```

When the preceding example is executed, it outputs the following (annotation added):

```
[replica] Waiting for creates
[replica] Creates done
[replica] Node: replica
[replica] Node: backup
[replica] Node: primary
[replica] Waiting for nodes to complete
[backup] Creates done
[backup] Node: replica
[backup] Node: backup
[backup] Node: primary
[backup] Waiting for nodes to complete
[primary] Node: replica
[primary] Node: backup
[primary] Node: primary
[primary] Waiting for nodes to complete
[replica] Nodes done
[backup] Nodes done
[primary] Nodes done
```

We now describe state conflicts. A state conflict is reported when a write operation from a remote node detects that the data on the local node has changed underneath it. This is possible in a distributed system because an object may be modified from multiple nodes in the system. This exception is thrown when a state conflict is detected:

com.kabira.platform.StateConflictError

This exception should never be caught by the application. It is used by the system to manage state conflicts as described below.

State conflicts are handled differently depending on whether writes are configured to be executed asynchronously or synchronously. When distributed writes are configured to execute asynchronously, the state conflict is not detected until the write is executed on the remote node. This is in a different transaction than the one that modified the object data. If a state conflict is detected, the update is discarded on the remote node with a log message.

When writes are configured to execute synchronously state conflicts are handled transparently by the system. If a state conflict is detected on a remote node, an error is returned to the local node, where the cache is invalidated so that the next field access will cause the object data to be refreshed. The transaction is then rolled back and replayed. The application is never aware that a state conflict occurred.

We now discuss extents. Global extents are maintained if an object type is configured in a cache group. As object instances are pushed out to all nodes in a cache group, the extent on the node is updated to contain references to all instances in the distributed system.

If an object type is not configured as part of a cache group, the extent on a node only contains the instances that have been created on that node, or pulled to the node in some other way (directed create, remote operation invocation, name service, factory, etc.).

Some internal guidelines for distributed programming include:

All modifications to a distributed object should be done on one node. This reduces the chance of state conflicts, which cause performance degradation. The best way to enforce this is to use methods to perform field updates. The method will execute on the master node transparently.

Eliminate distributed deadlocks from an application. Distributed deadlock detection may use a timeout to detect a deadlock. This implies that a distributed transaction will wait the entire value of the timeout value before a deadlock is reported. During this period of time, the transaction is stalled.

Factories or directed create should be used to create an object instance on a specific node.

Cache Groups should be used to discover remote references for nodes in a cluster.

Evaluate which nodes application classes must be installed on. Types configured for cache groups require that the application class be installed on all nodes that participate in the cache group. Applications that use directed creates and factories do not require the application component to be installed on all nodes in the distributed network, just the nodes on which the object will be created.

We now discuss high-availability, including a discussion of how to add mirrored and replicated managed objects to a transactional application. We also describe how high availability services may be configured. In particular, to integrate mirrored and replicated objects into an application, the following steps should be taken:

Configure the cluster and partitions
Define the mirrored and replicated application objects
Optionally integrate a router into the application Regarding configuration, high availability configuration information may include the following:

Cluster definition
Partition definition
Change log definition

High-availability configuration may be carried out using configuration files. High-availability configuration defines a nested configuration block named "ha" and also defines the following configuration interfaces:

NodeConfiguration—defines a node in the cluster. Multiple NodeConfiguration interfaces are supported.
PartitionConfiguration—defines a data partition. Multiple PartitionConfiguration interfaces are supported.
Supported configuration values are described below The example below illustrates how the high-availability configuration block and interfaces may be used:

```
//
// Define a high-availability configuration named sampleHA
// This is version 1.0 of this configuration
//
configuration "sampleHA" version "1.0" type "ha"
{
    //
    // HA configuration block
    //
    configure ha
    {
        //
        // Define the cluster with one or more
        NodeConfiguration interfaces
        //
        NodeConfiguration
        {
        ...
        };
        NodeConfiguration
        {
            ...
        };
        //
        // Define the application data partitions with one or more
        // PartitionConfiguration interfaces
        //
        PartitionConfiguration
        {
            ...
        };
        PartitionConfiguration
        {
            ...
        };
    };
};
```

Configuration attributes supported by the HA configuration interfaces are summarized in the tables below. For example, the node configuration values are summarized in the following table:

| Name | Type | Description |
| --- | --- | --- |
| Name | Unbounded string | Node name |

The following table summarizes the partition configuration values specific to a partition.

| Name | Type | Description |
| --- | --- | --- |
| Name | Unbounded string | A unique partition name. This name must be unique for all configured partitions. |
| Group | Unbound string | Partition group name. |
| minimumNumber | Unsigned long | Minimum range identifier. |
| maximumNumber | Unsigned long | Maximum range identifier. |
| primaryNodeName | Unbounded string | Primary node name. |
| backupNodeName | Unbounded string | Backup node name. |
| backupType | Enumeration-Synchronous or Deferred. | Controls whether updates to the backup node are made in the caller's transaction or in a different transaction. Default value is Synchronous. |
| backupMilliseconds | Unsigned long | Backup time interval in milliseconds if backupType is Deferred. Ignored if backupType is Synchronous. Default value is 100 milliseconds. |
| sendObjectChunkSize | Unsigned long | Object chunk size to use when restoring or migrating objects between nodes. This value controls how many objects are copied in a single transaction during node restores and migrations. Do not change the default value. Default value is 1000. |

Optional change log configuration values in the PartitionConfiguration interface are summarized in the table below:

| Name | Type | Description |
| --- | --- | --- |
| changeLog-Scope | Enumeration-LogDisabled, LogPrimary, LogBackup, LogBoth, LogAlways. | Scope of change logging. LogDisabled disables the change log. LogPrimary logs on primary node only, LogBackup logs on backup node only, Log Both logs on both the primary and backup nodes, or LogAlways logs on currently active node for partition. Default value is LogDisabled. |

-continued

| Name | Type | Description |
|---|---|---|
| formatterName | Unbounded string | Change log formatter name. Default value is X1VIL formatter. |
| fileNameTem-plate | Unbounded string | The full path of the file to be used for the change log. This may be an absolute path or a path relative to the node directory. The file and any missing directories will be created as needed. Variable tokens of the form % <token> may be used to generate file names. All of the POSIX defined tokens for strftime are supported (e.g. % Y-% m-% d % T % H: % M). There is also support for % nodeName, the name of the Fluency node and % count, the number of times the change log has rolled over. Default value is changelog.xml. |
| renameOnClose | Enumeration- Enabled or Disabled | If Enabled, causes the change log file to be renamed when it is closed. Events that trigger renaming are rollover, configuration deactivation, stopping an application, and node restart. Renaming is not supported across devices. During the rollover, if the fileOpenMode is set to Append and the destination file exists, the logger will append _0 to the destination name and try again, and if destination with _0 also exists, it will try destination with _1, and so on, till it finds the nonexisting destination_x. This prevents the system from accidentally overwriting an existing file. If the fileOpenMode is set to Truncate and the destination file exists, the destination file will be overwritten during rollover. Default value is Disabled. |
| renameTem-plate | Unbounded string | The name to which the active log file will be renamed when it is closed, including the full path. Only valid if renameOnClose is set to Enabled. The rename template supports all of the variable tokens supported by fileNameTemplate, as well as a special token which matches the file name portion of the original file name-% original Name-the file name portion of the original log file name. This token can be used to move the closed log file into a different directory while keeping the same name. Default value is an empty string. |
| loggingMode | Enumeration- Synchronous or Asynchronous | Select synchronous or asynchronous logging. A value of Synchronous means that log entries will be written to the log file synchronously from the calling transaction. Asynchronous means that the entry will be written to the log file outside of the context of the calling transaction. Default value is Synchronous. |
| transactional-Logger | Enumeration- Enabled or Disabled | When set to Enabled, causes the log entry to be written only upon commit of the calling transaction. If the calling transaction is rolled back, the log entry is dropped. When set to Disabled, the log entry is always written no matter the result of the transaction. Default value is Enabled. |
| asyncBuffering | Enumeration- Enabled or Disabled | Enable buffering for asynchronous logging. If buffering is enabled, log entries will be aggregated, and written together every asyncBufferingFlushIntervalSeconds seconds. Note that this option is only valid if loggingMode is Asynchronous. Default value is Disabled. |
| asyncBuffering-FlushInter-valSeconds | Unsigned long | Buffer flush interval, in seconds. When asyncBuffering is enabled, accumulated log records will be written to the file system at the specified interval (in seconds). This option is mandatory if asyncBuffering is Enabled, and not valid otherwise. Default value is 0. |
| rolloverBySize | Enumeration- Enabled or Disabled | When set to Enabled, log files are rolled over whenever their size exceeds rolloverSizeBytes bytes. Default value is Disabled. |
| rolloverSize-Bytes | Unsigned long | The file size, in bytes, which triggers change log file rollover. The actual number of bytes in the log file will normally exceed this size, as only whole records are written to the log file. Default value is 0. |
| rolloverByNum-Records | Enumeration- Enabled or Disabled | When set to Enabled, log files are rolled over when the number of log records written to the file reaches rolloverNumRecords. Default value is Disabled. |
| rolloverNumRecords | Unsigned long | The number of records which triggers log file rollover. Default value is 0. |

-continued

| Name | Type | Description |
|---|---|---|
| rolloverByInterval | Enumeration-Enabled or Disabled | When set to Enabled, log files are rolled over every rolloverIntervalSeconds seconds. Default value is Disabled. |
| rolloverInter-valSeconds | Unsigned long | Log files are rolled over every rolloverIntervalSeconds seconds. Default value is 0. |
| fileCreateMode | Unbounded string | The permissions to be used when creating log files. The format is an octal string of the form Oxxx, as defined by the P051K chmod 0 command. Note that the actual permissions on the file will be modified by the process's umask. Default value is 0644. |
| directoryCreate-Mode | Unbound string | The permissions to be used when creating directories. The format is an octal string of the form Oxxx, as defined by the P051K chmod 0 command. Note that the actual permissions on the directories will be modified by the process's umask. Default value is 0755. |
| fileSyncMode | Enumeration-Un-synchronized, Synchronized, or Syn-chronizedDataOnly | The synchronization level to set when opening log files. The values Synchronized and SynchronizedDataOnly correspond to the P051K open 0 system call flags O_SYNC and O_DSYNC, respectively. Default value is Synchronized. |
| fileOpenMode | Enumeration-Truncate or Append | The action to be taken when opening a log file which already exists. If the value is Append, the contents of the file will be preserved, and new log records written to the end of the file. If the value is Truncate, the contents of the file will be overwritten. Default value is Append. |
| allowEmptyLog-Files | Enumeration-Enabled or Disabled | When set to Enabled, empty log files are created upon close or rollover if there are no records in the log file. Otherwise, no file is created under those conditions. Default value is Enabled. |
| emptyLogFile-Content | Enumeration-Empty or Header-Footer | When set to Header Footer, empty log files include the header(s) and footer(s). If the value is Empty the empty log files do not include a header or a footer. |

An example of a highly available configuration file follows:

```
configuration "ha" version "1.0" type "ha"
{
    configure ha
    {
        //
        // Configure a primary, backup, and replica node
        //
        NodeConfiguration { name = "primary"; };
        NodeConfiguration { name = "backup"; };
        NodeConfiguration { name = "replica"; };
        //
        // Define a single partition
        //
        PartitionConfiguration
        {
            name = "fluency";
            group = "fluency";
            primaryNodeName = "primary";
            backupNodeName = "backup";
            minimumNumber = 0;
            maximumNumber = 100;
            sendObjectChunkSize = 5;
            //
            // Change Log Configuration
            //
            changeLogScope = LogBoth;
            fileNameTemplate =
            "../../logs/changelogs/%nodeName/
            %m%d__%count.xml";
            fileOpenMode = Append;
            directoryCreateMode = "0755";
            fileCreateMode = "0666";
            rolloverBySize = Disabled;
            rolloverSizeBytes = 0;
            rolloverByInterval = Disabled;
            rolloverIntervalSeconds = 0;
            rolloverByNumRecords = Enabled;
            rolloverNumRecords = 1000;
            renameOnClose = Enabled;
            renameTemplate =
            "../../logs/changelogs/%nodeName/complete/
            %m%d__%count.xml";
            loggingMode = Synchronous;
            transactionalLogger = Enabled;
            fileSyncMode = Unsynchronized;
        };
    };
};
```

We now discuss defining mirrored and replicated managed objects. Mirrored and replicated managed objects are defined by extending from the appropriate parent type. The following example shows how a mirrored managed object and a replicated managed object may be defined and created.

```
package programming.fluency.highavailability;
import com.kabira.platform.Transaction;
import com.kabira.platform.ha.*;
//
// This is a Mirrored Managed Object that will be created in
// Partition group "fluency" with a partition number of 0. The
// application identifier is set to a null to use the default value.
//
class B1 extends MirroredObject
{
    B1( )
    {
```

```
            super ("fluency", 0, null);
        }
    }
    //
    // This is a Replicated Managed Object that will be created in
    // Partition group "fluency" with a partition number of 0. The
    // application identifier is set to a null to use the default value.
    //
    class B2 extends ReplicatedObject
    {
        B2( )
        {
            super ("fluency", 0, null);
        }
    }
    public class B extends Transaction
    {
        public static void main (String [ ] args)
        {
            new B( ).execute( );
        }
        @Override
        protected void run( ) throws Rollback
        {
            //
            // Create a mirrored managed object
            //
            newB1( );
            //
            // Create a replicated managed object
            //
            new B2( );
        }
    }
```

It is noted that mirrored and replicated managed objects have the same life cycle as any managed object.

We now discuss application identifiers. Replicated and mirrored managed objects have an optional application defined identifier that can be specified when an object is created. A unique index is maintained for this identifier on all nodes in the HA cluster. This index is maintained during failover, restore, and migrations. The application identifier is unique across all mirrored and replicated object instances.

Specifying a non-unique identifier value when creating an object will cause the create to fail with the following exception:

```

# An attempt to create an object with a non-unique application identifier
# throws this exception

com.kabira.platform.ObjectNotUniqueError
```

The following example demonstrates the behavior of duplicate identifiers.

```
package programming.fluency.highavailability;
import com.kabira.platform.ha.MirroredObject;
import com.kabira.platform.*;
class E1 extends MirroredObject
{
    E1 (String identifier)
    {
        super ("fluency", 0, identifier);
    }
}
class E2 extends Thread
{
    int numberLoops = 10;
```

```
    @Override
    public void run( )
    {
        int   i;
        E3 e3 = new E3( );
        for (i = 0; i < numberLoops; i++)
        {
            e3.identifier = "" + i;
            e3.execute( );
        }
    }
}
class E3 extends Transaction
{
    String identifier;
    @Override
    protected void run( ) throws Rollback
    {
        try
        {
            new E1(identifier);
        }
        catch (ObjectNotUniqueError ex)
        {
            System.out.println(
                "Thread: " + Thread.currentThread( ).getName( )
                + " " + ex.getMessage( ));
        }
    }
}
public class E extends Transaction
{
    public static void main (String [ ] args) throws InterruptedException
    {
        //
        // Start two threads - both threads are attempting to create
        // objects using the same identifier - first one doing the
        // create wins. The other thread receives a ObjectNotUniqueError
        // exception.
        //
        E2 one = new E2( );
        E2 two = new E2( );
        one.start( );
        two.start( );
        //
        // Wait for the threads to exit
        //
        one.join( );
        two.join( );
        //
        // Display data in shared memory
        //
        new E( ).execute( );
    }
    @Override
    protected void run( ) throws Rollback
    {
        ManagedObjectSet<E1> extent =
        ManagedObject.extent(E1.class);
        for (E1 e1 : extent)
        {
            System.out.println(e1.identifier);
        }
    }
}
```

When the preceding example runs, it outputs as follows (annotation added). The exact thread number will vary.

```
Thread: Thread-2 Duplicate found for key 'ha::BaseImpl::ByIdentifier' in
programming/fluency/highavailability/E1, instance
1372378:250624:14560768793792062867:1.
Duplicate is programming/fluency/highavailability/E1, instance
1372378:250624:14560768793792062867:2. Key data:
[
identifier = "0"
```

-continued

```
]
Thread: Thread-2 Duplicate found for key 'ha::BaseImpl::ByIdentifier' in
programming/fluency/highavailability/E1, instance
1372378:250624:14560768793792062867:5.
Duplicate is programming/fluency/highavailability/E1, instance
1372378:250624:14560768793792062867:3. Key data:
[
identifier = "1"
]
Thread: Thread-2 Duplicate found for key 'ha::BaseImpl::ByIdentifier' in
programming/fluency/highavailability/E1, instance
1372378:250624:14560768793792062867:9.
Duplicate is programming/fluency/highavailability/E1, instance
1372378:250624:14560768793792062867:4. Key data:
[
identifier = "2"
]
Thread: Thread-2 Duplicate found for key 'ha::BaseImpl::ByIdentifier' in
programming/fluency/highavailability/E1, instance
1372378:250624:14560768793792062867:14.
Duplicate is programming/fluency/highavailability/E1, instance
1372378:250624:14560768793792062867:6. Key data:
[
identifier = "3"
]
87
Application Identifier
Thread: Thread-2 Duplicate found for key 'ha::BaseImpl::ByIdentifier' in
programming/fluency/highavailability/E1, instance
1372378:250624:14560768793792062867:15.
Duplicate is programming/fluency/highavailability/E1, instance
1372378:250624:14560768793792062867:7. Key data:
[
identifier = "4"
]
Thread: Thread-2 Duplicate found for key 'ha::BaseImpl::ByIdentifier' in
programming/fluency/highavailability/E1, instance
1372378:250624:14560768793792062867:16.
Duplicate is programming/fluency/highavailability/E1, instance
1372378:250624:14560768793792062867:8. Key data:
[
identifier = "5"
]
Thread: Thread-2 Duplicate found for key 'ha::BaseImpl::ByIdentifier' in
programming/fluency/highavailability/E1, instance
1372378:250624:14560768793792062867:17.
Duplicate is programming/fluency/highavailability/E1, instance
1372378:250624:14560768793792062867:10. Key data:
[
identifier = "6"
]
Thread: Thread-2 Duplicate found for key 'ha::BaseImpl::ByIdentifier' in
programming/fluency/highavailability/E1, instance
1372378:250624:14560768793792062867:18.
Duplicate is programming/fluency/highavailability/E1, instance
1372378:250624:14560768793792062867:11. Key data:
[
identifier = "7"
]
Thread: Thread-2 Duplicate found for key 'ha::BaseImpl::ByIdentifier' in
programming/fluency/highavailability/E1, instance
1372378:250624:14560768793792062867:19.
Duplicate is programming/fluency/highavailability/E1, instance
1372378:250624:14560768793792062867:12. Key data:
[
identifier = "8"
]
Thread: Thread-2 Duplicate found for key 'ha::BaseImpl::ByIdentifier' in
programming/fluency/highavailability/E1, instance
1372378:250624:14560768793792062867:20.
Duplicate is programming/fluency/highavailability/E1, instance
1372378:250624:14560768793792062867:13. Key data:
[
identifier = "9"
]

# 10 unique objects were created in shared memory

5
0
6
1
7
2
8
9
3
4
```

If the application does not require a unique identifier, a value of null can be specified for the identifier in the constructor. This will cause the system to chose a globally unique identifier for the object.

Both replicated and mirrored managed objects support a selectUsingByIdentifier method that is used to find the specified object. This method has the following signature:
 public static Base selectUsingByIdentifier(JAVA.lang.String identifier, LockMode lockMode)

The parameters to this method are set forth in the following table:

| Name | Description |
| --- | --- |
| identifier | Application specified identifier. |
| lockMode | Specify the transaction lock to be taken on the object. Valid values are LockMode.NoLock, LockMode.ReadLock, and LockMode.WriteLock. |

The return value from the selectUsingByIdentifier method is a valid object instance if an object with the specified identifier is found. The return value is a null object handle if an object with the specified identifier is not found.

We now describe an example of using the application identifier.

```
package programming.fluency.highavailability;
import com.kabira.platform.ha.*;
import com.kabira.platform.Transaction;
import com.kabira.platform.LockMode;
import com.kabira.platform.ObjectNotUniqueError;
class F1 extends MirroredObject
{
    F1 (String identifier)
    {
        super ("fluency", 0, identifier);
    }
}
public class F extends Transaction
{
    public static void main (String [ ] args)
    {
        new F( ).execute( );
    }
    @Override
    protected void run( ) throws Rollback
    {
        //
        // Create an instance of F1 with an identifier value of "one"
        // This can throw ObjectNotUnique if an object with this
        // identifier is already created
        //
        new F1("one");
        //
        // Find the instance of F1 just created
        //
        F1 one = (F1)F1.selectUsingByIdentifier("one",
            LockMode.ReadLock);
        System.out.println("Selected: " + one.identifier);
        //
```

```
// Create an instance of F1 using the default identifier
//
new F1(null);
//
// The create and select are done in a while loop to
// handle the case where a delete was done in a different
// thread after the new throws an exception, but before
// the select is executed.
//
F1 two = null;
while (two == null)
{
    try
    {
        two = new F1("two");
    }
    catch (ObjectNotUniqueError ex)
    {
        two = (F1)F1.selectUsingByIdentifier("two",
        LockMode.ReadLock);
    }
}
System.out.println("Selected: " + two.identifier);
}
}
```

Executing the preceding example results in the following output

```
Selected: one
Selected: two
```

We now discuss routing. Updates to mirrored or replicated managed objects occur on the current active master node for the object. The Route and DeliveryNotifier classes provide the mechanism to transparently route data between nodes to ensure that object updates are done on the current active master for a mirrored or replicated managed object. The routing functionality can also be used by applications for application specific reasons that do not involve modification of mirrored or replicated managed objects.

The Route class delivers application specified data to a DeliveryNotifier by name. The name of the DeliveryNotifier is unique on a node. However, the name does not have to be unique across all nodes in the cluster. The named DeliveryNotifier that is the target of a route request can exist on the local or any remote node. The location of the DeliveryNotifier is transparent to the application using the Route class. During application initialization delivery, notifiers should be created on all nodes that will be the target of route requests.

The Route class supports:
routing to the current active master node for a partition
routing to a specific node These routing services allow an application to easily return a response to a node that initiated a request, by sending some data to an application.

The below example shows the use of the Route class and a DeliveryNotifier to send some application specific data between two nodes. The initial routing is done by a partition identifier and the response is returned using the source node name.

The following example illustrates routing:

```
//
// NAME
// $RCSfile: Routing.java,v $
//
// COPYRIGHT
// Confidential Property of Kabira Technologies, Inc.
// Copyright 2008 by Kabira Technologies, Inc.
// All rights reserved.
//
// HISTORY
// $Revision: 1.5 $
//
package com.kabira.snippets.highavailability;
import java.util.logging.Level;
import java.util.logging.Logger;
import com.kabira.platform.ha.*;
import com.kabira.platform.Transaction;
import com.kabira.platform.ManagedObject;
import com.kabira.platform.swbuiltin.EngineServices;
/**
 * Routing application data to active node for a partition
 * <p>
 * <h2> Target Nodes</h2>
 * <ul>
 * <li> <b>domainname</b> = Fluency Development
 * </ul>
 */
public class Routing extends Transaction
{
    /**
     * Routing notifier
     */
    public static class Notifier extends DeliveryNotifier
    {
        Notifier(String name)
        {
            super (name);
        }
        @Override
        public void deliverToPartition(
            String sourceNodeName,
            PartitionId targetPartition,
            Object data) throws RoutingError
        {
            String request = " Request: " + (String) data;
            String nodes = "Source Node: " + sourceNodeName
                + " Target Node: " +
                EngineServices.getNodeName( );
            System.out.println(nodes + request);
            //
            // Return a response to the source node
            //
            Route.toNode(Routing.notifierName, sourceNodeName,
            "How are you?");
            //
            // Let main know we are done
            //
            Routing.done = true;
        }
        @Override
        public void deliverToNode(
            String sourceNodeName,
            Object data) throws RoutingError
        {
            String response = " Response: " + (String) data;
            String nodes = "Source Node: " + sourceNodeName
                + " Target Node: " +
                EngineServices.getNodeName( );
            System.out.println(nodes + response);
            //
            // Let main know we are done
            //
            Routing.done = true;
        }
    }
    /**
     * Control program exceution
     */
    public enum Action
    {
        /**
         * Create routing notifier
         */
        CREATENOTIFIER,
```

```
    /**
     * Send routing request
     */
    SENDREQUEST,
    /**
     * Delete routing notifier
     */
    DELETENOTIFIER
}
static final String notifierName = "mynotifier";
static volatile boolean done = false;
private String m__engineName;
private Action m__action;
private Notifier m__notifier;
/**
 * Main entry point
 * @param args Not used
 * @throws com.kabira.platform.ha.RoutingError
 * @throws java.lang.InterruptedException
 */
public static void main(String [ ] args)
    throws RoutingError, InterruptedException
{
    Routing routing = new Routing( );
    routing.m__action = Action.CREATENOTIFIER;
    routing.execute( );
    routing.m__action = Action.SENDREQUEST;
    routing.execute( );
    //
    // Wait here until done - we retry the send request
    // on the replica node. this handles the case where
    // the primary node hadn't created a notifier yet
    //
    while (done == false)
    {
        Thread.sleep(2000);
        if (routing.m__engineName.equals("replica") == true)
        {
            routing.execute( );
        }
    }
    routing.m__action = Action.DELETENOTIFIER;
    routing.execute( );
    System.out.println(routing.m__engineName + " exiting");
}
@Override
protected void run( ) throws Rollback
{
    m__engineName = EngineServices.getNodeName( );
    if (m__action == Action.CREATENOTIFIER)
    {
        m__notifier = new Notifier(notifierName);
        return;
    }
    if (m__action == Action.DELETENOTIFIER)
    {
        ManagedObject.delete(m__notifier);
            m__notifier = null;
            return;
    }
    assert ( m__action == Action.SENDREQUEST );
    //
    // If backup node we can exit immediately
    //
    if (m__engineName.equals("backup") == true)
    {
        Routing.done = true;
        return;
    }
    //
    // Route a message only from the replica node
    //
    if (m__engineName.equals("replica") == false)
    {
        return;
    }
    System.out.println("Routing request");
    //
    // Route a request to the pre-configured partition
    //
    PartitionId partitionId = new PartitionId( );
    partitionId.group = "fluency";
    partitionId.number = 0;
    String request = "Hello?";
    try
    {
        Route.toPartition(notifierName, partitionId, request);
    }
    catch (RoutingError ex)
    {
        Logger.getLogger(
        Routing.class.getName( )).log(Level.SEVERE,
        ex.getMessage( ), ex);
    }
}
```

When the preceding example is run, the following output is generated (annotation added and informational messages removed). The actual output may vary based on execution timing differences.

```

# Request sent from replica to primary node

[replica] Routing request

# Backup main is exiting. The code executing on the backup node does
# not participate in the routing example

[backup] backup exiting

# This is the replica node receiving the response from the primary. It is
# output before the primary message because of the way output is received
from remote nodes

[replica] Source Node: primary Target Node: replica Response: How are you?

# The replica is exiting after receiving the response from the primary node

[replica] replica exiting

# This is the primary node receiving the request from the replica

[primary] Source Node: replica Target Node: primary Request: Hello?

# The primary node is exiting after sending a response to the replica node

[primary] primary exiting
```

We now discuss partitioning of application data. Application data can be partitioned into one or more partitions by specifying the partition group and number when a mirrored or replicated managed object is created. The com.kabira.ha-.Base class, which is the base class for both Mirrored and Replicated Managed Objects, defines this public constructor:

public Base(JAVA.lang.String partitionGroup, //Partition group in which to create object long partitionNumber, //Partition number to use for object JAVA.lang.String identifier) //Application specific identifier for object The Partition specified when an object is created is to be configured on the local node. The decision on which partition should be associated with a Mirrored or Replicated Managed object may be based on an application specific criteria. For example all customers on the west coast may be in a partition named WEST, while all customers on the east coast may be in a partition named EAST.

The example below illustrates partitioning application data:

```
//
// HA configuration data to define two partitions - EAST and WEST
//
configuration "ha" version "2.0" type "ha"
{
    configure ha
    {
        //
        // Configure a primary, backup, and replica node
        //
        NodeConfiguration { name = "primary"; };
        NodeConfiguration { name = "backup"; };
        NodeConfiguration { name = "replica"; };
        //
        // Define EAST partition
        //
        PartitionConfiguration
        {
            name = "eastcoast";
            group = "EAST";
            primaryNodeName = "primary";
            backupNodeName = "backup";
            minimumNumber = 0;
            maximumNumber = 100;
            sendObjectChunkSize = 5;
            //
            // Change Log Configuration
            //
            changeLogScope = LogBoth;
            fileNameTemplate = "../../logs/changelogs/%nodeName/%m%d__%count.xml";
            fileOpenMode = Append;
            directoryCreateMode = "0755";
            fileCreateMode = "0666";
            rolloverByNumRecords = Enabled;
            rolloverNumRecords = 1000;
            renameOnClose = Enabled;
            renameTemplate =
                "../../logs/changelogs/%nodeName/complete/%m%d__%count.xml";
            loggingMode = Synchronous;
            transactionalLogger = Enabled;
            fileSyncMode = Unsynchronized;
        };
        //
        // Define WEST partition
        //
        PartitionConfiguration
        {
            name = "westcoast";
            group = "WEST";
            primaryNodeName = "primary";
            backupNodeName = "backup";
            minimumNumber = 0;
            maximumNumber = 100;
            sendObjectChunkSize = 5;
            //
            // Change Log Configuration
            //
            changeLogScope = LogBoth;
            fileNameTemplate =
                "../../logs/changelogs/%nodeName/%m%d__%count.xml";
            fileOpenMode = Append;
            directoryCreateMode = "0755";
            fileCreateMode = "0666";
            rolloverByNumRecords = Enabled;
            rolloverNumRecords = 1000;
            renameOnClose = Enabled;
            renameTemplate =
                "../../logs/changelogs/%nodeName/complete/%m%d__%count.xml";
            loggingMode = Synchronous;
            transactionalLogger = Enabled;
            fileSyncMode = Unsynchronized;
        };
    };
};
//
// Application data partitioning example
//
package programming.fluency.highavailability;
import com.kabira.platform.LockMode;
import com.kabira.platform.ha.MirroredObject;
```

```
-continued import com.kabira.platform.Transaction;
class Customer extends MirroredObject
{
    Customer (String partitionGroup, String identifier)
    {
        super (partitionGroup, 0, identifier);
        System.out.println(
            "Assigning customer " + identifier + " to group: " + partitionGroup);
    }
}
public class D extends Transaction
{
    public static void main (String [ ] args)
    {
        new D( ).execute( );
    }
    @Override
    protected void run( ) throws Rollback
    {
        //
        // Create Fred in the west partition group
        //
        Customer fred = new Customer("WEST", "Fred");
        //
        // Create Barney in the east partition group
        //
        Customer barney = new Customer("EAST", "Barney");
        //
        // Find Fred and Barney
        //
        fred = (Customer)Customer.selectUsingByIdentifier(
            "Fred", LockMode.ReadLock);
        barney = (Customer)Customer.selectUsingByIdentifier(
            "Barney", LockMode.ReadLock);
        System.out.println(fred.identifier + " is in " + fred.partitionGroup);
        System.out.println(barney.identifier + " is in " + barney.partitionGroup);
    }
}
```

When the preceding example is run, it creates the following output:

```
Assigning customer Fred to group: WEST
Assigning customer Barney to group: EAST
Fred is in WEST
Barney is in EAST
```

We now describe partition state change notifiers. In some cases, an application should be notified when a partition state changes. This is supported using:

```
public abstract class com.kabira.platform.ha.PartitionStateNotifier
{
    abstract void stateTransition(
        Partition partition,
        PartitionState oldState,
        PartitionState newState);
}
```

An application can create an instance of a PartitionStateNotifier on each node where it is interested in notifications of Partition state changes. The stateTransition method will be called for each state change for all partitions to which it is registered.

The following example shows a simple implementation that monitors Partition state changes.

```
package programming.fluency.highavailability;
import com.kabira.platform.LockMode;
import com.kabira.platform.ha.*;
import com.kabira.platform.Transaction;
class G1 extends PartitionStateNotifier
{
    @Override
    public void stateTransition(
        Partition partition,
        PartitionState oldState,
        PartitionState newState)
    {
        String message = "Partition: " + partition.name + "
            transitioning " + "from " + oldState + " to " + newState +
            " now hosted on " + partition.primaryNodeName;
        System.out.println(message);
    }
}
public class G extends Transaction
{
    enum Action
    {
        CREATE,
        WAIT,
        DELETE
    }
    private Action m_action;
    private boolean m_onLocalNode = true;
    private Partition m_partition;
    private G1 m_g1;
    public static void main (String [ ] args) throws InterruptedException
    {
        G    g = new G( );
        g.m_action = Action.CREATE;
        g.execute( );
        //
```

```
        // Wait here for Partition to failover to remote node
        //
        g.m_action = Action.WAIT;
        while (g.m_onLocalNode == true)
        {
            g.execute( );
            System.out.println("Waiting for partition to failover");
            Thread.sleep(10000);
        }
        //
        // Wait here for Partition to be restored from remote node
        //
        g.m_action = Action.WAIT;
        while (g.m_onLocalNode == false)
        {
            g.execute( );
            System.out.println("Waiting for partition to be restored");
            Thread.sleep(10000);
        }
        g.m_action = Action.DELETE;
        g.execute( );
    }
    @Override
    protected void run( ) throws Rollback
    {
        if (m_action == Action.CREATE)
        {
            m_g1 = new G1( );
            //
            // Get the partition we are interested in
            //
            m_partition = Partition.selectUsingByName("fluency",
                LockMode.ReadLock);
            //
            // Register our notifier
            //
            m_partition.setStateNotifier(m_g1);
        }
        else if (m_action == Action.WAIT)
        {
            //
            // See if the partition is still hosted on the local node
            //
            m_onLocalNode = m_partition.isHostedOnLocalNode( );
        }
        else
        {
            assert ( m_action == Action.DELETE );
            //
            // Clear our notifier
            //
            m_partition.clearStateNotifier(m_g1);
            m_g1.delete( );
        }
    }
}
```

When the preceding example is run, it outputs the following (annotation added):

```
Waiting for partition to failover

# fluency partition was failed over to the backup node

Partition: fluency transitioning from Migrating to HostedOnPrimary now
hosted on backup
Waiting for partition to failover

# fluency partition was restored to the primary node

Partition: fluency transitioning from Migrating to HostedOnPrimary now
hosted on primary
Waiting for partition to be restored
```

We now describe the use of timers for high availability. A highly available timer provides transparent fail-over to a backup node if the primary node fails. It also provides transparent timer services during node restoration and migration. The timer services are implemented as a notifier. An application inherits from the timer notifier interface and provides an implementation of the timerNotifier operation to use the timer service.

HA timers are transactional. If a timer is executing on a primary node but it does not commit before a primary node failure, the timer will be executed on the backup node following fail-over. HA timers are provided by the kabira.platform.ha.TimerNotifier class. The TimerNotifier is a mirrored object. It has a primary and a backup node and is associated with a partition. The timer can be controlled only on the current active node for the partition associated with the timer. The timer notifier will also only trigger on the currently active node. The object parameter to the timerNotifier operation must also be a Mirrored Managed object in the same partition as the timer notifier. This is so that this object is available on both the primary and backup nodes for the timer.

The ha::TimerId is a unique identifier for the timer on both the primary and backup nodes. The application can rely on this identifier being the same on both nodes. Timers may be started using the number of seconds from the current time, i.e. a relative, not an absolute time. The timer fires when this time expires. The relative time is transmitted to the backup node for a timer and the current time on the backup node is used to calculate when the timer should fire. This minimizes the impact of clock drift between the primary and backup nodes. However, it is strongly recommended that clocks be synchronized between the primary and backup nodes.

When a primary node fails, any pending timers are automatically restarted on the backup node. One-shot timers will only be executed on the backup node if they have not executed on the primary node before the failure. They will be executed at the initially scheduled time. A recurring timer will execute on the backup node at the next scheduled time. It will then continue to execute on the backup node until the primary node is restored. If a recurring timer was missed due to a delay between the primary failure and the backup node taking on the work, these scheduled timer executions will be dropped—there are no "makeup" executions for recurring timers.

When a primary node is restored, any active timers on the backup node will be cancelled on the backup node and restarted on the primary node. The same notifier execution rules as described for fail-over above apply. Migrating a partition that contains active timers will cause the timer to be canceled on the old primary node and restarted on the new primary node. The same is true if the backup node was migrated. The same notifier execution rules as described for fail-over above apply.

The following example illustrates how a highly available timer is created and terminated.

```
package programming.fluency.highavailability;
import com.kabira.platform.Transaction;
import com.kabira.platform.ManagedObjectSet;
import com.kabira.platform.ha.*;
//
// Mirrored object passed to timer notifier
//
class C1 extends MirroredObject
{
    C1( )
    {
        super ("fluency", 0, null);
    }
    int count;
```

-continued

```
}
//
// Timer notifier
//
Class Notifier extends TimerNotifier
{
    //
    // Timer notifier must be in same partition as the
    // object passed to the notifier
    //
    Notifier( )
    {
        super ("fluency", 0, null);
    }
    @Override
    public void timerNotify(String timerId, MirroredObject object)
    {
        C1 c1 = (C1) object;
        c1.count += 1;
        System.out.println("Timer Id:" + timerId + " Value: " +
            c1.count);
    }
}
public class C extends Transaction
{
    enum Action
    {
        START,
        TERMINATE
    }
    private Action m_action;
    public static void main (String [ ] args) throws InterruptedException
    {
        C c = new C( );
        c.m_action = Action.START;
        c.execute( );
        //
        // Wait for timer to fire a few times
        //
        Thread.sleep(10000);
        c.m_action = Action.TERMINATE;
        c.execute( );
    }
    @Override
    protected void run( ) throws Rollback
    {
        if (m_action == Action.START)
        {
            Notifier notifier = new Notifier( );
            C1 c1 = new C1( );
            System.out.println("Starting one second recurring
            timer");
            notifier.startRecurring(1, c1);
        }
        else
        {
            //
            // Stop timer - just delete the notifier
            //
            ManagedObjectSet<Notifier> extent =
            Notifier.extent(Notifier.class);
            for (Notifier notifier : extent)
            {
                System.out.println("Stopping one second recurring
                timer");
                notifier.delete( );
            }
        }
    }
}
```

When the preceding example is run, it results in the following output (annotations added).

```

# Timer started

Starting one second recurring timer

# Timer notifier called

Timer Id:primary:442381631492 Value: 1
Timer Id:primary:442381631492 Value: 2
Timer Id:primary:442381631492 Value: 3
Timer Id:primary:442381631492 Value: 4
Timer Id:primary:442381631492 Value: 5
Timer Id:primary:442381631492 Value: 6
Timer Id:primary:442381631492 Value: 7
Timer Id:primary:442381631492 Value: 8
Timer Id:primary:442381631492 Value: 9

# Timer terminated

Stopping one second recurring timer
```

We now describe failure exposure, including possible data loss under different backup policies and the keep-alive feature for detecting remote node outages. For example, with regard to synchronous updates, synchronous updates will only lose any non-committed Mirrored or Replicated object updates. No committed work is lost.

Inbound communications buffers that have not been processed are also lost. Some network buffers are configurable. A smaller network buffer size implies lower exposure to data loss. Even this small risk of data loss can be avoided if the client of the application has a protocol acknowledgement and includes retry logic if no acknowledgement is received. If the client application resends the request, nothing is lost. However, care should be taken to handle duplicates.

Deferred updates will lose data queued for update. The amount of data that is queued is controlled by the time interval of the backup. Smaller intervals minimize the possible data loss. This lost data was committed by the application on the primary node.

Keep-alive is supported between all nodes in a cluster. Keep-alive requests and responses are used to actively determine whether a remote node is still reachable. If a keep-alive response is not received from a remote node within a configurable amount of time the node is considered down. This will cause all routing to that node to be redirected to the backup node for that unavailable node.

We now describe monitoring applications, particularly during development. In one example, a management console—Kabira Manager—is used to control and monitor nodes. The following steps may be taken to start monitoring the Fluency development server environment.

1. Connect to the URL on the VMWare image start-up screen with a Web Browser.
2. Log into the management console using a username of guest and a password of fluency.
3. Log into the Fluency Development domain using a username of guest and a password of fluency.

These steps are described in more detail below.

An Object Monitor provides viewing of Managed Objects in shared memory. The object monitor may be accessed, for example, for each application node from the VMWare Welcome Page: Monitor Access on Welcome Screen Events Nodes generate events for exceptional conditions. These events are available in:

Node log files.
Domain Manager event cache
Domain Manager event monitor

No matter where events are viewed, they have the same content:
- Time Stamp—time event occurred
- Event Topic—topic on which event was published
- Event Identifier—unique event identifier
- Event Originator—a unique identifier for the event originator
- Message—a textual message In addition, events displayed from the Domain Manager event cache or monitor also contain the node name that generated the event. Here is a example event displayed in the Domain Manager event monitor:

Node Name=primary
Date Time=2008-09-10, 12:57:38
Event Topic=kabira.kts.security
Event Identifier=switchadmin::EventIdentifiers::OperatorActionSucceeded
Event Originator=switchadmin::PluginServiceImpl:1 (344579:8358104:7100:1 offset 67017096)
Message=Administrator command [display] on target [security] executed by principal [guest] succeeded.

The Domain Manager event cache provides a historical cache of all events raised by nodes being managed by a domain manager. The event cache supports the following filters:
- Node Name—only show events for a specific node.
- Event Topic—only show events for a specific event topic.
- Event Identifier—only show events with a specific event identifier.
- Event Originator—only show events from a specific originator
- Contains—only show events that contain a specific phrase.
- Start Time to End Time Range—only show events between specific start and end times.

The end time can be omitted to show all events from a specific start time.

The Domain Manager Event Monitor displays events real time as they occur.

We now describe an example of a deployment tool may be used during development to deploy applications to nodes. The deployment tool can be used from the command line or via a JAVA IDE. In one example, the deployment tool is named fluency.jar.

The general syntax for using the deployment tool is:
JAVA -jar fluency.jar [options] <target> [application parameters]
JAVA -jar fluency.jar [options] help
JAVA -jar fluency.jar [options] display services fluency.jar is specified as the first -jar option. This ensures that the deployment tool gets control during the execution of the application and manages execution and debugging of the application on a node. Attempting to execute an application that uses "fluency" classes without specifying the fluency.jar file as the first -jar option will cause a JAVA stack dump (such as shown in the following example) because the classes cannot execute outside of the transaction processing JVM:

Example:
Exception in thread "main" JAVAlang.SecurityException: Prohibited package name: JAVA.lang
   at   JAVA.lang.ClassLoader.preDefineClass(ClassLoader.JAVA:479)
   at      JAVA.lang.ClassLoader.defineClass(ClassLoader.JAVA:614)
   at JAVA.security. SecureClassLoader.defineClass(SecureClassLoader.JAVA:124)
   at   JAVA.net.URLClassLoader.defineClass(URLClassLoader.JAVA:260)
   at   JAVA.net.URLClassLoader.access$100(URLClassLoader.JAVA:56)
   at   JAVA.netURLClassLoader$1.run(URLClassLoader.JAVA:195)
   at   JAVA.security.AccessController.doPrivileged(Native Method)
   at  JAVA.netURLClassLoader.findClass(URLClassLoader.JAVA:188)
   at  JAVA.lang.ClassLoader.loadClass(ClassLoader.JAVA:306)
   at sun.misc.Launcher.loadClass(Launcher.JAVA:268)
   at  JAVA.lang.ClassLoader.loadClass(ClassLoader.JAVA:251)
   at  JAVA.lang.ClassLoader.loadClassInternal(ClassLoader.JAVA:319)
   at pojopersistent.Main.main(Main.JAVA:23)

[options] may be any combination of JVM options or Fluency options. The Fluency JVM supports the same options as the Sun JAVA SE 6 JVM. See, for example, http://JAVA.sun.com/JAVAse/6/docs/technotes/tools/windows/JAVA.html. JVM options are prefixed with a "-", while Fluency options are of the form name=value. <target> is the application jar file or class that will be executed on the Fluency node. [application parameters] are application specific parameters that are passed to the application program's main.

The help command displays the usage message. The display services command is used to query MDNS service discovery for Fluency services on the network. The display services command only works if MDNS service discovery is configured on the local machine.

The following table summarizes supported deployment tool options:

| Option | Description |
| --- | --- |
| adminport | The [adminport] of the Fluency node that should be used to run the application. |
| autoconfigure | This option, when given a value of true, requests that the Fluency node load and activate node configuration files before the application starts, and deactivate/remove those configurations when the application terminates (default: false). |
| debug | A boolean flag indicating whether diagnostic output is required (default: false). |
| detailed | A boolean flag indicating whether the display service& command output should contain detailed results (default: false). |
| displayversion | A boolean flag indicating whether the Fluency version information should be displayed (default: true). |
| domainname | The name of the domain that the application is to run on. When this option is used, the deployment tool must connect to a Kabira Domain Manager node which is managing the given domain. The application will execute on all nodes in the domain. |

| Option | Description |
|---|---|
| domaingroup | The name of the domain group that the application is to run on. When this option is used, the deployment tool must connect to a Kabira Domain Manager node which is managing the given domain group. The application will execute on all nodes in the domain group. |
| domainnode | The name of the domain node that the application is to run on. When this option is used, the deployment tool must connect to a Kabira Domain Manager node which is managing the given domain node. The application will execute on the specified node. |
| hostname | The [hostname] hosting the Fluency node that should be used to run the application (default: localhost). |
| password | The [password] to use when authenticating [username] during the connection to the Fluency node. |
| remotedebug | If <value> is true~, require the JVIVI hosting the application to enable remote debugging (default: false for PRODUCTION nodes, true for DEVELOPMENT nodes). |
| remotedebugport | The debugger agent port, to be used by the JYIVI to listen for remote debugger clients (default: randomly chosen by the JVIVI). |
| reset | This option, when given a value of tru&, requests that all Java objects on the node be deleted before the application begins execution (default: true). |
| servicename | The [servicename] of the Fluency node that is to be used to run the application. This option may be used instead of [adminport] and [hostname]. This option only works if MDNS service discovery is configured on the local machine. |
| suspend | If <value> is true~, require the JVIVI to suspend execution before main 0 is called during remote debugging. This option only applies if remotedebug=true is specified (default: false). |
| timeout | The number of seconds to wait while resolving [servicename] with MDNS (default: 10). |
| username | The [username] to use when connecting to the Fluency node. The specified value must identify a principal with administrative privileges on the given node. |
| x5O9credential | The X509 certificate keystore file to use for authentication. If given, the [password] parameter is required, and should be the keystore password. |
| x5O9credentialalias | The alias of the users X509 certificate in the keystore specified by the [x5O9credential] option (default: mykey). |

The reset option provides development support for changing the shape of Managed Objects in shared memory. It has no affect to non-managed Java objects. The reset option only affects the node on which it was executed. To reset types in a distributed or highly available environment, the same reset option value must be executed on all nodes.

Examples of changing the shape of a Managed Objects are:
adding a field to a class
removing a field from a class
changing the type of a field in a class
changing the inheritance hierarchy Fluency detects when the shape of a Managed Object changes and fails the load of the changed class definition if reset=false. For example, the following example may be run twice—once with m_string not commented out, and then again with m_string commented out:

```
[primary] Java main class
prograinin ng . fluency. reference. Shape .main exited with an exception. [primary] Java exception
occurred: Audit of class
[programming.fluency. reference.ShapeChange] failed:
    Type did not match. New type name programming.fluency.reference.ShapeChange -
    existing type name programming.fluency.reference.ShapeChange. Changed values
    :numberSlots:objectSze:
    the class will not be loaded.
[primary] at com.kabira.platform.classloader.ClassLoader.createKTPTypeDescrptor (Native Method)
[primary] at com.kabira.platform.classloader.ClassLoader.deflneManagedClass (ClassLoader . Java: 642)
[primary] at com.kabira.platform.classloader.ClassLoader.flndClass(ClassLoader.java:302)
[primary] at com.kabira.platform.classloader.ClassLoader.loadClass(ClassLoader.java:228)
[primary] at java.lang.ClassLoader.loadClass(ClassLoader.java: 251)
[primary] at java.lang.ClassLoader.loadClassInternal(ClassLoader.java:319)
[primary] at programming.fluency.reference.Shape.run(Shape.java:37)
[primary] at com.kabira.platform.Transaction.execute(Transacton.java:132)
[primary] at programming.fluency.reference.Shape.maTh(Shape.java:31)
INFO: application [programming.fluency.reference.Shape6] running on node [primary] exited with status
[−1]
INFO: Run of distributed application [programming.fluency.reference.Shape6] complete.
```

Setting reset=true (the default value) will avoid this exception. When an application is executed with reset=true the following happens:

1. All Managed Objects in shared memory are deleted
2. The type definition of the Managed Objects is removed.
3. The type definition of the Managed Objects is recreated using the new class definition.

When Replicated, Mirrored, or Distributed Managed Objects are used in an application, the type definition for these classes are pushed to all nodes in a cluster. To ensure that the type definitions stay consistent on all nodes, the same value for the reset option must be sent to all nodes. This may be accomplished using the Distributed Development features described above.

When the Fluency deployment tool is executed it looks for the following file:

<user home directory>/.fluency/options

If this file exists, any deployment tool command line options in the options file are used. Command line options specified in the options file have the same affect as the same command line option specified on the command line. Options on the command line override the same option in the options file. For example if the command line contains -jar fluency.jar debug=true and the options file contains debug=false, a debug value of true is used for the application execution.

The options file follows the format below.

```

# Any line starting with '#' is ignored

# Each option is specified on a separate line, as follows:

<fluency option name> = <fluency option value>[newline]
```

For example, the following options file would set up the default username and password for use with the Fluency development nodes:

```

# Username and password for Fluency development nodes

username = guest
password = fluency
```

The example below shows how to execute a simple Java program on Fluency:

```
public class HelloWorld
{
    public static void main(String args[ ])
    {
        System.out.println("Hello World");
    }
}

# Compile the program using the native javac on the host machine

javac HelloWorld.Java

# Execute the program on a Fluency node - assumes fluency.jar is in local directory

java -jar fluency.jar hostname=192.168.71.128 adminport=7100 \
    username=guest password=fluency HelloWorld

# The output from the Fluency node and the application

INFO: JVM remote debugger agent running on [192.168.71.128:50276] ...
Listening for transport dt_socket at address: 50276
Hello World
```

The Fluency SDK may ship with a VMWare image that contains a complete Fluency server development environment. The server development appliance may have the following nodes installed and configured:
  primary—Fluency application node
  backup—Fluency application node
  replica—Fluency application node
  domain manager—Distributed domain management
  manager—Manager web interface When the VMWare image is started all of these nodes are automatically started and configured. To restart the server development appliance, the VMWare image should be powered off and back on. This will restore all nodes to their default configuration. The server development appliance is reset to its default state when the VMWare image is restarted. Any modifications made to the server are discarded.

All user visible directories for the server development appliance are available in this path. They are also remotely mountable using SMB.

/opt/kabira/run/fluency-dev

Under this path are the following directories:
  configuration—default and auto-load configuration files
  deploy—user deployment directory for JAR and class files
  html—generated HTML files for VMWare web pages
  logs—event, console, and change log files
  nodes—node directories The configuration directory contains the following configuration files:
  default node configuration files
  auto-load configuration files for Fluency application nodes The structure of the configuration directory is:
  configuration/<node name>

The Fluency application nodes—primary, backup, and replica have a subdirectory named autoconfigure. This directory is used for automatic configuration file loading.

To automatically load configuration files the following needs to happen. Configuration files to auto-load are copied into the application node autoconfigure directory, and the deployment tool autoconfigure parameter is set to true. When an application is loaded into a node for execution with the autoconfigure parameter set to true, any configuration files in the autoconfigure directory are loaded into the node and activated. When the application exits, the configuration files are deactivated and removed from the node.

Configuration files in the autoconfigure directory are loaded and activated in ascending sort order based on the numeric value of the characters in the file name using the current character set. They are deactivated and removed in the opposite order.

The deploy directory provides a location for installing JAR or class files on the server. When a JVM is started on an application node, any JAR or class files in this directory are automatically added to the JVM's class path. The JAR files are sorted in ascending ASCII order by name before being added to the JVM's class path. This provides a simple mechanism for installing software on the server that is visible to the application nodes configured in the server development appliance.

The logs directory contains the following log files:
  node specific event logs
  console log
  change logs The node specific event logs use the following naming convention:

```

# nodename - node name generating log file
# mmdd - month/day stamp
# count - number of files created on same date

<nodename>_<mmdd>_<count>.log
```

The console log is named console.log. It contains all the output captured during node startup. Change logs are located in the change log s directory in the logs directory. They use the following naming convention:

```

# In Progress Files

# nodename - node name generating change log file
# mmdd - month/day stamp
# count - number of files created on same date
changelogs/<nodename>/<mmdd>_<count>.xml

# Completed Files

# nodename - node name generating change log file
# originalname - original name of file
# count - number of files created on same date
changelogs/<nodename>/complete/<originalname>.xml_<count>
```

The nodes directory contains the runtime files associated with active nodes. Each active node is in a separate subdirectory. This directory contains the shared memory files associated with a node and low-level log files that may be useful for debugging problems.

We now describe default configuration information loaded into the Development Appliance.

```
configuration "ha" version "1.0" type "ha"
{
    configure ha
    {
        //
        // Configure a primary, backup, and replica node
        //
        NodeConfiguration { name = "primary"; };
        NodeConfiguration { name = "backup"; };
        NodeConfiguration { name = "replica"; };
        //
        // Define a single partition
        //
        PartitionConfiguration
        {
            name = "fluency";
            group = "fluency";
            primaryNodeName = "primary";
            backupNodeName = "backup";
            minimumNumber = 0;
            maximumNumber = 100;
            changeLogScope = LogBoth;
            fileNameTemplate =
                "../../logs/changelogs/%nodeName/%m%d_%count.xml";
            fileOpenMode = Append;
            directoryCreateMode = "0755";
            fileCreateMode = "0666";
            rolloverBySize = Disabled;
            rolloverSizeBytes = 0;
            rolloverByInterval = Disabled;
            rolloverIntervalSeconds = 0;
            rolloverByNumRecords = Enabled;
            rolloverNumRecords = 1000;
            renameOnClose = Enabled;
            renameTemplate =
"../../logs/changelogs/%nodeName/complete/%m%d_%count.xml";
            loggingMode = Synchronous;
            transactionalLogger = Enabled;
            fileSyncMode = Unsynchronized;
        };
    };
};
```

This is the default security configuration.

```
configuration "users" version "1.0" type "security"
{
    configure security
    {
        configure Principals
        {
            Principal
            {
                name = "guest";
                textCredential = "fluency";
                roles =
                {
                    "switchadmin",
                    "nodeAdmin"
                };
            };
        };
    };
}
```

This is the default domain configuration.

```
configuration "kdm" version "2.0" type "kdm"
{
    configure kdm
    {
        DomainConfig
        {
            //
            // Domain name
            //
            domainName = "Fluency Development";
            //
            // The number of seconds between retrying
            // queued configuration commands following a
            // failure.
            //
            retryIntervalSeconds = 5;
            //
            // Optional manually configured managed nodes
            //
            nodeConfiguration = { };
            //
            // Optional configuration for managed nodes
            //
            defaultNodeConfiguration = { };
            //
            // Configure the cluster group
            //
            groupConfiguration =
            {
                {
                    name = "Application Cluster";
                    properties = "";
                    defaultNodeConfiguration = { };
                }
            };
        };
    };
};
```

This is the default node configuration.

```
configuration "nodeconfig" version "1.0" type "nodeconfig"
{
    configure switchadmin
    {
        configure Node
        {
            //
            // Default description for application node
            //
            Description
```

-continued

```
    {
        defaultDescription = "Fluency Development";
        properties = { };
    };
    //
    // This application node will automatically
    // join the Application Cluster in the
    // Fluency Development domain
    //
    Domain
    {
        name = "Fluency Development";
        group = "Application Cluster";
    };
        };
    };
};
```

The Java Debug Wire Protocol (JDWP) is used to integrate debugging tools. JDWP was updated to support transactions. The transaction support makes assumptions on how a debugger client manipulates threads. These assumptions may not be true for all clients. In this case, the wrong transaction, or worse a committed transaction, may be used by the JDWP in the Fluency JYIVI. This will cause unpredictable results when debugging an application. A property was added to enable and disable JDWP transaction support.

-Djava.jdwp.transaction~[true|false]

The default value of the java.jdwp.transaction property is true. Debugger clients who experience problems with JDWP when debugging transactional threads should change the value of this property to false.

vmOptions=-Djava jdwp transaction=false

Once disabled, transactional access to Managed Object fields from a debugger client will only report the contents of the Java proxy instance, not the backing shared memory.

The Fluency Class Loader uses multiple mechanisms to resolve a class reference. These mechanisms are searched in the following order:

1. Fluency defined system CLASS PATH
2. JAR or Class files in deploy directory
3. Client side CLASS PATH definition Once a class is resolved the search is terminated. Fluency defines a system CLASS PATH that cannot be changed. The contents of the deploy directory are then searched to resolve class resolutions as described above. Finally, the CLASS PATH specified to the deployment tool is searched.

We have described a system and method in which a user can specify user-defined business logic of a desired transaction processing application using a platform-independent language such as JAVA, even though JAVA (and other platform-independent languages) typically does not support fully-transactional applications. For example, a JAVA Virtual Machine may be interfaced to a transaction processing platform. Thus, for example, a transaction processing platform may be configured to execute instantiated service adaptors arranged to accomplish the business logic, provided in JAVA, in conjunction with generic transaction processing logic. The transaction processing platform may utilize a type system, and the type system utilized by the transaction processing platform may be exposed to the JAVA code using JAVA bindings, such as using a simple programming model to specify a JAVA class as a managed object. As a result, when executed, the user-defined business logic specified in JAVA and executed by a JAVA Virtual Machine (which may be, for example, a fully-certified JAVA Virtual Machine), enjoys all of the transaction processing features of the underlying transaction processing platform.

The methods described herein may be carried out by computing devices, such as the computing nodes described herein, executing computer program instructions from one or more memories and/or other tangible computer-readable medium (and the one or more memories and/or other tangible computer-readable medium may comprise a computer program product.

What is claimed is:

1. A computing system, comprising at least one computing device configured to execute computer program instructions to:
   accomplish a fully transactional application defined at least in part using the Java programming language, including executing managed objects, wherein the managed objects are persisted in a shared memory of the computing system, such that a scope of the objects is global to the fully transactional application;
   maintain a parametric mapping of the managed objects, the parametric mapping including at least one key for each of at least some of the cataloged managed objects with an index for the keys maintained in the shared memory such that high-performance queries may be performed against the managed objects using the index; and
   receive from the application a parametric selection of the managed objects relative to the maintained catalog, and to provide to the application a result of the parametric selection that is a portion of the managed objects.

2. The computing system of claim 1, wherein:
   the at least one key for each of the managed objects in the catalog is defined using Java constructs with respect to a definition of that managed object.

3. The computing system of claim 2, wherein:
   the Java constructs include annotations, and an annotation to define a key captures information including at least one member from the group consisting of the name of the key, a list of one or more fields making up the key, a property indicating whether the key is unique, and/or a property indicating whether the key is ordered.

4. A computer-implemented method carried out by at least one computing device, the method comprising:
   by the at least one computing device, executing computer program instructions to accomplish a fully transactional application defined at least in part using the Java programming language, including executing managed objects, wherein the managed objects are persisted in a shared memory of the computing system, such that a scope of the objects is global to the fully transactional application;
   by the at least one computing device, executing computer program instructions to maintain a parametric mapping of the managed objects, the parametric mapping including at least one key for each of at least some of the cataloged managed objects with an index for the keys maintained in the shared memory such that high-performance queries may be performed against the managed objects using the index; and
   by the at least one computing device, executing computer program instructions to receive from the application a parametric selection of the managed objects relative to a maintained catalog, and to provide to the application a result of the parametric selection that is a portion of the managed objects.

5. The computer-implemented method of claim 4, wherein:
   the at least one key for each of the managed objects in the catalog is defined using Java constructs with respect to a definition of that managed object.

6. The computer-implemented method of claim 5, wherein:
the Java constructs include annotations and an annotation to define a key captures information including at least one member from the group consisting of the name of the key, a list of one or more fields making up the key, a property indicating whether the key is unique, and/or a property indicating whether the key is ordered.

7. A computing system, comprising at least one computing device configured to execute computer program instructions to:
accomplish a fully transactional application defined at least in part using the Java programming language, including executing managed objects, wherein the managed objects are persisted in a shared memory of the computing system, such that a scope of the objects is global to the fully transactional application;
maintain a catalog of the managed objects:
the catalog of managed objects includes at least one key for each of the cataloged managed objects, the parametric mapping including at least one key for each of at least some of the cataloged managed objects with an index for the keys maintained in the shared memory such that high-performance queries may be performed against the managed objects using the index, the at least one key for each of the managed objects in the catalog is defined using Java constructs with respect to a definition of that managed object; and
provide a query interface for querying the managed objects, in order to receive a query from an application, to process the catalog including processing the keys included in the catalog, and to provide a result indication of at least one of the managed objects back to the querying application.

8. The computing system of claim 7, wherein:
the Java constructs include annotations.

9. The computing system of claim 7, wherein:
the catalog of managed objects is an index of the keys.

10. The computing system of claim 7, wherein:
at least some of the keys are defined to be unique keys and at least some of the keys are defined to be ordered keys.

11. The computing system of claim 7, wherein:
the query interface includes at least one class via which to define key name/value pairs.

12. The computing system of claim 7, wherein:
the query interface includes at last one class via which to instantiate a query definition and execution.

13. The computing system of claim 7, wherein:
the catalog is configured such that update transactions to the catalog are transactionally isolated from other transactions of the computing system.

14. The computing system of claim 7, wherein:
the query interface includes a mechanism to atomically select a managed object if the managed object exists and, if the managed object does not exist, create an instance of the managed object.

15. A computer-implemented method carried out by at least one computing device, the method comprising:
by the at least one computing device, executing computer program instructions to accomplish a fully transactional application defined at least in part using the Java programming language, including executing managed objects, wherein the managed objects are persisted in a shared memory of the computing system, such that a scope of the objects is global to the fully transactional application;
by the at least one computing device, executing computer program instructions to maintain a catalog of the managed objects the catalog of managed objects includes at least one key for each of the cataloged managed objects with an index maintained in shared memory for the keys such that high-performance queries may be performed against the managed objects using the index; and
by the at least one computing device, executing computer program instructions to provide a query interface for querying the managed objects, in order to receive a query from an application, to process the catalog, and to provide a result indication of at least one of the managed objects back to the querying application.

16. The computer-implemented method of claim 15, wherein:
the at least one key for each of the managed objects in the catalog is defined using Java constructs with respect to a definition of that managed object.

17. The computer-implemented method of claim 16, wherein:
the Java constructs include annotations and an annotation to define a key captures information including at least one member from the group consisting of the name of the key, a list of one or more fields making up the key, a property indicating whether the key is unique, and/or a property indicating whether the key is ordered.

18. The computer-implemented method of claim 16, wherein:
the catalog of managed objects is an index of the keys.

19. The computer-implemented method of claim 16, wherein:
at least some of the keys are defined to be unique keys and at least some of the keys are defined to be ordered keys.

20. The computer-implemented method of claim 16, wherein:
the query interface includes at least one class via which to define key name/value pairs.

21. The computer-implemented method of claim 15, wherein:
the query interface includes at last one class via which to instantiate a query definition and execution.

22. The computer-implemented method of claim 15, wherein:
the catalog is configured such that update transactions to the catalog are transactionally isolated from other transactions of the computing system.

23. The computer-implemented method of claim 15, wherein:
the query interface includes a mechanism to atomically select a managed object if the managed object exists and, if the managed object does not exist, create an instance of the managed object.

* * * * *